United States Patent
Koda et al.

(10) Patent No.: US 6,635,727 B1
(45) Date of Patent: Oct. 21, 2003

(54) ETHYLENE COPOLYMER RUBBER, PROCESS FOR PRODUCING THE SAME, AND USE

(75) Inventors: Taku Koda, Ichihara (JP); Kotaro Ichino, Ichihara (JP); Masaaki Kawasaki, Ichihara (JP); Keiji Okada, Kuga-Gun (JP)

(73) Assignee: Mitsui Chemicals, Inc., Tokyo (JP)

(*) Notice: Subject to any disclaimer, the term of this patent is extended or adjusted under 35 U.S.C. 154(b) by 147 days.

(21) Appl. No.: 09/889,777

(22) PCT Filed: Nov. 21, 2000

(86) PCT No.: PCT/JP00/08202

§ 371 (c)(1),
(2), (4) Date: Jul. 20, 2001

(87) PCT Pub. No.: WO01/38410

PCT Pub. Date: May 31, 2001

(30) Foreign Application Priority Data

Nov. 22, 1999 (JP) ............................ 11-331335
Nov. 24, 1999 (JP) ............................ 11-332769
Nov. 25, 1999 (JP) ............................ 11-334670

(51) Int. Cl.$^7$ ................... C08F 4/642; C08F 236/22
(52) U.S. Cl. .............. 526/160; 526/339; 526/341; 526/346; 526/335; 525/240; 521/140; 521/150
(58) Field of Search ................ 526/339, 341, 526/346, 160; 521/140, 150; 525/240

(56) References Cited

U.S. PATENT DOCUMENTS 6,303,727 B1 * 10/2001 Maeda et al. ............. 526/335

FOREIGN PATENT DOCUMENTS

| EP | 0 962 437 A1 | 12/1999 |
| JP | 2000-080128 | 3/2000 |
| WO | WO 01/12686 A1 | 2/2001 |

* cited by examiner

Primary Examiner—David W. Wu
Assistant Examiner—R. Rabago
(74) Attorney, Agent, or Firm—Burns, Doane, Swecker & Mathis, LLP

(57) ABSTRACT

The ethylenic copolymer rubber according to the present invention is a novel and useful ethylenic copolymer rubber which can be cross-linked at a high velocity and is superior in scorching stability, in workability and in moldability, of which cross-linked product is superior in the mechanical properties, such as the cross-linked rubber strength etc., and in the form-preservability. A cross-linkable rubber composition containing this ethylenic copolymer rubber is utilized for producing, for example, cross-linked molded rubber product for use as sealing element and automobile weather strip sponge. The ethylenic copolymer rubber according to the present invention comprises a random copolymer made of ethylene, an α-olefin having 3–20 carbon atoms and a triene represented by the formula (1) given below as well as an optionally incorporated non-conjuagted polyene having two or more polymerizable double bonds in the molecule, wherein the mole ratio of ethylene/α-olefin is 95/5–40/60 and the triene content is 0.1–10 mole %, the intrinsic viscosity (η) determined in decalin at 135° C. is 0.1–10 dl/g and wherein the ratio of the above intrinsic viscosity (η) versus the converted intrinsic viscosity (η)$_{blank}$ converted to a linear ethylene/propylene copolymer having 70 mole % of ethylene units determined by gel permeation chromatography (GPC, at 140° C., in o-dichlorobenzene solvent) of the ethylenic copolymer rubber, i.e. (η)/(η)$_{blank}$=g', is 0.5–0.95.

(1)

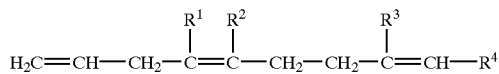

in which $R^1$ and $R^2$ denote each, independently of each other, hydrogen atom, methyl or ethyl and $R^3$ and $R^4$ denote each, independently of each other, methyl or ethyl.

42 Claims, No Drawings

ETHYLENE COPOLYMER RUBBER, PROCESS FOR PRODUCING THE SAME, AND USE

FIELD OF THE INVENTION

The present invention relates to a novel and useful ethylenic copolymer rubber having cross-linkable (vulcanizable) unsaturation bonds and to a production process and use thereof.

BACKGROUND OF THE INVENTION

In general, hydrocarbon compounds having two carbon-to-carbon double bonds in the molecule are called dienes, among which a variety of compounds have been known, for example, linear dienes, such as 1,3-butadiene, 1,3-pentadiene and 1,4-hexadiene; cyclic dienes such as ethylidene-2-norbornene (ENB) and dicyclopentadiene. By co-polymerizing such a diene with an α-olefin, such as ethylene or propylene, an unsaturated ethylenic copolymer rubber having vulcanizable unsaturation bond(s) can be obtained.

Such an unsaturated ethylenic copolymer rubber is a polymer product susceptible of being vulcanized which is superior in the weatherability, resistance to ozone, resistance to thermal aging and so on and can be used for rubber products, such as automobile parts, electric insulating materials, architectural and constructional materials, industrial rubber materials and so on, and used widely for materials (modofiers) for blending with plastic resins, such as polypropylene, polystyrene and the like, as well.

For the unsaturated ethylenic copolymer rubber, there have hitherto been known, for example, an ethylene/propylene/5-ethylidene-2-norbornene copolymer rubber, ethylene/propylene/dicyclopentadiene copolymer rubber and ethylene/propylene/1,4-hexadiene copolymer rubber. Among them, the ethylene/propylene/5-ethylidene-2-norbornene copolymer rubber has found its wider applications due to its higher vulcanization velocity as compared with other unsaturated ethylenic copolymer rubbers.

However, a demand has been put on the conventional unsaturated ethylenic copolymer rubbers for a further improvement of the vulcanization velocity. Thus, the vulcanization velocity of an unsaturated ethylenic copolymer rubber, namely, even that of, for example, ethylene/propylene/5-ethylidene-2-norbornene copolymer rubber, is lower as compared with that of a diene rubber, such as natural rubber, styrene/butadiene rubber, isoprene rubber, butadiene rubber or nitrile rubber. Moreover, there is a problem that free and wide control of the vulcanization velocity is limited, as compared with these diene rubbers. Furthermore, there is a problem that the ability of co-vulcanization with diene rubbers is low.

While the vulcanization velocity on vulcanizing the unsaturated ethylenic copolymer rubber may be increased by increasing the vulcanization temperature or by using a large amount of vulcanizing agent, this may accompany an increase in the process cost for the vulcanization. Vulcanization at higher temperature will cause reduction of the quality of the vulcanized rubber. Use of larger amount of the vulcanizing agent will result in an increase in the possibility of occurence of blooming on the rubber surface by the vulcanizing agent, which is undesirable both in the hygienic point of view and in the appearance. It is difficult, on the contrtary, to attempt to reduce the vulcanization duration by lowering the temperature of vulcanization of the unsaturated ethylenic copolymer rubber to economize energy consumption on the vulcanization.

On the other hand, a vulcanizable copolymer rubber exhibiting higher vulcanization velocity tends, as a general nature, to reveal a poor scorch stability. This may be attributed to the fact that a copolymer rubber exhibiting higher vulcanization velocity may suffer from a premature vulcanization, since it tends to cause the vulcanization to proceed more easily during the process steps other than the vulcanization step, such as the step of storage of the rubber blend and steps before the vulcanization step, as compared with copolymer rubbers exhibiting lower vulcanization velocities. Thus, an ability of prompter vulcanization contradicts the scorch stability, so that a copolymer rubber having both these properties may difficultly be obtained. For example, when the content of 5-ethylidene-2-norbornene is increased in the ethylene/propylene/5-ethylidene-2-norbornene copolymer rubber, a higher vulcanization velocity of the resulting copolymer rubber may be attained, nevertheless, the scorch stability thereof is decreased and the easiness in handling on the working process etc. are reduced. Explaining concretely, troubles due to the increase in the rate of increase of the viscosity may tend to occur, such as a reduction of the delivery rate, an increase of the motor load and clogging of the cylinder die. When, on the contrary, the content of 5-ethylidene-2-norbornene is reduced, the resulting copolymer rubber may reveal a higher scorch stability and improved easiness in the handling, nevertheless, the through-put of the vulcanized rubber may be decreased due to the reduction of the vulcanization velocity.

In these circumstances, it has been desired to realize an ethylenic copolymer rubber which exhibits a higher vulcanization velocity and, nevertheless, is superior in the scorch stability, workability and moldability with simultaneous attainment of superior mechanical characteristics of the vulcanized product, such as the strength of the vulcanized rubber.

In the practice, demands for the properties of sealing materials for, for example, door seal, trunk seal and window seal for automobile, which constitute representative applications of EPR and EPDM, become, with the recent general trend to high performance cars with longer life, more sophisticated, whereby it has become difficult to satisfy sufficiently all the requested high grade characteristics by the conventional unsaturated ethylenic copolymer rubbers.

Sealing performances are influenced by various parameters, including cross sectional form, resistance to compressive permanent strain and flexibility of a rubber sealant. As for the cross sectional form, recent rubber sealants have complicate configurations, as having a thinner and longer lip portion, as compared with conventional ones. For a sealant to be assembled on a part element of hard top type, a structure with greater sectional area and thinner wall thickness than the prior art is requested, whereby a problem has come up to the front, in which so-called molding deformation may occur wherein an accurate cross sectional form is not attained in the vulcanization foaming process step.

As the parameter for representing the phenomenon of molding deformation, so-called "form preservability" has been used in general and, thus, a sponge rubber having a superior form preservability is requested. While attempts were proposed from of relatively old, to use two or more polyene components for improving the form preservability of EPT and EPDM {See, for example, Japanese Patent Publications Sho 44-7713 B and Sho 47-23914 B, Japanese Patent Kokais Sho 49-62582 A (corresponding to British Patent Application No. 1412519 A), Sho 49-62583 A (corresponding to U.S. Pat. No. 3,903,061), Sho 56-22338 A, Sho 58-191705 A (corresponding to U.S. Pat. No. 4,510,303) and so on}, none has reached the goal of satifying all the requested demands.

For example, in the proposed technique of using 5-ethylidene-2-norbornene (ENB) and dicyclopentadiene (DCPD) together as the polyenes for EPDM, some of the extrusion processibility, the vulcanization velocity and the mechanical strength of the resulting vulcanized rubber may not reach a sufficient value, in accordance with the selection of the balance between the contents of ENB and DCPD. In the proposed technique of using ENB and vinylnorbornene (VNB) together as the polyenes for EPDM, the balance among the extrusion processibility, the vulcanization velocity and the mechanical strength of the resulting vulcanized rubber may be improved somewhat as compared with the concurrent use of ENB and DCPD, nevertheless, no satisfactory EPDM was obtained, since the improvement is still insufficient and a shortcoming of debased aspect of production costs accompanies.

In these circumstances, it has been desired to realize an ethylenic copolymer rubber which exhibits a higher vulcanization velocity and, nevertheless, is superior in the scorch stability, workability and moldability together with attainment of a vulcanized rubber which is superior in the mechanical characteristics, such as the strength of the vulcanized rubber, and in the form preservability.

By the way, it is to be pointed out that a latex composition in which a non-crystalline ethylene/α-olefin/polyene copolymer is contained as the main component and a technique for producing such a latex composition have been known in Japanese Patent Kokai Sho 61-238842 A (Patent Publication Hei 5-82415 B) and that a technique for effecting cross linking of a polymer present as an aqueous dispersion by an ionized corpuscular radiant ray has been known in Japanese Patent Kokai Sho 52-121054 A and so on. Further, a technique of utilizing a latex of a cross-linked rubber for a modifier of resin has been known in Japanese Patent Kokais Sho 62-20532 A (corresponding to U.S. Pat. No. 4,818,785) and Sho 62-89716 A and in others. Furthermore, Japanese Patent Kokai Sho 61-238842 A applied for a patent by the present applicant discloses a latex composition comprising a blend of a non-crystalline ethylene/α-olefin/polyene copolymer, a low molecular weight copolymer of an α-olefin and/or a low molecular weight copolymer of a modified α-olefin, wherein the non-crystalline copolymer component has cross-linked bonding. Therein are recited, as preferable polyene components constituting the non-crystalline ethylene/α-olefin/polyene co-polymer, 1,4-hexadiene, 5-ethylidene-2-norbornene, dicyclopentadiene and 5-vinylnorbornene.

However, it was found by the present inventors by their tracing experiments for the latex compositions disclosed in the above-mentioned patent gazettes, that, in these latex compositions, a performance as a resin modifier for, for example, acrylonitrile/styrene copolymer resin (AS resin), was certainly recognized, nevertheless, the effects for improving the impact resistance and the surface gloss were still insufficient.

The non-crystalline ethylene/α-olefin/polyene copolymer mentioned above (in the following, referred to as the ethylene/α-olefin/non-conjugated polyene copolymer rubber) is used as an essential component for the latex to be used as the resin modifier, since it is superior in itself in the weatherability and in the resistance to solvents.

Therefore, it has been desired to realize a latex composition capable of modifying the resin, which had failed to build up formed resin articles superior in the impact resistance and in the surface gloss, into such a resin that can be molded into formed resin articles superior in the impact resistance and in the surface gloss without debasing the superior weatherability and solvent-resistance intrinsic to the ethylene/α-olefin/non-conjugated polyene copolymer rubber. Here, the word "superior in the surface gloss" does mean that the surface gloss value is high.

The inventors found that a molded article of an acrylonitrile/ethylene copolymer/styrene resin (AES resin) superior in the impact resistance and in the surface gloss was able to be obtained without debasing the superior weatherability and solvent-resistance intrinsic to the ethylene/α-olefin/triene copolymer rubber, when a latex of cross-linked rubber composition obtained from a latex composition of a blend of an ethylene/α-olefin/triene copolymer rubber contining a specific triene and of a low molecular weight polyethylene or a low molecular weight ethylene/α-olfin copolymer etc. in a specific proportion was used and the blend was subjected to a cross-linking treatment to build up cross-linked boning in the rubber component, whereupon the resulting composition was used as a modifier for an AS resin, whereby the present invention has been completed.

An object of the present invention is to solve the problems concomitant with the prior techniques and to provide a first and a second ethylenic copolymer rubbers which are novel and useful and have a high cross-linking (vulcanization) velocity together with superior characteristics in the scorch stability, in the workability and in the moldability and the resulting cross-linked product of which is superior in the mechanical properties, such as the strength of the cross-linked rubber and so on, and in the form-preservability, to provide a cross-linkable rubber composition comprising the said copolymer rubber, to provide a cross-linked rubber and to provide a cross-linked molded rubber product.

Another object of the present invention is to provide a third ethylenic copolymer rubber which is novel and useful and has a high cross-linking velocity together with superior characteristics in the scorch stability, in the workability and in the moldability and the resulting cross-linked product of which is superior in the mechanical properties, such as the strength of the cross-linked rubber and so on, to provide a cross-linkable rubber composition comprising the said copolymer rubber, to provide a cross-linked rubber and to provide a cross-linked molded rubber product.

A further object of the present invention is to provide a process for producing the ethylenic copolymer rubber mentioned above, which can afford to produce the ethylenic copolymer rubber in a simple and efficient manner.

A still further object of the present invention is to provide a process for producing the cross-linked molded rubber product mentioned above, which can afford to produce the cross-linked molded rubber product in a simple and efficient manner.

A further object of the present invention is to provide a cross-linked rubber latex composition capable of modifying resins that have not been able to build up formed resin articles superior in the impact resistance and in the surface gloss, into such a resin that can be molded into formed resin articles superior in the impact resistance and in the surface gloss without debasing the superior weatherability and solvent-resistance intrinsic to an ethylene/α-olefin/triene copolymer rubber.

A still further object of the present invention is to provide an AES resin which can be formed into articles superior in the impact resistance and in the surface gloss as compared with conventional AES resins, without debacing the superior characteristics in the weatherability and in the solvent-resistance intrinsic to an ethylene/α-olefin/triene copolymer rubber.

DISCLOSURE OF THE INVENTION

The present invention consists in an ethylenic copolymer rubber and a production process and use thereof as given below:

(1) An ethylenic copolymer rubber (in the following, referred to as the first ethylenic copolymer rubber) comprising structural units derived from comonomers, respectively, of
(a) ethylene,
(b) one or more α-olefins having 3–20 carbon atoms and
(c) one or more trienes represented by the formula (1)

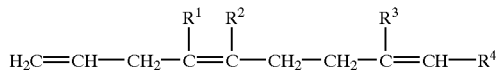
(1)

in which $R^1$ and $R^2$ denote each, independently of each other, hydrogen atom, methyl or ethyl and $R^3$ and $R^4$ denote each, independently of each other, methyl or ethyl, wherein the copolymer rubber has characteristic features
that the mole ratio of the structural unit derived from ethylene (a) versus the structural unit derived from the α-olefin(s) having 3–20 carbon atoms (b), i.e. (ethylene)/(α-olefin(s)), is in the range from 95/5 to 40/60,
that the content of the structural unit derived from the triene(s) (c) is in the range from 0.1 to 10 mole %,
that the intrinsic viscosity (η) determined in decalin at 135° C. is in the range from 0.1 to 10 dl/g and
that the ratio of the above intrinsic viscosity (η) versus the converted intrinsic viscosity $(\eta)_{blank}$ converted into a linear ethylene/propylene copolymer having 70 molte % of ethylene determined by gel permeation chromatography (GPC: determined at 140° C., in a solvent of o-dichlorobenzene) of the ethylenic copolymer rubber, i.e. $(\eta)/(\eta)_{blank}$=g', is 0.5–0.95.

(2) An ethylenic copolymer rubber (in the following, referred to as the second ethylenic copolymer rubber) comprising structural units derived from comonomers, respectively, of
(a) ethylene,
(b) one or more α-olefins having 3–20 carbon atoms and
(c) one or more trienes represented by the formula (1) given above, wherein the copolymer rubber has characteristic features
that the mole ratio of the structural unit derived from ethylene (a) versus the structural unit derived from the α-olefin(s) having 3–20 carbon atoms (b), i.e. (ethylene)/(α-olefin(s)), is in the range from 95/5 to 40/60,
that the content of the structural unit derived from the triene(s) (c) is in the range from 0.1 to 10 mole %,
that the intrinsic viscosity (η) determined in decalin at 135° C. is in the range from 0.1 to 10 dl/g and
that the complex viscosity coefficient $(\eta^*_A)$ at 8 rad/sec in the assessment of dependence of the complex viscosity coefficient (η*) on the frequency estimated from the kinematic viscoelasticity at 190° C. is at least $2\times10^3$ Pa.S and the ratio of the complex viscosity coefficient $(\eta^*_B)$ at 0.01 rad/sec versus the complex viscosity coefficient $(\eta^*_A)$ namely, $(\eta^*_B)/(\eta^*_A)$ is at least 35.

(3) The ethylenic copolymer rubber as defined in the above (1) or (2), wherein it further comprises a structural unit derived from one or more non-conjugated polyenes (d) having at least two polymerizable double bonds in the molecule and the content of the structural unit derived from the non-conjugated polyene(s) (d) is in the range from 0.02 to 3 mole %.

(4) An ethylenic copolymer rubber (in the following, referred to as the third ethylenic copolymer rubber) comprising a random copolymer comprising structural units derived from comonomers, respectively, of
(a) ethylene,
(b) one or more α-olefins having 3–20 carbon atoms,
(c) one or more trienes represented by the formula (1) given above and
(d) one or more non-conjugated polyenes having in the molecule at least two polymerizable double bonds, wherein the copolymer rubber has characteristic features
that the mole ratio of the structural unit derived from ethylene (a) versus the structural unit derived from the α-olefin(s) having 3–20 carbon atoms (b), i.e. (ethylene)/(α-olefin(s)), is in the range from 95/5 to 40/60,
that the content of the structural unit derived from the triene(s) (c) is in the range from 0.1 to 10 mole %,
that the content of the structural unit derived from the non-conjugated polyene(s) (d) is in the range from 0.02 to 3 mole % and that the intrinsic viscosity (η) determined in decalin at 135° C. is in the range from 0.1 to 10 dl/g.

(5) The ethylenic copolymer rubber as defined in any one of the above (1) to (4), wherein it is obtained by subjecting ethylene (a), the α-olefin(s) having 3–20 carbon atoms (b), the triene(s) (c) and, on requirement, the non-conlugated polyene(s) (d) to a random copolymerization in the presence of a metallocene catalyst.

(6) The ethylenic copolymer rubber as defined in any one of the above (1) to (5), wherein the structural unit derived from the α-olefin(s) (b) is that derived from one or more α-olefins selected from the group consisting of propylene, 1-butene, 1-hexene and 1-octene.

(7) The ethylenic copolymer rubber as defined in any one of the above (1) to (6), wherein both the radicals $R^3$ and $R^4$ stand for methyl.

(8) The ethylenic copolymer rubber as defined in any one of the above (1) to (7), wherein the structural unit derived from the triene(s) (c) is represented by the formula (1')

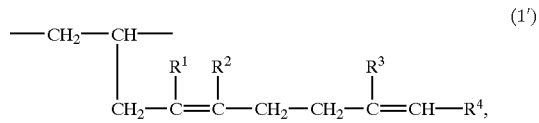
(1')

in which $R^1$ and $R^2$ denote each, independently of each other, hydrogen atom, methyl or ethyl and $R^3$ and $R^4$ denote each, independently of each other, methyl or ethyl.

(9) A process for producing the ethylenic copolymer rubber as defined in any one of the above (1) to (8), comprising
copolymerizing the comonomers comprising (a) ethylene,
(b) one or more α-olefins having 3–20 carbon atoms,
(c) one or more trienes represented by the formula (1) given above and, if necessary,
(d) one or more non-conjugated polyenes having in the molecule at least two polymerizable double bonds in the presence of a catalyst constituted of
(e) a transition metal compound,
(f) an organoaluminum compound and/or
(g) an ionizing ionic compound.

(10) The process for producing the ethylenic copolymer rubber in the presence of a metallocene catalyst as defined in the above (9), wherein the transition metal compound (e) is the metallocene.

(11) A cross-linkable rubber composition comprising the ethylenic copolymer rubber as defined in any one of the above (1) to (8).

(12) A cross-linkable rubber composition comprising
(A) the ethylenic copolymer rubber as defined in any one of the above (1) to (8) and one or more additives selected from the group consisting of
(B) a reinforcing agent,
(C) a softener,
(D) a vulcanizing agent and
(E) a foaming agent.

(13) A cross-linkable rubber composition comprising the ethylenic copolymer rubber (A) as defined in any one of the above (1) to (8) and one or more additives selected from the group consisting of
(B) a reinforcing agent,
(C) a softener,
(D) a vulcanizing agent and
(E) a foaming agent,
wherein the content of the reinforcing agent (B) is 300 parts by weight or less per 100 parts by weight of the ethylenic copolymer rubber (A), the content of the softener (C) is 200 parts by weight or less per 100 parts by weight of the ethylenic copolymer rubber (A) and the content of the foaming agent (E) is in the range from 0.5 to 30 parts by weight per 100 parts by weight of the ethylenic copolymer rubber (A).

(14) A cross-linked rubber obtained by subjecting the cross-linkable rubber composition as defined in any one of the above (11) to (13) to cross linking.

(15) A molded cross-linked rubber article for sealing obtained from the cross-linkable rubber composition as defined in any one of the above (11) to (13) under cross linking.

(16) A weather strip sponge for automobile obtained from the cross-linkable rubber composition comprising the ethylenic copolymer rubber (A) as defined in any one of the above (1) to (8) and at least the foaming agent (E) under cross linking.

(17) A process for preparing a molded cross-linked rubber article for sealing, comprising cross linking the cross-linkable rubber composition as defined in any one of the above (11) to (13) by heating or by irradiation of electron beam.

(18) A latex composition of cross-linked rubber, comprising
2–30 parts by weight of at least one lower molecular weight (co)polymer (G), selected from the group consisting of a lower molecular weight polyethylene, a lower molecular weight ethylene/α-olefin copolymer, a lower molecular weight polyethylene modified by a compound based on unsaturated carboxylic acid and a lower molecular weight ethylene/α-olefin copolymer modified by a compound based on unsaturated carboxylic acid, per 100 parts by weight of an ethylenic copolymer rubber (F) (in the following, denoted occasionally as the fourth ethylenic copolymer rubber) comprising a structural unit derived from ethylene (a), a structural unit derived from one or more α-olefins having 3–20 carbon atoms (b) and a structural unit derived from one or more trienes (c) represented by the formula (1) given above,
wherein the ethylenic copolymer rubber (F) has cross-linkings.

(19) The latex composition of cross-linked rubber as defined in the above (18), wherein the ethylenic copolymer rubber (F) has a content of an ingredient insoluble in hot toluene of at least 30% by weight.

(20) The latex composition of cross-linked rubber as defined in the above (18) or (19), wherein the average particle diameter of the solid matter thereof is in the range from 0.2 to 3.0 μm.

(21) The latex composition of cross-linked rubber as defined in any one of the above (18) to (20), wherein
the ethylenic copolymer rubber (F) has a mole ratio of ethylene (a) versus the α-olefin (b) having 3–20 carbon atoms, namely, (ethylene)/(α-olefin(s)), in the range from 95/5 to 40/60,
the content of the structural unit derived from the triene(s) is in the range from 0.1 to 30 mole % and
the intrinsic viscosity (η) determined in decalin at 135° C. is in the range from 0.1 to 10 dl/g.

(22) The latex composition of cross-linked rubber as defined in any one of the above (18) to (21), wherein the lower molecular weight (co)polymer (G) is a lower molecular weight polyethylene modified by a compound based on unsaturated carboxylic acid or a lower molecular weight ethylene/α-olefin copolymer modified by a compound based on unsaturated carboxylic acid.

(23) An AES resin comprising a copolymer made of acrylonitrile, of the ethylenic copolymer rubber (F) and of styrene, which is obtained by grafting acrylonitrile and styrene onto the latex composition of cross-linked rubber as defined in any one of the above (18) to (22) by an emulsion graft-polymerization.

(24) An AES resin comprising a copolymer made of acrylonitrile, of the ethylenic copolymer rubber (F) and of styrene, which is obtained by blending an acrylonitrile/styrene resin (AS resin) with a dried product obtained by grafting acrylonitrile and styrene onto the latex composition of cross-linked rubber as defined in any one of the above (18) to (22) by an emulsion graft-polymerization.

In the context of this specification, an expression merely by "the ethylenic copolymer rubber" does mean any one, some or all of the first, second, third and fourth ethylenic copolymer resins.

In the context of this specification, the word "cross linking" is used for representing vulcanization by sulfur, non-sulfur vulcanization by a vulcanizing agent other than sulfur and vulcanization by a radiant ray or so on, wherein "cross linking" encompasses vulcanization.

In this specification, the expression "(meth)acryl" represents acryl and/or methacryl.

In this specification, the expression "(co)polymer" represents homopolymer and/or copolymer.

As the α-olefin (b) having 3–20 carbon atoms to be used according to the present invention, there may be enumerated, for example, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. These α-olefins (b) may be used either each solely or in a combination of two or more of them. As the α-olefin (b), those having 3–8 carbon atoms, in particular, propylene, 1-butene, 1-hexene and 1-octene, are preferred.

The trienes (c) to be used according to the present invention are those represented by the formula (1) given above. The triene (c) represented by the formula (1) has double bond present at the terminal end of the molecule and two other double bonds located each at a position other than the terminal end (present at intermediate positions). The said one double bond present at the terminal end is an ethylenic double bond and is susceptible of coupling with ethylene or an α-olefin to cause polymerization, whereas the other two double bonds do not participate in the polymerization and remain in a side chain of the ethylenic copolymer rubber molecule.

Thus, the triene (c) represented by the formula (1) is a non-conjugated triene having carbon-to-carbon double bonds in the molecule, of which one is polymerizable, so that it is distinguished from the non-conjugated polyene (d) which has two or more polymerizable double bonds in the molecule. Here, by the "polymerizable double bond" is meant a double bond which can polymerize with ethylene or with an α-olefin, as described above.

Among the trienes (c) represented by the formula (1), those in which the groups $R^4$ and $R^6$ stand both for methyl are preferred. The ethylenic copolymer rubber obtained using such triene as a starting comonomer is especially superior in the balance between the vulcanization velocity and the scorch aspect.

Concrete examples of the trienes (c) represented by the formula (1) include:

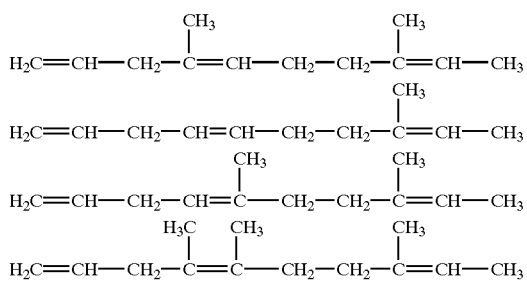

Among the above trienes (c), the first given 4,8-dimethyl-1,4,8-decatriene (in the following, abbreviated sometimes as DMDT) is preferred.

The triens represented by the formula (1) may be a mixture of the trans- and cis-isomers or composed solely of either the trans- or the cis-isomer. Such trienes (c) may be used either solely or in a combination of two or more of them.

The triene (c) represented by the formula (1) can be produced by, for example, the method disclosed in Japanese Patent Application Hei 11-146429 applied for a patent by the present applicant. Thus, it can be produced by reacting a triene compound having a conjugated diene structure represented by the following formula (2),

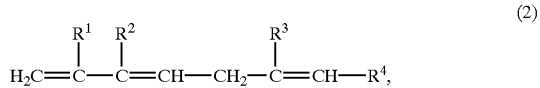

in which $R^1$, $R^2$, $R^3$ and $R^4$ have the same meanings as those given for the formula (1), with ethylene.

The triene having a conjugated diene structure represented by the formula (2) may concretely be exemplified by the following compounds:

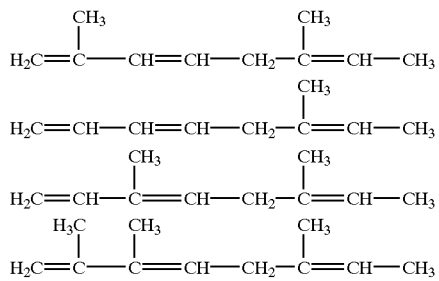

The reaction of the triene having conjugated diene structure represented by the formula (2) with ethylene may favorably be carried out at a temperature usually in the range from 30 to 200° C., preferably from 50 to 150° C., under an ethylene pressure usually in the range from 0.05 to 9.8 MPa (from 0.5 to 100 kgf/cm², gauge), preferably from 0.2 to 6.9 MPa (from 2 to 70 kgf/cm², gauge), for a reaction duration usually in the range from 0.5 to 30 hours. The reaction may be performed under an atmosphere of ethylene gas per se or an atmosphere of ethylene gas containing an inert gas, such as nitrogen or argon. While a reaction solvent is not particularly necessary, use thereof may be permitted. As the reaction solvent, there may favorably be used, for example, hydrocarbon solvent, such as hexane, heptane, octane, nonane, decane, undecane, tridecane, toluene and xylene.

The reaction of the triene having conjugated diene structure represented by the formula (2) with ethylene is carried out usually in the presence of a catalyst. As the catalyst, for example, a catalyst made of a transition metal thiocyanate, one or more organic compounds capable of coordinating to the transition metal atom of the thiocyanate as ligand and an organoaluminum compound may be employed.

As the transition metal thiocyanate, there may be enumerated concretely thiocyanates of transition metal of Group 8 of the periodic table, such as iron and ruthenium; of Group 9 thereof, such as cobalt, rhodium and iridium; and of Group 10 thereof, such as nickel and palladium.

For the organic compound capable of coordinating as ligand, there may be recited, for example, phosphorus-containing compounds, such as tri-o-tolyl-phosphine, triethylphosphine, tripropylphosphine, tributylphosphine, triphenylphosphine, bis(diphenylphosphino)methane, 1,2-bis(diphenylphosphino)ethane, 1,3-bis(diphenylphosphino) propane, 1,4-bis(diphenylphosphino)butane, triphenyl phosphite, triphenylphosphine oxide and triphenyl phosphate.

As the organoaluminum compound, there may be recited, for example, trimethylaluminum, triethylaluminum, triisobutylaluminum, dimethylaluminum chloride, diethylaluminum chloride, ethylaluminum dichloride and diethylaluminum ethoxide.

The structural unit derived from the triene (c) in the ethylenic copolymer rubber according to the present invention has substantially the structure represented by the formula (1') given above.

The fact that the structural unit derived from the triene (c) in the ethylenic copolymer rubber according to the present invention has the structure represented by the formula (1') can be confirmed by detecting $^{13}$C-NMR spectrum of this copolymer.

The ethylenic copolymer rubber according to the present invention, for example, ethylene/propylene/4,8-dimethyl-1, 4,8-decatriene copolymer rubber, reveals some twofold as high a cross-linking velocity as that of known ethylene/propylene/5-ethylidene-2-norbornene terpolymer rubber, permitting thereby reduction of the cross-linking time (vulcanization time), lowering of the cross-linking temperature (vulcanization temperature) or reduction of vulcanization accelerator. It reveals further a superior scorch stability.

The non-conjugated polyene (d) to be employed according to the present invention has carbon-to-carbon double bonds in the molecule, among which at least two, preferably two, are polymerizable double bond. By the polymerizable double bond is meant a double bond which can couple with ethylene or with an α-olefin to build up a polymer, as given previously in the description of the triene (c). Concrete exemplification of such a polymerizable double bond include the double bond present at the terminal end of a linear hydrocarbon, double bond of, for example, vinyl group or allyl group, and double bond which is present in the ring of a cycloaliphatic hydrocarbon but does not conjugate. The non-conjugated polyene (d) may have, in addition to the said at least two polymerizable double bonds, other unsaturation bonds which do not participate in the polymerization.

Concrete ones of the non-conjugated polyene (d) to be used according to the present invention include non-conjugated dienes having at least two polymerizable double bonds in the molecule, for example, 5-alkenyl-2-norbornenes, such as 5-vinyl-2-norbornene (VNB) and 5-allyl-2-norbornene; cycloaliphatic dienes, such as 2,5-norbornadiene (NBD), di-cyclopentadiene (DCPD) and tetracyclo[4.4.0.1$^{2,5}$.1$^{7,10}$]deca-3,8-diene; and aliphatic α,ω-dienes, such as 1,7-octadiene and 1,9-decadiene. Among them, 5-alkenyl-2-norbornenes, dicyclopentadiene, 2,5-norbornadiene and 1,7-octadiene are preferred, wherein special preference is given to 2,5-norbornadiene (NBD) and 5-alkenyl-2-norbornenes.

In the ethylenic copolymer rubber according to the present invention may comprise other comonomer(s) in a copolymerized form. For such other comonomer(s), there may be recited non-conjugated dienes other than the non-conjugated polyene (d), for example, non-conjugated dienes having only one polymerizable carbon-to-carbon double bond. Also exemplifiable are cycloolefins.

As the non-conjugated dienes other than the non-conjugated polyene (d), those in which only one carbon-to-carbon double bond is present at one terminal end of the molecule as a vinyl group (CH$_2$=CH—) and other carbon-to-carbon double bonds are present in the molecular chain (inclusive of the main chain and side chain) in a form of internal olefin structure are preferred. As the non-conjugated dienes having only one polymerizable carbon-to-carbon double bond in the molecule, there may be enumerated aliphatic dienes and alicyclic dienes having an alicyclic moiety which has one carbon-to-carbon double bond and a linear chain moiety which has internal olefinic bond (carbon-to-carbon double bond) are present. Among them, alicyclic dienes are preferred.

Concrete examples of the aliphatic dienes to be used as other comonomer(s) than the non-conjugated polyene (d) include 1,4-hexadiene, 1,6-octadiene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene and 9-methyl-1,8-undecadiene.

Concrete examples of the alicyclic dienes to be used as other comonomer than the non-conjugated polyene (d) include norbornene derivatives, such as 5-ethylidene-2-norbornene, 5-propylidene-2-norbornene and 5-butylidene-2-norbornene; and norbornadiene derivatives, such as 2-methyl-2,5-norbornadiene and 2-ethyl-2,5-norbornadiene. Among them, 5-ethylidene-2-norbornene is preferred.

The non-conjugated dienes to be used as other comonomer may be incorporated either solely or in a combination of two or more of them.

Concretely, as the cycloolefin to be used as other comonomer, there may be exemplified:

bicyclo[2.2.1]hept-2-ene or its derivative,
tetracyclo[4.4.0.1$^{2,5}$.1$^{7,10}$]-3-dodecene or its derivative,
hexacyclo[6.6.1.1$^{3,6}$.1$^{10,13}$.0$^{2,7}$.0$^{9,14}$]-4-heptadecene or its derivative,
octacyclo[8.8.0.1$^{2,9}$.1$^{4,7}$.1$^{11,18}$.1$^{13,16}$.0$^{3,8}$.0$^{12,17}$]-5-docosene or its derivative,
pentacyclo[6.6.1.1$^{3,6}$.0$^{2,7}$.0$^{9,14}$]-4-hexadecene or its derivative,
heptacyclo-5-eicosene or its derivative,
heptacyclo-5-heneicosene or its derivative,
tricyclo[4.3.0.1$^{2,5}$]-3-decene or its derivative,
tricyclo[4.4.0.1$^{2,5}$]-3-undecene or its derivative,
pentacyclo[6.5.1.1$^{3,6}$.0$^{2,7}$.0$^{9,13}$]-4-pentadecene or its derivative,
pentacyclopentadecadiene or its derivative,
pentacyclo[7.4.0.1$^{2,5}$.1$^{9,12}$.0$^{8,13}$]-3-pentadecene or its derivative,
heptacyclo[8.7.0.1$^{3,6}$.1$^{10,17}$.1$^{12,15}$.0$^{2,7}$.0$^{11,16}$]-4-eicosene or its derivative,
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene or its derivative,
pentacyclo[8.4.0.1$^{2,5}$.1$^{9,12}$.0$^{8,13}$]-3-hexadecene or its derivative,
heptacyclo[8.8.0.1$^{4,7}$.1$^{11,18}$.1$^{13,18}$.0$^{3,8}$.0$^{12,17}$]-5-heneicosene or its derivative,
nonacyclo[10.10.1.1$^{5,8}$.1$^{14,21}$.1$^{10,19}$.0$^{2,11}$.0$^{4,9}$. 0$^{13,22}$.0$^{15,20}$]-6-hexacosene or its derivative,
1,4-methano-1,4,4a,9a-tetrahydrofluorene or its derivative,
1,4-methano-1,4,4a,5,10,10a-hexahydroanthracene or its derivative and
cyclopentadiene-acenaphthylene adducts.

The cycloolefins can be produced by subjecting a cyclopentadiene and an olefin having corresponding molecular structure to Diels-Alder reaction.

These cycloolefins can be employed solely or in a combination of two or more of them.

The First and the Second Ethylenic Copolymer Rubbers

The first ethylenic copolymer rubber according to the present invention is an ethylene/α-olefin/triene copolymer rubber. If necessary, one or more non-conjugated polyenes (d) having in the molecule at least two polymerizable double bonds may be co-polymerized together.

In the first ethylenic copolymer rubber according to the present invention, the structural units derived from ethylene (a), from the α-olefin(s) having 3–20 carbon atoms (b) and from the triene(s) represented by the formula (1) given above (c) are bound together in a random arrangement. It is possessed of unsaturation bonds derived from the triene(s) (c) represented by the formula (1). The main chain of the first ethylenic copolymer rubber according to the present invention has substantially a linear structure. The fact that the first ethylenic copolymer rubber has substantially a linear structure and does not substantially contain a cross-linked gelled polymer can be confirmed by the fact that this copolymer dissolves in an organic solvent without exhibiting substantially any insoluble residue. For example, this can be ascertained by the fact that this copolymer dissolves completely in decalin at 135° C. on the determination of its intrinsic viscosity ($\eta$).

The structural unit derived from the triene (c) in the random copolymer rubber has substantially the structure represented by the formula (1').

(i) Ethylene/α-olefin Ratio

The first ethylenic copolymer rubber according to the present invention has a mole ratio of the structural unit derived from ethylene (a) versus the structural unit derived from the α-olefin(s) (b), namely, (ethylene)/(α-olefin(s)), in the range from 95/5 to 40/60, preferably from 90/10 to 50/50, more preferably from 85/15 to 55/45, especially preferably from 85/15 to 60/40. When this mole ratio is in the above range, a cross-linked molded rubber product for sealing (vulcanized molded rubber product for sealing) superior in the mechanical strength with superior flexibility can be obtained.

(ii) Intrinsic Viscosity ($\eta$)

The first ethylenic copolymer rubber according to the present invention has an intrinsic viscosity ($\eta$) determined in decalin (decahydronaphthalene) at 135° C. in the range from 0.1 to 10 dl/g, preferably from 0.5 to 5 dl/g, more preferably from 0.7 to 4.0 dl/g. When the intrisic viscosity ($\eta$) is in the above-mentioned range, a vulcanized molded rubber product for sealing exhibiting a better balance between the workability and the strength can be obtained.

(iii) Content of the Triene(s) (c)

The first ethylenic copolymer rubber according to the present invention has a content of the structural unit derived from the triene(s) (c) represented by the formula (1) in the range from 0.1 to 10 mole %, preferably from 0.5 to 7 mole %, more preferably from 1 to 5 mole %. When the content of the structural unit derived from the triene(s) (c) is in the range mentioned above, the resulting ethylenic copolymer rubber exhibits a higher vulcanization velocity and a superior scorch stability.

The structural unit derived from the triene (c) in the first ethylenic copolymer rubber according to the present invention has a structure which is represented substantially by the formula (1') given above. The fact that the structural unit derived from the triene (c) has the structure represented by the formula (1') can be confirmed by detecting $^{13}C$-NMR spectrum of the first ethylenic copolymer rubber.

The first ethylenic copolymer rubber according to the present invention may have, co-polymerized therein, in addition to ethylene (a), the α-olefin(s) having 3–20 carbon atoms (b) and the triene(s) (c), other compound(s) capable of co-polymerizing with these comonomers, as other comonomer(s). For such other comonomer(s), there may be exemplified the non-conjugated polyenes (d), non-conjugated dienes and cyclic olefins. The content of the structural unit derived from the non-conjugated polyene(s) (d) {in the following, denoted sometimes simply as "the content of non-conjugated polyene (d)"} may favorably be in the range from 0.02 to 3 mole %, preferably from 0.05 to 2.5 mole %, more preferably from 0.1 to 2.0 mole %. When the content of non-conjugated polyene (d) is in the above range, a superior workability on the extrusion can be attained with exclusion of formation of gelled cross-linked polymer. In addition, longer-chain branch is brought about, whereby the formability is increased. The content of the structural units derived from the said other comonomer(s) in the first ethylenic copolymer rubber according to the present invention may favorably be 30 mole % or less, preferably in the range from 0.5 to 10 mole %, based on the total moles of the entire structural units derived from all the comonomers. By co-polymerizing the non-conjugated polyene(s) (d) and/or the non-conjugated diene(s), adjustment of cross-linking velocity can be attained.

(iv) g'

The value g' is defined by the ratio of the intrinsic viscosity ($\eta$) detected in the manner as described in the above paragraph (ii) versus the converted intrinsic viscosity $(\eta)_{blank}'$ converted into the intrinsic viscosity of a linear ethylene/propylene copolymer (EPR) having an ethylene content of 70 mole % determined by gel permeation chromatography (GPC, 140° C., solvent: o-dichlorobenzene) of the first ethylenic copolymer rubber, nemely $(\eta)/(\eta)_{blank}'$. The $(\eta)_{blank}'$ value is determined in the manner as follows:

First, GPC of the first ethylenic copolymer rubber is carried out to obtain each molecular weight of each fraction converted into the molecular weight of corresponding polystyrene $Mi_{PSt}$.

Then, this $Mi_{PSt}$ is converted into the molecular weight of corresponding EPR, i.e. $Mi_{EPR}$, by calculating the equations $$(\eta)i_{PSt} \cdot Mi_{PSt} = (\eta)i_{EPR} \cdot Mi_{EPR},$$

$$(\eta)i_{PSt} = 1.37 \times \{10^{-4} \cdot Mi_{PSt}^{0.686}\}$$

$$(\eta)i_{EPR} = 7.2 \times \{10^{-4} \cdot Mi_{EPR}^{0.667}\}$$

Then, the converted $Mi_{EPR}$ is further converted into $(\eta)_{blank}'$ for each specific fraction by the equation (II)

$$(\eta)i_{blank}' = 7.2 \times \{10^{-4} \cdot Mi_{EPR}^{0.667}\} \tag{II}$$

Here, "i" represents each specific fraction number in the fractionation by GPC. From the so-converted $(\eta)i_{blank}'$, $(\eta)_{blank}'$ is calculated by the following equation (III)

$$(\eta)_{blank}' = \Sigma \omega i \cdot (\eta) i_{blank}' / \Sigma \omega i \tag{III}$$

Here, $\omega$ represents the weight proportion.

By calculating the ratio of the so-calculated $(\eta)_{blank}'$ versus ($\eta$), the value g' is determined.

The g' value $\{=(\eta)/(\eta)_{blank}'\}$ for the first ethylenic copolymer rubber is in the range from 0.5 to 0.95, preferably from 0.7 to 0.90.

A g' value of the first ethylenic copolymer rubber according to the present invention not higher than 0.95 indicates presence of long chain branch in the molecule. The first ethylenic copolymer rubber such as above has a characteristic feature that it exhibits lower tenacity under higher shearing rates on working by, such as kneading and molding, and higher tenacity under lower shearing velocity after molding but before the cross-linking (vulcanization). Therefore, the first ethylenic copolymer rubber having such a g' value as above is superior in the workability on kneading, molding and so on and can be formed into cross-linked molded products for sealing which are superior, after the cross linking, in the ability of preserving the form before the cross linking.

The second ethylenic copolymer rubber according to the present invention is the same as the first ethylenic copolymer rubber except that the restriction of g' value is excluded and that the complex viscosity coefficient ($\eta^*_A$) at 8 rad/sec and the ratio of this ($\eta^*_A$) and the complex viscosity coefficient ($\eta^*_B$) at 0.01 rad/sec, namely, ($\eta^*_B$)/($\eta^*_A$), are limited both specifically.

(v) ($\eta^*_A$) and the ratio ($\eta^*_B$)/($\eta^*_A$)

The second ethylenic copolymer rubber according to the present invention has a characteristic feature that the complex viscosity coefficient ($\eta^*_A$) at 8 rad/sec in the assessment of dependence of the complex viscosity coefficient ($\eta^*$) on frequency estimated from the kinematic viscoelasticity at 190° C. is at least $2 \times 10^3$ Pa.S and the ratio of the complex viscosity coefficient ($\eta^*_B$) at 0.01 rad/sec versus the complex viscosity coefficient ($\eta^*_A$), namely, ($\eta^*_B$)/($\eta^*_A$), is at least 35; preferably ($\eta^*_A$) is in the range from $2 \times 10^3$ to $2 \times 10^5$ Pa.S and ($\eta^*_B$)/($\eta^*_A$) is in the range from 35 to 300; more preferably ($\eta^*_A$) is in the range from $2 \times 10^3$ to $2 \times 10^5$ Pa.S and ($\eta^*_B$)/($\eta^*_A$) is in the range from 35 to 250.

The second ethylenic copolymer rubber according to the present invention has, thus, the ($\eta^*_A$) value and the ratio ($\eta^*_B$)/($\eta^*_A$) within the limitations as given above and exhibits a characteristic feature that it exhibits lower tenacity under higher shearing rates on working by, such as kneading and molding, and higher tenacity under lower shearing velocity after molding but before the cross linking (vulcanization). Therefore, the second ethylenic copolymer rubber according to the present invention is superior in the workability on kneading, molding and so on and can be formed into cross-linked molded products for sealing which are superior, after the cross linking, in the ability of preserving the form before the cross linking. For performing cross linking of the second ethylenic copolymer rubber according to the present invention, such a condition as to increase the compounding temperature can be employed by using a UHF vulcanization vessel, so that a high speed molding and a high performance foaming can be realized. In addition, the resulting products do scarcely suffer from distortion.

The complex viscosity coefficient ($\eta^*_A$) at 8 rad/sec is a value nearly corresponding to Mooney viscosity. The ratio ($\eta^*_B$)/($\eta^*_A$) is a parameter indicating the degree of branching in the ethylenic copolymer rubber, in which the greater this ratio is, the more superior will be the resulting spongy rubber product in the form preservability. By the way, for the case where the ethylenic copolymer rubber is oil-extended, the ratio ($\eta^*_B$)/($\eta^*_A$) should be modified into {($\eta^*_B$)/($\eta^*_A$)}/{(1−$A_{oil}$)/(100+$A_{oil}$1)} in which $A_{oil}$ (amount of extending oil) denotes the amount of the softener in part by weight, per 100 parts by weight of the ethylenic copolymer rubber.

The first and the second ethylenic copolymer rubbers according to the present invention can be produced by a random copolymerization of ethylene (a), the α-olefin(s) having 3–20 carbon atoms (b), the triene(s) (c) and, if necessary, other comonomer(s), such as the non-conjugated polyene(s) (d), in the presence of a catalyst, preferably a metallocene catalyst.

As the catalyst, one constituted of a compound of a transition metal (e) of, such as vanadium (V), zirconium (Zr) or titanium (Ti), and an organoaluminum compound (f) and/or an ionizing ionic compound (g) may be employed.

Concrete examples of the catalyst include
(1) a titanium-based catalyst composed of a solid titaniferous catalyst component (e-1) and an organoaluminum compound (f-1),
(2) a vanadium-based catalyst composed of a soluble vanadium compound (e-2) and an organoaluminum compound (f-1) and
(3) a metallocene catalyst containing a metallocene (e-3), preferably a metallocene (e-3) of a transition metal selected from Group 4 of the periodic table and an organic aluminum-oxy compound (f-2) and/or an ionizing ionic compound (g-1) which will build up an ion pair by reacting with the metallocene (e-3).

Among them, the metallocene catalyst is preferred.

As the metallocene (e-3), one represented by the following formula (3) may be used.

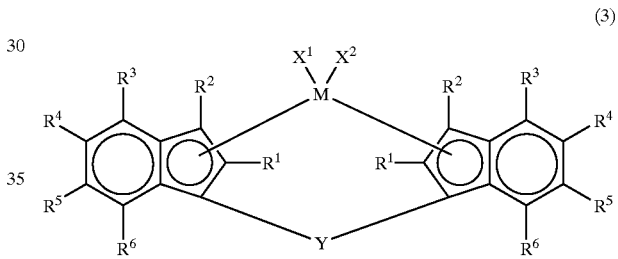

(3)

In the above formula (3), M denotes a transition metal atom of Group IVB of the periodic table, which may concretely be titanium, zirconium or hafnium, especially preferably zirconium.

$R^1$ is a hydrocarbyl having 1–6 carbon atoms, wherefor concretely an alkyl, such as methyl, ethyl, n-propyl, iso-propyl, n-butyl, iso-butyl, sec-butyl, tert-butyl, n-pentyl, neopentyl, n-hexyl or cyclohexyl; and an alkenyl, such as vinyl or propenyl, may be exemplified. Among them, alkyls in which the carbon atom bound to indenyl group is primary one are preferred and alkyls of 1–4 carbon atoms are more preferred, especially methyl and ethyl.

$R^2$, $R^4$, $R^5$ and $R^6$ may be identical with or different from each other and stand each for hydrogen atom, a halogen atom or a hydrocarbyl of 1–6 carbon atoms as given for the group $R^1$ above. The halogen atom is fluorine, chlorine, bromine or idine.

$R^3$ is an aryl group of 6–16 carbon atoms. This aryl group may be substituted by, for example, the above-mentioned halogen atom(s), hydrocarbyl(s) of 1–20 carbon atoms and/or organic silyl group(s). Concretely, as the aryl group, there may be enumerated, for example, phenyl, α-naphthyl, β-naphthyl, anthracenyl, phenanthryl, pyrenyl acenaphthyl, phenalenyl, aceanthrylenyl, tetrahydronaphthyl, indanyl and biphenylyl. Among them, phenyl, naphthyl, anthracenyl and phenanthryl are preferred.

As the hydrocarbyl of 1–20 carbon atoms which is the substituent of the above aryl group, there may be enumerated, for example, alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; aralkyl groups, such as benzyl, phenylethyl and phenylpropyl; and aryl groups of 6–20 carbon atoms, such as aryl groups as exemplified for the group $R^3$, tolyl, dimethylphenyl, trimethylphenyl, ethylphenyl, propylphenyl, methylnaphthyl and benzylphenyl.

As the organosilyl groups, there may be exemplified trimethylsilyl, triethylsilyl and triphenylsilyl.

$X^1$ and $X^2$ may be identical with or different from each other and may stand each for hydrogen atom, a halogen atom, a hydrocarbyl of 1–20 carbon atoms which may be substituted by halogen atom(s) as given above, an oxygen-containing group or a sulfur-containing group.

As the oxygen-containing group, there may be recited concretely, for example, hydroxy; alkoxy groups having 1–20 carbon atoms, such as, methoxy, ethoxy, propoxy and butoxy; aryloxy groups, such as, phenoxy, methylphenoxy, dimethylphenoxy and naphthoxy; and aryl-($C_1$–$C_{20}$)alkoxy groups, such as, phenylmethoxy and phenylethoxy.

As the sulfur-containing groups, there may be enumerated concretely those in which oxygen atom of the above-mentioned oxygen-containing groups is replaced by sulfur; sulfonyloxy groups, such as methylsulfonyloxy, trifluoromethanesulfonyloxy, phenylsulfonyloxy, benzylsulfonyloxy, p-toluenesulfonyloxy, trimethylbenzenesulfonyloxy, triisobutylbenzenesulfonyloxy, p-chlorobenzenesulfonyloxy and pentafluorobenzenesulfonyloxy; and sulfonyl groups, such as methylsulfonyl, phenylsulfonyl, benzenesulfonyl, p-toluenesulfonyl, trimethylbenzenesulfonyl and pentafluorobenzenesulfonyl.

$X^1$ and $X^2$ may each preferably stand for, among them, a halogen atom or a hydrocarbyl of 1–20 carbon atoms.

Y denotes a divalent hydrocarbyl having 1–20 carbon atoms, a divalent halogenated hydrocarbyl having 1–20 carbon atoms, a divalent silicium-containing group, a divalent germanium-containing group, the group —O—, —CO—, —S—, —SO—, —SO$_2$—, —NR$^7$—, —P(R$^7$)—, —P(O)(R$^7$)—, —BR$^7$— or —AlR$^7$—, with $R^7$ being hydrogen atom, a halogen atom, a hydrocarbyl having 1–20 carbon atoms or a hydrocarbyl substituted by one or more halogen atoms and having 1–20 carbon atoms. Concretely, Y stands for alkylenes, such as methylene, dimethylmethylene, ethylene, dimethylethylene, trimethylene, tetramethylene and 1,2-cyclohexylene; alkylidenes, such as cyclohexylidene; divalent hydrocarbyls having 1–20 carbon atoms, for example, arylalkylenes, such as diphenylmethylene and diphenylethylene; divalent halogenated hydrocarbyls obtained by halogenating the above divalent hydrocarbyls having 1–20 carbon atoms, for example, chloromethylene; silicium-containing divalent groups, for example, alkylsilylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; alkylarylsilylenes; arylsilylenes; alkyldisilyls, such as tetrametyl-1,2-disilyl and tetraphenyl-1,2-disilyl; alkylaryldisilyls; aryldisilyls; and germanium-containing divalent groups, in which the silicium in the above silicium-containing divalent groups is replaced by germanium.

Among them, the silicium-containing divalent groups and the germanium-containing divalent groups are preferred, wherein further preference is given to the silicium-containing divalent groups, with special preference to alkylsilylenes, alkylarylsilylenes and arylsilylenes.

In the following, concrete examples of the metallocene represented by the formula (3) are given:

rac-dimethylsilylene-bis(2-methyl-4-phenyl-1-indenyl)-zirconium dichloride,
rac-dimethylsilylene-bis{2-methyl-4-(α-naphthyl)-1-indenyl}zirconium dichloride,
rac-dimethylsilylene-bis{2-methyl-4-(β-naphthyl)-1-indenyl}zirconium dichloride,
rac-dimethylsilylene-bis{2-methyl-4-(1-anthracenyl)-1-indenyl}zirconium dichloride,
rac-dimethylsilylene-bis{2-methyl-4-(2-anthracenyl)-1-indenyl}zirconium dichloride,
rac-dimethylsilylene-bis{2-methyl-4-(9-anthracenyl)-1-indenyl}zirconium dichloride,
rac-dimethylsilylene-bis{2-methyl-4-(9-phenanthryl)-1-indenyl}zirconium dichloride,
rac-dimethylsilylene-bis{2-methyl-4-(p-fluorophenyl)-1-indenyl}zirconium dichloride,
rac-dimethylsilylene-bis{2-methyl-4-(pentafluorophenyl)-1-indenyl}zirconium dichloride,
rac-dimethylsilylene-bis{2-methyl-4-(p-chlorophenyl)-1-indenyl}zirconium dichloride,
rac-dimethylsilylene-bis{2-methyl-4-(m-chlorophenyl )-1-indenyl}zirconium dichloride,
rac-dimethylsilylene-bis{2-methyl-4-(o-chlorophenyl)-1-indenyl}zirconium dichloride,
rac-dimethylsilylene-bis{2-methyl-4-(2,4-dichlorophenyl)-phenyl-1-indenyl}zirconium dichloride,
rac-dimethylsilylene-bis{2-methyl-4-(p-bromophenyl)-1-indenyl}zirconium dichloride,
rac-dimethylsilylene-bis{2-methyl-4-(p-tolyl)-1-indenyl}-zirconium dichloride,
rac-dimethylsilylene-bis{2-methyl-4-(m-tolyl)-1-indenyl}-zirconium dichloride,
rac-dimethylsilylene-bis{2-methyl-4-(o-tolyl)-1-indenyl}-zirconium dichloride,
rac-dimethylsilylene-bis{2-methyl-4-(2,6-dimethylphenyl)-1-indenyl}zirconium dichloride,
rac-dimethylsilylene-bis{2-methyl-4-(p-ethylphenyl)-1-indenyl}zirconium dichloride,
rac-dimethylsilylene-bis{2-methyl-4-(p-isopropylphenyl)-1-indenyl}zirconium dichloride,
rac-dimethylsilylene-bis{2-methyl-4-(p-benzylphenyl)-1-indenyl}zirconium dichloride,
rac-dimethylsilylene-bis{2-methyl-4-(p-biphenyl)-1-indenyl}zirconium dichloride,
rac-dimethylsilylene-bis{2-methyl-4-(m-biphenyl)-1-indenyl}zirconium dichloride,
rac-dimethylsilylene-bis{2-methyl-4-(p-trimethylsilylphenyl)-1-indenyl}zirconium dichloride,
rac-dimethylsilylene-bis{2-methyl-4-(m-trimethylsilylphenyl)-1-indenyl}zirconium dichloride,
rac-dimethylsilylene-bis(2-phenyl-4-phenyl-1-indenyl)-zirconium dichloride,
rac-diethylsilylene-bis(2-methyl-4-phenyl-1-indenyl)}-zirconium dichloride,
rac-di(isopropyl)silylene-bis(2-methyl-4-phenyl-1-indenyl) zirconium dichloride,
rac-di(n-butyl)silylene-bis(2-methyl-4-phenyl-1-indenyl) zirconium dichloride,
rac-dicyclohexylsilylene-bis(2-methyl-4-phenyl-1-indenyl) zirconium dichloride,
rac-methylphenylsilylene-bis(2-methyl-4-phenyl-1-indenyl) zirconium dichloride,
rac-diphenylsilylene-bis(2-methyl-4-phenyl-1-indenyl)-zirconium dichloride, rac-di(p-tolyl)silylene-bis(2-methyl-4-phenyl-1-indenyl) zirconium dichloride,
rac-di(p-chlorophenyl)silylene-bis(2-methyl-4-phenyl-1-indenyl)zirconium dichloride,
rac-methylene-bis(2-methyl-4-phenyl-1-indenyl)zirconium dichloride,
rac-ethylene-bis(2-methyl-4-phenyl-1-indenyl)zirconium dichloride,
rac-dimethylgermylene-bis(2-methyl-4-phenyl-1-indenyl)-zirconium dichloride,
rac-dimethylstannylene-bis(2-methyl-4-phenyl-1-indenyl)-zirconium dichloride,
rac-dimethylsilylene-bis(2-methyl-4-phenyl-1-indenyl)-zirconium dibromide,
rac-dimethylsilylene-bis(2-methyl-4-phenyl-1-indenyl)-zirconiumdimethyl,
rac-dimethylsilylene-bis(2-methyl-4-phenyl-1-indenyl)-zirconiummethyl chloride,
rac-dimethylsilylene-bis(2-methyl-4-phenyl-1-indenyl)-zirconium chloride $SO_2CH_3$,
rac-dimethylsilylene-bis(2-methyl-4-phenyl-1-indenyl)-zirconium chloride $OSO_2CH_3$,
rac-dimethylsilylene-bis(2-ethyl-4-phenyl-1-indenyl)-zirconium dichloride,
rac-dimethylsilylene-bis{2-ethyl-4-(α-naphthyl)-1-indenyl}zirconium dichloride,
rac-dimethylsilylene-bis{2-ethyl-4-(β-naphthyl)-1-indenyl}zirconium dichloride,
rac-dimethylsilylene-bis{2-ethyl-4-(2-methyl-1-naphthyl)-1-indenyl}zirconium dichloride,
rac-dimethylsilylene-bis{2-ethyl-4-(5-acenaphthyl)-1-indenyl}zirconium dichloride,
rac-dimethylsilylene-bis{2-ethyl-4-(9-anthracenyl)-1-indenyl}zirconium dichloride,
rac-dimethylsilylene-bis{2-ethyl-4-(9-phenanthryl)-1-indenyl}zirconium dichloride,
rac-dimethylsilylene-bis{2-ethyl-4-(o-methylphenyl)-1-indenyl})zirconium dichloride,
rac-dimethylsilylene-bis{2-ethyl-4-(m-methylphenyl)-1-indenyl}zirconium dichloride,
rac-dimethylsilylene-bis{2-ethyl-4-(p-methylphenyl)-1-indenyl}zirconium dichloride,
rac-dimethylsilylene-bis{2-ethyl-4-(2,3-dimethylphenyl)-1-indenyl}zirconium dichloride,
rac-dimethylsilylene-bis{2-ethyl-4-(2,4-dimethylphenyl)-1-indenyl}zirconium dichloride,
rac-dimethylsilylene-bis{2-ethyl-4-(2,5-dimethylphenyl)-1-indenyl}zirconium dichloride,
rac-dimethylsilylene-bis{2-ethyl-4-(2,4,6-trimethylphenyl)-1-indenyl}zirconium dichloride,
rac-dimethylsilylene-bis{2-ethyl-4-(o-chlorophenyl)-1-indenyl}zirconium dichloride,
rac-dimethylsilylene-bis{2-ethyl-4-(m-chlorophenyl)-1-indenyl}zirconium dichloride,
rac-dimethylsilylene-bis{2-ethyl-4-(p-chlorophenyl)-1-indenyl}zirconium dichloride,
rac-dimethylsilylene-bis{2-ethyl-4-(2,3-dichlorophenyl)-1-indenyl}zirconium dichloride,
rac-dimethylsilylene-bis{2-ethyl-4-(2,6-dichlorophenyl)-1-indenyl}zirconium dichloride,
rac-dimethylsilylene-bis{2-ethyl-4-(3,5-dichlorophenyl)-1-indenyl})zirconium dichloride,
rac-dimethylsilylene-bis{2-ethyl-4-(2-bromophenyl)-1-indenyl}zirconium dichloride,
rac-dimethylsilylene-bis{2-ethyl-4-(3-bromophenyl)-1-indenyl}zirconium dichloride,
rac-dimethylsilylene-bis{2-ethyl-4-(4-bromophenyl)-1-indenyl}zirconium dichloride,
rac-dimethylsilylene-bis{2-ethyl-4-(4-biphenyl)-1-indenyl}zirconium dichloride,
rac-dimethylsilylene-bis{2-ethyl-4-(4-trimethylsilylphenyl)-1-indenyl}zirconium dichloride,
rac-dimethylsilylene-bis(2-n-propyl-4-phenyl-1-indenyl)-zirconium dichloride,
rac-dimethylsilylene-bis{2-n-propyl-4-(α-naphthyl)-1-indenyl}zirconium dichloride,
rac-dimethylsilylene-bis{2-n-propyl-4-(β-naphthyl)-1-indenyl}zirconium dichloride,
rac-dimethylsilylene-bis{2-n-propyl-4-(2-methyl-1-naphthyl)-1-indenyl}zirconium dichloride,
rac-dimethylsilylene-bis{2-n-propyl-4-(5-acenaphthyl)-1-indenyl}zirconium dichloride,
rac-dimethylsilylene-bis{2-n-propyl-4-(9-anthracenyl)-1-indenyl}zirconium dichloride,
rac-dimethylsilylene-bis{2-n-propyl-4-(9-phenanthryl)-1-indenyl}zirconium dichloride,
rac-dimethylsilylene-bis(2-isopropyl-4-phenyl-1-indenyl) zirconium dichloride,
rac-dimethylsilylene-bis{2-isopropyl-4-(α-naphthyl)-1-indenyl}zirconium dichloride,
rac-dimethylsilylene-bis{2-isopropyl-4-(β-naphthyl)-1-indenyl}zirconium dichloride,
rac-dimethylsilylene-bis{2-isopropyl-4-(8-methyl-9-naphthyl)-1-indenyl}zirconium dichloride,
rac-dimethylsilylene-bis{2-isopropyl-4-(5-acenaphthyl)-1-indenyl}zirconium dichloride,
rac-dimethylsilylene-bis{2-isopropyl-4-(9-anthracenyl)-1-indenyl}zirconium dichloride,
rac-dimethylsilylene-bis{2-isopropyl-4-(9-phenanthryl)-1-indenyl}zirconium dichloride,
rac-dimethylsilylene-bis(2-s-butyl-4-phenyl-1-indenyl) zirconium dichloride,
rac-dimethylsilylene-bis{2-s-butyl-4-(α-naphthyl)-1-indenyl)zirconium dichloride,
rac-dimethylsilylene-bis{2-s-butyl-4-(β-naphthyl)-1-indenyl}zirconium dichloride,
rac-dimethylsilylene-bis{2-s-butyl-4-(2-methyl-1-naphthyl)-1-indenyl}zirconium dichloride,
rac-dimethylsilylene-bis{2-s-butyl-4-(5-acenaphthyl)-1-indenyl}zirconium dichloride,
rac-dimethylsilylene-bis{2-s-butyl-4-(9-anthracenyl)-1-indenyl}zirconium dichloride,
rac-dimethylsilylene-bis{2-s-butyl-4-(9-phenanthryl)-1-indenyl}zirconium dichloride,
rac-dimethylsilylene-bis(2-n-pentyl-4-phenyl-1-indenyl) zirconium dichloride,
rac-dimethylsilylene-bis{2-n-pentyl-4-(α-naphthyl)-1-indenyl}zirconium dichloride,
rac-dimethylsilylene-bis(2-n-butyl-4-phenyl-1-indenyl)-zirconium dichloride,
rac-dimethylsilylene-bis{2-n-butyl-4-(α-naphthyl)-1-indenyl}zirconium dichloride,
rac-dimethylsilylene-bis{2-n-butyl-4-(β-naphthyl)-1-indenyl}zirconium dichloride,
rac-dimethylsilylene-bis{2-n-butyl-4-(2-methyl-1-naphthyl)-1-indenyl}zirconium dichloride,
rac-dimethylsilylene-bis{2-n-butyl-4-(5-acenaphthyl)-1-indenyl}zirconium dichloride,
rac-dimethylsilylene-bis{2-n-butyl-4-(9-anthracenyl)-1-indenyl}zirconium dichloride,
rac-dimethylsilylene-bis{2-n-butyl-4-(9-phenanthryl)-1-indenyl}zirconium dichloride,
rac-dimethylsilylene-bis(2-isobutyl-4-phenyl-1-indenyl) zirconium dichloride,
rac-dimethylsilylene-bis{2-isobutyl-4-(α-naphthyl)-1-indenyl}zirconium dichloride, rac-dimethylsilylene-bis{2-isobutyl-4-(β-naphthyl)-1-indenyl}zirconium dichloride,
rac-dimethylsilylene-bis{2-isobutyl-4-(2-methyl-1-naphthyl)-1-indenyl}zirconium dichloride,
rac-dimethylsilylene-bis{2-isobutyl-4-(5-acenaphthyl)-1-indenyl}zirconium dichloride,
rac-dimethylsilylene-bis{2-isobutyl-4-(9-anthracenyl)-1-indenyl}zirconium dichloride,
rac-dimethylsilylene-bis{2-isobutyl-4-(9-phenanthryl)-1-indenyl}zirconium dichloride,
rac-dimethylsilylene-bis(2-neopentyl-4-phenyl-1-indenyl)zirconium dichloride,
rac-dimethylsilylene-bis{2-neopentyl-4-(α-naphthyl)-1-indenyl}zirconium dichloride,
rac-dimethylsilylene-bis(2-n-hexyl-4-phenyl-1-indenyl)zirconium dichloride,
rac-dimethylsilylene-bis{2-n-hexyl-4-(α-naphthyl)-1-indenyl}zirconium dichloride,
rac-methylphenylsilylene-bis(2-ethyl-4-phenyl-1-indenyl)zirconium dichloride,
rac-methylphenylsilylene-bis{2-ethyl-4-(α-naphthyl)-1-indenyl}zirconium dichloride,
rac-methylphenylsilylene-bis{2-ethyl-4-(9-anthracenyl)-1-indenyl}zirconium dichloride,
rac-methylphenylsilylene-bis{2-ethyl-4-(9-phenanthryl)-1-indenyl}zirconium dichloride,
rac-diphenylsilylene-bis(2-ethyl-4-phenyl-1-indenyl)zirconium dichloride,
rac-diphenylsilylene-bis{2-ethyl-4-(α-naphthyl)-1-indenyl}zirconium dichloride,
rac-diphenylsilylene-bis{2-ethyl-4-(9-anthracenyl)-1-indenyl}zirconium dichloride,
rac-diphenylsilylene-bis{2-ethyl-4-(9-phenanthryl)-1-indenyl}zirconium dichloride,
rac-diphenylsilylene-bis{2-ethyl-4-(4-biphenyl)-1-indenyl}zirconium dichloride,
rac-methylene-bis(2-ethyl-4-phenyl-1-indenyl)zirconium dichloride,
rac-methylene-bis{2-ethyl-4-(α-naphthyl)-1-indenyl}zirconium dichloride,
rac-ethylene-bis(2-ethyl-4-phenyl-1-indenyl)zirconium dichloride,
rac-ethylene-bis{2-ethyl-4-(α-naphthyl)-1-indenyl}zirconium dichloride,
rac-ethylene-bis{2-n-propyl-4-(α-naphthyl)-1-indenyl}zirconium dichloride,
rac-dimethylgermyl-bis(2-ethyl-4-phenyl-1-indenyl)zirconium dichloride,
rac-dimethylgermyl-bis{2-ethyl-4-(α-naphthyl)-1-indenyl}zirconium dichloride,
rac-dimethylgermyl-bis(2-n-propyl-4-phenyl-1-indenyl)zirconium dichloride and so on.

Further, compounds in which zirconium in the above metallocenes is replaced by titanium or hafnium may also be enumerated.

According to the present invention, usually racemates of the metallocenes are used, though use of R-compounds or S-compounds may be permitted.

According to the present invention, the metallocenes (e-3) may be used in a combination of two or more of them.

These metallocenes (e-3) can be produced in accordance with the disclosures of, for example, Journal of Organometallic Chem., 288, 63–67, (1985) and EP Laid-Open Patent Application No. 0,320,762.

The organoaluminum-oxy compounds (f-2) to be used for preparing the metallocene catalyst may be aluminoxanes known per se or the benzene-insoluble organoaluminum-oxy compounds exemplified in Japanese Patent Kokai Hei 2-78687.

The aluminoxanes known per se can be prepared, for example, by the methods given below:

(1) A method in which an organoaluminum compound, such as trialkylaluminum, is added to a suspension of a salt which contains adsorbed moisture or has water of cristallization, such as hydrated salt of magnesium chloride, copper sulfate, aluminum sulfate, nickel sulfate or cerous chloride, in a hydrocarbon solvent, to cause a reaction so as to recover it as a solution in the hydrocarbon.

(2) A method in which an organoaluminum compound, such as trialkylaluminum, is reacted directly with water, ice or steam in a medium, such as benzene, toluene, ethyl ether or tetrahydrofuran, to recover it as a solution in the hydrocarbon.

(3) A method in which an organoaluminum compound, such as trialkylaluminum, is reacted with an organotin oxide, such as dimethyltin oxide or dibutyltin oxide, in a medium, such as decane, benzene or toluene.

These aluminoxanes may contain a small amount of organometallic component(s). They may be re-dissolved in a solvent, after the reaction solvent or the unreacted organoaluminum compound has been removed from the recovered aluminoxane solution by distillation.

As the organoaluminum compound to be employed for preparing the aluminoxane, there may concretely be enumerated, for example, trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum; tricycloalkylaluminums, such as tricyclohexylaluminum and tricyclooctylaluminum; dialkylaluminum halides, such as dimethylaluminum chloride, diethylaluminum chloride, diethylaluminum bromide and diisobutylaluminum chloride; dialkylaluminum hydride, such as diethylaluminum hydride and diisobutylaluminum hydride; dialkylaluminum alkoxide, such as dimethylaluminum methoxide and diethylaluminum ethoxide; and dialkylaluminum aryloxide, such as diethylaluminum phenoxide. Among them, trialkylaluminums and tricycloalkylaluminums are especially preferred.

It is possible to employ as the organoaluminum compound to be incorporated in the production of the aluminoxane an isoprenylaluminum represented by the formula $(i\text{-}C_4H_9)_xAl_y(C_5H_{10})_z$, with x, y, z being a positive integer and $\geq 2x$.

It is permissible to use the organoaluminum compounds given above also in a combination of two or more of them.

As the solvent used in the preparation of the aluminoxane, there may be exemplified aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; hydrocarbons of petroleum cut fractions, such as gasoline, kerosene and light oil; and halogenated hydrocarbons, such as, above all, chlorinated or brominated products of the aromatic, aliphatic and alicyclic hydrocarbons given above. Further, ethers, such as ethyl ether and tetrahydrofuran may also be used. Among these solvents, especially aromatic hydrocarbons are preferred.

For the ionized ionic compound (g-1) to be reacted with the metallocene (e-3) to build up an ion pair, there may be exemplified Lewis acids, ionic compounds, boranes and carboranes as given in the literatures, for example, Japanese Patent Kohyos Hei 1-501950 (corresponding to International Publication WO 88/05792) and Hei 1-502036 (corresponding to International Publication WO 90/04899), Japanese Patent Kokais Hei-3-179005 (corresponding to U.S. Pat. Nos. 5,561,092, 5,763,549, 5,807,939 and 5,883,202), Hei-3-179006 (corresponding to U.S. Pat. No. 5,443,613), Hei-3-207703 (corresponding to U.S. Pat. Nos. 5,387,568 and 5,663,249), Hei-3-207704 (corresponding to U.S. Pat. Nos. 5,519,100 and 5,614,457) and U.S. Pat. No. 547,718.

As the Lewis acids, magnesium-containing Lewis acids, aluminum-containing Lewis acids and boron-containing Lewis acids are enumerated. Among them, boron-containing Lewis acids are preferred. For the boron-containing Lewis acids, concretely, those which are represented by the formula $$BR^8R^9R^{10}$$

may be exemplified, wherein $R^8$, $R^9$ and $R^{10}$ represent each, independently of each other, a phenyl group which may have substituent group(s), such as fluorine, methyl and trifluorophenyl, or a fluorine atom.

As the boron-containing Lewis acids expressed by the above formula, concretely, there may be recited, for example, trifluoroboron, triphenylboron, tris(4-fluorophenyl)boron, tris(3,5-difluorophenyl)boron, tris-(4-fluoromethylphenyl)boron and tris(pentafluorophenyl)boron, tris(p-tolyl)boron, tris(o-tolyl)boron and tris(3,5-dimethylphenyl)boron. Among them, in particular, tris(pentafluorophenyl)boron is preferred.

The ionic compound is a salt composed of a cationic component and an anionic component. An anion functions to stabilize the transition metal cation by building up an ion pair by reacting with the metallocene (e-3) to cationize the metellocene (e-3). For such an anion, anions of organoboron, organoarsene, organoaluminum and so on are enumerated, wherein an anion of relatively bulky geometry permitting to stabilize transition metal cation is preferred. For the cation, there may be enumerated, for example, matal cations, organometallic cations, carbonium cations, tripium cations, oxonium cations, sulfonium cations, phosphonium cations and ammonium cation. Concretely, there may be exemplified triphenylcarbenium cation, tributylammonium cation, N,N-dimethylammonium cation and ferrocenium cations.

As the ionic compounds, those comprising organoboron anion are preferred. Concretely, there may be enumerated, for example, trialkyl-substituted ammonium salts, such as triethylammonium tetra(phenyl)borate, tripropylammonium tetra(phenyl)borate, tri(n-butyl)ammonium tetra(phenyl)borate, trimethylammonium tetra(p-tolyl)borate, trimethylammonium tetra(o-tolyl)borate, tributylammonium tetra(pentafluorophenyl)borate, tripropylammonium tetra(2,4-dimethylphenyl)borate, tributylammonium tetra(3,5-dimethylphenyl)borate, tributylammonium tetra(p-trifluoromethylphenyl)borate, tri(n-butyl)ammonium tetra(o-tolyl)borate and tri(n-butyl)ammonium tetra(4-fluorophenyl)borate; N,N-dialkylanilinium salts, such as N,N-dimethylanilinium tetra(phenyl)borate, N,N-diethylanilinium tetra(phenyl)borate and N,N-2,4,6-pentamethylanilinium tetra(phenyl)borate; dialkylammonium salts, such as di(n-propyl)ammonium tetra(pentafluorophenyl)borate and dicyclohexylammonium tetra(phenyl)borate; and triarylphosphonium salts, such as triphenylphosphonium tetra(phenyl)borate, tri(methylphenyl)phosphonium tetra(phenyl)borate and tri(dimethylphenyl)phosphonium tetra(phenyl)borate.

As the ionic compounds having boron atom, there may also be enumerated triphenylcarbenium tetrakis(pentafluorophenyl)borate, N,N-dimethylanilinium tetrakis(pentafluorophenyl)borate and ferrocenium tetra(pentafluorophenyl)borate.

Further, there may also be exemplified boron-containing ionic compounds as given below, wherein the ionic compounds given have commonly a counter ion of tri(n-butyl)ammonium, while other counter ions may also be permitted:

Salts of anions, such as bis{tri(n-butyl)ammonium}nonaborate, bis{tri(n-butyl)ammonium}decaborate, bis{tri(n-butyl)ammonium}undecaborate, bis{tri(n-butyl)ammonium}dodecaborate, bis{tri(n-butyl)ammonium}decachlorodecaborate, bis{tri(n-butyl)ammonium}dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)-ammonium-1-trimethylsilyl-1-carbadecaborate and tri(n-butyl)ammoniumbromo-1-carbadodecaborate. Further, boranes and carboranes given below may also be exemplified, which may be used as the Lewis acids and as the ionic compounds.

As the boranes, carborane complexes and salts of carborane anions, there may be enumerated, for example, decaborane(14), 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium 6-carbadecaborate(14), tri(n-butyl)ammonium 6-carbadecaborate(12) tri(n-butyl)ammonium 7-carbaundecaborate(13), tri(n-butyl)ammonium 7,8-dicarbaundecaborate(12), tri(n-butyl)ammonium 2,9-dicarbaundecaborate(12), tri(n-butyl)ammonium dodecahydrido-8-methyl-7,9-dicarbaundecaborate, tri(n-butyl)ammonium undecahydrido-8-ethyl-7,9-dicarbaundecaborate, tri(n-butyl)ammonium undecahydrido-8-butyl-7,9-dicarbaundecaborate, tri(n-butyl)ammonium undecahydrido-8-allyl-7,9-dicarbaundecaborate, tri(n-butyl)ammonium undecahydrido-9-trimethylsilyl-7,8-di-carbaundecaborate and tri(n-butyl)ammonium undecahydrido-4,6-dibromo-7-carbaundecaborate.

As the carboranes and the salts of carboranes, there may be enumerated, for example, 4-carbanonaborane (14), 1,3-dicarbanonaborane(13), 6,9-dicarbadecaborane (14), dodecahydrido-1-phenyl-1,3-dicarbanonaborane, dodecahydrido-1-methyl-1,3-dicarbanonaborane and undecahydrido-1,3-dimethyl-1,3-dicarbanonaborane.

Further, those compounds as given below may also be exemplified, wherein these compounds given have commonly a counter ion of tri(n-butyl)ammonium, while other counter ions may also be permitted:

Salts of metal carboranes and metal borane anions, such as tri(n-butyl)ammonium bis(nonahydrido-1,3-dicarbanonaborate)cobaltate(III), tri(n-butyl)ammonium bis(undecahydrido-7,8-dicarbaundecaborate)ferrate(III), tri(n-butyl)ammonium bis(undecahydrido-7,8-dicarbaundecaborate)cobaltate(III), tri(n-butyl)ammonium bis(undecahydrido-7,8-dicarbaundecaborate)nickelate(III), tri(n-butyl)ammonium bis(undecahydrido-7,8-dicarbaundecaborate)cuprate(III), tri(n-butyl)ammonium bis(undecahydrido-7,8-dicarbaundecaborate)aurate(III), tri (n-butyl)ammonium bis(nonahydrido-7,8-dimethyl-7,8-dicarbaundecaborate)ferrate(III), tri(n-butyl)ammonium bis (nonahydrido-7,8-dimethyl-7,8-dicarbaundecaborate) chromate(III), tri(n-butyl)ammonium bis (tribromooctahydrido-7,8-dicarbaundecaborate)cobaltate (III), tri(n-butyl)ammonium bis (dodecahydridodicarbadodecaborate)cobaltate (III), bis{tri (n-butyl)ammonium}bis(dodecahydridododecaborate) nickelate(III), tris{tri(n-butyl)ammonium}bis (undecahydrido-7-carbaundecaborate)chromate(III), bis{tri (n-butyl)ammonium}bis(undecahydrido-7-carbaundecaborate)manganate(IV), bis{tri(n-butyl) ammonium}bis(undecahydrido-7-carbaundecaborate) cobaltate(III) and bis{tri(n-butyl)ammonium}bis (undecahydrido-7-carbaundecaborate)nickelate(IV).

The ionizing ionic compounds (g-1) as given above may be used in a combination of two or more of them.

The organoaluminum compound (f-1) to be used according to the present invention is represented, for example, by the following formula (a):

$(R^{11})_n AlX_{3-n}$ (a)

in which $R^{11}$ is a hydrocarbon group having 1–12 carbon atoms, X denotes a halogen atom or hydrogen atom and n is an integer of 1–3.

In the formula (a), $R^{11}$ represents a hydrocarbon group having 1–12 carbon atoms, such as alkyl, cycloalkyl or aryl and, concretely, it stands for, for example, methyl, ethyl, n-propyl, isopropyl, isobutyl, pentyl, hexyl, octyl, cyclopentyl, cyclohexyl, phenyl or tolyl.

Concrete examples of such an organoaluminum compound include trialkylaluminums, such as trimethylaluminum, triethylaluminum, triisopropylaluminum, triisobutylaluminum, trioctylaluminum and tri-2-ethylhexylaluminum; alkenylaluminums, such as isoprenylaluminum and so on; dialkylaluminum halides, such as dimethylaluminum chloride, diethylaluminum chloride, diisopropylaluminum chloride, diisobutylaluminum chloride and dimethylalumunim bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

It is permissible to use, as the organoaluminum compound (f-1), also the compounds represented by the following formula (b):

$(R^{11})_n AlY_{3-n}$ (b)

in which $R^{11}$ is the same as $R^{11}$ in the formula (a), Y denotes a group of $-OR^{12}$, $-OSi(R^{13})_3$, $-OAl(R^{14})_2$, $-N(R^{15})_2$, $-Si(R^{16})_3$ or $-N(R^{17})Al(R^{18})_2$ and n is a number of 1–2, wherein $R^{12}$, $R^{13}$, $R^{14}$ and $R^{18}$ denote each methyl, ethyl, isopropyl, isobutyl, cyclohexyl or phenyl, $R^{15}$ denotes hydrogen atom, methyl, ethyl, isopropyl, phenyl or trimethylsilyl and $R^{18}$ and $R^{17}$ represent each methyl, ethyl or the like.

Concretely, there may be enumerated for these organoaluminum compounds the followings:

1) Compounds represented by $(R^{11})_n Al(OR^{12})_{3-n}$, for example, dimethylaluminum methoxide, diethylaluminum ethoxide and diisobutylaluminum methoxide.

2) Compounds represented by $(R^{11})_n Al\{OSi(R^{13})_3\}_{3-n}$, for example, $(C_2H_5)_2Al\{OSi(CH_3)_3\}$, $(iso\text{-}C_4H_9)_2Al\{OSi-(CH_3)_3\}$ and $(iso\text{-}C_4H_9)_2Al\{OSi(C_2H_5)_3\}$.

3) Compounds represented by $(R^{11})_n Al\{OAl(R^{14})_2\}_{3-n}$, for example, $(C_2H_5)_2Al\{OAl(C_2H_5)_2\}$ and $(iso\text{-}C_4H_9)_2-Al\{OAl(iso\text{-}C_4H_9)_2\}$.

4) Compounds represented by $(R^{11})_n Al\{N(R^{15})_2\}_{3-n}$, for example, $(CH_3)_2Al\{N(C_2H_5)_2\}$, $(C_2H_5)_2Al\{NH(CH_3)\}$, $(CH_3)_2Al\{NH(C_2H_5)\}$, $(C_2H_5)_2Al[N\{Si(CH_3)_3\}_2]$ and $(iso\text{-}C_4H_9)_2Al[N\{Si(CH_3)_3\}_2]$.

5) Compounds represented by $(R^{11})_n Al\{Si(R^{16})_3\}_{3-n}$, for example, $(iso\text{-}C_4H_9)_2Al\{Si(CH_3)_3\}$ and the like.

Among them, organoaluminum compounds represented by the formulae $(R^{11})_3Al$, $(R^{11})_n Al(OR^{12})_{3-n}$ and $(R^{11})_n Al\{OAl(R^{14})_2\}_{3-n}$ may be recited as preferable examples, wherein special preference is given to those compounds in which $R^{11}$ denotes an iso-alkyl and n is 2.

They may be employed either each alone or in a combination of two or more of them.

The metallocene catalyst to be used according to the present invention contains the metallocene (e-3) as given above and can be formed from the metallocene (e-3) and the organoaluminum compound (f-2). It may also be formed from the metallocene (e-3) and the ionizing ionic compound (g-1). Further, it is permissible to use the organoaluminum-oxy compound (f-2) and the ionizing ionic compound (g-1) concurrently together with the metellocene (e-3). In these modes, the concurrent use with the organoaluminum compound (f-1) is especially preferred.

According to the present invention, the metallocene (e-3) is used usually in an amount of about 0.00005–0.1 mmol, preferably 0.0001–0.05 mmol, as converted to the transition metal atom, per one liter of the polymerization volume.

The organoaluminum-oxy compound (f-2) may be used usually in an amount of about 1–10,000 moles, preferably 10–5,000 moles, of aluminum atom per one mole of the transition metal atom.

The ionizing ionic compound (g-1) may be used usually in an amount of about 0.5–20 moles, preferably 1–10 moles, of boron atom per one mole of the transition metal atom.

The organoaluminum compound (f-1) may be used on requirement usually in an amount of about 0–1,000 moles, preferably about 0–500 moles, per one mole of aluminum atom in the organoaluminum-oxy compound (f-2) or per one mole of boron atom in the ionizing ionic compound (g-1).

When ethylene (a), the α-olefin(s) of 3–20 carbon atoms (b) and the triene(s) (c) are subjected to copolymerization in the presence of the metallocene catalyst, an ethylene/α-olefin/triene copolymer rubber can be obtained with a superior polymerization activity.

On the copolymerization of ethylene (a), the α-olefin(s) of 3–20 carbon atoms (b) and the triene(s) (c) according to the present invention, the metallocene (e-3), the organoaluminum-oxy compound (f-2) and the ionizing ionic compound (g-1) constituting the metallocene catalyst as well as the organoaluminum compound (f-1) may be supplied to the polymerization reactor each individually or they may be served for the copolymerization after having been processed into the metallocene catalyst comprising the metallocene (e-3).

On preparing the metallocene catalyst, a solvent inert to the catalyst components may be used, for which there may be recited aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. They may be used either each alone or in a combination.

The metallocene (e-3), the organoaluminum-oxy compound (f-2), the ionizing ionic compound (g-1) and the organoaluminum compound (f-1) may be blended together usually at a temperature in the range from minus 100° C. to +200° C., preferably from minus 70° C. to +100° C., to cause them to contact with each other.

The copolymerization of ethylene (a), the α-olefin(s) having 3–20 carbon atoms (b) and the triene(s) (c) may be realized usually at a temperature of 40–200° C., preferably 50–150° C., more preferably 60–120° C., under a pressure in the range from the atmospheric pressure to 9.8 MPa, (100 kgf/cm$^2$), preferably from the atmospheric pressure to 4.9 MPa (50 kgf/cm$^2$), more preferably from the atmospheric pressure to 2.9 MPa (30 kgf/cm$^2$).

The copolymerization can be effected by various techniques, while it may preferably be effected by a solution polymerization. Here, the solvents mentioned above may be used as the polymerization solvent. The copolymerization can be realized in a batch-wise process, in a semi-continuous process or in a continuous process, while continuous process is preferred.

The first and the second ethylenic copolymer rubbers according to the present invention are produced by a technique as above, wherein the molecular weight of the resulting copolymer can be adjusted by altering the polymerization condition, such as the polymerization temperature, or by controlling the amount of hydrogen (molecular weight regulator).

The first and the second ethylenic copolymer rubbers according to the present invention obtained as above exhibit higher vulcanization velocity and are superior in the scorch stability and in the form preservability, with excellence in the workability, formability, weatherability, heat resistance, resistance to ozone, low-temperature stability, resistance to permanent compressive strain and so on.

The first and the second ethylenic copolymer rubbers according to the present invention may be subjected to a cross linking solely in itself or in a blend with other rubber(s).

Due to the high vulcanization velocity of the first and the second ethylenic copolymer rubbers according to the present invention, they can be subjected to cross linking within a briefer period of time or at a lower temperature even without using a larger amount of vulcanizing agent as compared with conventional unsaturated olefinic copolymers.

Due to the superior scorch stability of the first and the second ethylenic copolymer rubbers, the volume magnification on foaming molding thereof is maintained stably, whereby foamed articles can be produced in a better productivity. Thus, the volume magnification on foaming is decided by a delicate balance among the initial viscosity of the raw resin, the rate of increase of the viscosity and the rate of decomposition of the foaming agent during the molding, wherein the viscosity variation within a short period of time is higher as the rate of increase of viscosity becomes higher, making the control of volume magnification on foaming difficult. Using the first or the second ethylenic copolymer rubber according to the present invention, however, the rate of increase of the viscosity during the foaming molding is scarce due to the superior scorch stability, whereby a foamed article with a stable foaming volume magnification can be produced efficiently.

Due to the superior scorch stability of the frist and the second ethylenic copolymer rubbers according to the present invention, they are superior also in the stability in handling during the working operation. Thus, for example, troubles due to increase in the viscosity during extrusion within the extruder by the progress of the cross-linking reaction, such as reduction of through-put, increase in the load of motor and clogging of the cylinder and extrusion die, can be prevented.

Due to the superior form preservability of the first and the second ethylenic copolymer rubbers according to the present invention, they are superior also in the stability in handling upon the working operation. Thus, for example, flexibility for the design of configuration and thinner wall thickness in the section is facilitated, since drooping-down of the rubber composition by the own weight during the process after the extrusion till completion of the cross linking is scarce.

The first and the second ethylenic copolymer rubbers according to the present invention have also a characteristic feature that they are superior in the resistance to heat aging, in the weatherability and in the resistance to ozone, together with the superior charactristic features mentioned above.

The Third Ethylenic Copolymer Rubber

The third ethylenic copolymer rubber according to the present invention has a mole proportion of the structural unit derived from ethylene (a) versus the. structural unit derived from the α-olefin of 3–20 carbon atoms (b), namely, ethylene/α-olefin, in the range from 95/5 to 40/60, preferably from 85/15 to 50/50, more preferably from 82/18 to 55/45. Due to the mole ratio of ethylene/α-olefin in the above range, it exhibits a rubbery nature and is superior in the low-temperature chracteristics.

The third ethylenic copolymer rubber according to the present invention has a content of the structural unit derived from the triene(s) (c) {in the following, sometimes referred to simply as the content of triene (c)} in the range from 0.1 to 10 mole %, preferably from 0.2 to 8 mole %, more preferably from 0.5 to 5 mole %. Due to the content of triene (c) in the above range, cross linking by sulfur-vulcanization or the like is rendered easier and the resistance to environmental aging is superior.

The third ethylenic copolymer rubber according to the present invention has a content of the structural unit derived from the non-conjugated polyene(s) (d) {in the following, sometimes referred to simply as the content of non-conjugated polyene (d)} in the range from 0.02 to 3 mole %, preferably from 0.05 to 2.5 mole %, more preferably from 0.1 to 2.0 mole %. Due to the content of non-conjugated polyene (d) in the above range, it is superior in the moldability by extrusion without forming gelled cross-linked polymer.

In the third ethylenic copolymer rubber, the mole ratio of the structural unit derived from the triene(s) (c) versus the structural unit derived from the non-conjugated polyene(s) (d), namely, triene/non-conjugated polyene, may favorably be in the range from 1/3 to 30/1, preferably from 1/2 to 20/1, more preferably from 1/1 to 10/1.

The third ethylenic copolymer rubber according to the present invention has an intrinsic viscosity (η) determined in decalin (decahydronaphthalene) at 135° C. in the range from 0.1 to 10 dl/g, preferably from 0.5 to 5 dl/g, more preferably from 0.8 to 4 dl/g.

Due to the intrinsic viscosity in the above range, it is superior in the strength after being cross-linked and is also superior in the workability.

The third ethylenic copolymer rubber according to the present invention has a superior moldability by extrusion and a high cross-linking velocity, together with superior mechanical characteristics, such as the cross linking strength, of the cross-linked rubber product.

The third ethylenic copolymer rubber according to the present invention may be brought into practical use either in the non-cross-linked state as such or in a cross-linked state after being cross-linked by a cross linking technique as will be described afterwards, wherein the characteristic properties may be revealed more facilitatedly when used in the cross-linked form.

The third ethylenic copolymer rubber according to the present invention may be brought into practical use either after having been cross-linked solely in itself or in a blend with other rubber material(s).

Due to the high cross-linking velocity of the third ethylenic copolymer rubber according to the present invention, it can be subjected to cross linking within a briefer period of time or at a lower temperature even without using a larger amount of vulcanizing agent as compared with conventional olefinic copolymer rubbers, whereby cross-linked rubber can be produced at a better productivity.

The third ethylenic copolymer rubber according to the present invention is superior in the ability of co-cross-linking (co-vulcanizability) with diene rubbers, in particular, with natural rubber, styrene/butadiene rubber, isoprene rubber, butadiene rubber, nitrile rubber and chloroprene rubber. A co-cross-linked product (co-vulcanized product) of the third ethylenic copolymer rubber with a diene rubber has the superior properties intrinsic to the diene rubber in the mechanical characteristics and resistances to abrasion, to dynamic fatigue and to oils, together with superior weatherability, resistance to ozone, resitance to heat aging and so on.

For example, a co-cross-linked product of the third ethylenic copolymer rubber according to the present invention with natural rubber is superior in the strength, in the weatherability, in the resistance to ozone and in the dynamic characteristics.

A co-cross-linked product of the third ethylenic copolymer rubber according to the present invention with a nitrile rubber is superior in the weatherability and in the resistances to ozone and to oils.

A co-cross-linked product of the third ethylenic copolymer rubber according to the present invention with a butadiene rubber is superior in the weatherability and in the resistances to ozone and to abrasion.

The third ethylenic copolymer rubber according to the present invention may be served favorably as a modifier for resins and as a raw material of various rubber products.

For example, by adding the third ethylenic copolymer rubber as a resin modifier to resins of, such as polypropylene, polyethylene, polybutene and polystyrene, the shock resistance and the resistance to stress-cracking of these resins may remarkably be improved.

The third ethylenic copolymer rubber according to the present invention can be produced by co-polymerizing ethylene (a), the α-olefin having 3–20 carbon atoms (b), the triene (c) represented by the formula (1) and the non-conjugated polyene(s) (d) in the presence of a catalyst. As the catalyst, that constituted of a transition metal compound (e) of, such as vanadium (V), zirconium (Zr) or titanium (Ti), and of an organoaluminum compound (f) and/or an ionizing ionic compound (g) may favorably be employed.

Concrete examples of the catalyst include (1) a titanium catalyst composed of a solid titaniferous catalyst component (e-1) and an organoaluminum compound (f-1),
(2) a vanadium catalyst composed of a soluble vanadium compound (e-2) and an organoaluminum compound (f-1) and
(3) a metallocene catalyst composed of a metallocene (e-3) of a transition metal selected from Group 4 of the periodic table and an organic aluminum-oxy compound (f-2) and/or an ionizing ionic compound (g-1).

Among them, the metallocene catalyst is preferred. The metallocene catalyst has a high catalytic activity and can produce the third ethylenic copolymer rubber having a narrow distribution of the molecular weight and a narrow compositional distribution with high conversion proportion of the triene (c) represented by the formula (1).

The solid titanium catalyst component (e-1) is prepared by bringing a titanium compound, a magnesium compound and an electron donor as given below into contact with each other.

As the titanium compound, a compound of trivalent or tetravalent titanium is employed, wherein tetravalent titanium compound is preferred. As the tetravalent titanium compound, for example, tetravalent titanium compounds represented by $Ti(OR)_j X_{4-j}$ (in which R is a hydrocarbon group, X is a halogen atom and $0 \leq j \leq 4$) may, be enumerated. Among them, halogen-containing titanium compounds are favorable, wherein preference is given to titanium tetrahalides, especially titanium tetrachloride.

The magnesium compound to be used for preparing the solid titaniferous catalyst component (e-1) may be a magnesium compound which may or may not exhibit a reducing property. As the magnesium compound exhibiting a reducing property, those which have magnesium-to-carbon bond(s) and magnesium-to-hydrogen bond(s) may be enumerated. As the magnesium compound which does not exhibit reducing property, those which are derived from the above-mentioned reducible magnesium compounds or those which are derived upon the preparation of the catalyst component may be employed. It is also possible to use a complex of the magnesium compound with other metal, composite compound or a mixture composed of such a magnesium compound and other metal compound. A mixture of two or more of such a magnesium compound may also be employed. As the magnesium compound, those which do not exhibit reducing property are favorable, with preference to halogen-containing ones, especially to magnesium chloride, an alkoxy magnesium chloride and an aryloxy magnesium chloride.

As the electron doner to be employed for preparing the solid titaniferous catalyst component (e-1), esters of organic carboxylic acids and esters of polybasic carboxylic acids may be enumerated.

The solid titaniferous catalyst component (e-1) can be prepared by bringing a titanium compound, a magnesium compound (or metallic magnesium) and an electron donor, as, described above, into contact with each other. For preparing the solid titaniferous catalyst component (e-1), a known method for preparing a highly active titaniferous catalyst component from a titanium compound, a magnesium compound and an electron donor may be employed. On contacting the above components, they can be brought into contact with each other in the presence of other reaction reagent, such as a compound of silicium, phosphorus or aluminum.

As the organoaluminum compound (f-1) for building up the catalyst based on titanium, compounds containing at least one Al-to-carbon bond in the molecule may be employed. Examples of such compounds include organoaluminum compounds represented by the formula (4),

(4), in which $R^1$ and $R^2$ denote each a hydrocarbon group containing usually 1–15 carbon atoms, preferably 1–4 carbon atoms, which may be identical with or different from each other, X is a halogen atom, m, n, p and q are each a number. sufficing the conditions 0<m≦3, 0≦n<3, 0≦p<3 and 0≦q<3, with m+n+p+q=3; and alkylated complexes of aluminum with a metal of Group 1 of the periodic table represented by the formula (5), $$(M^1)Al(R^1)_4 \tag{5}$$

in which $M^1$ is Li, Na or K and $R^1$ has the same meaning as that in the formula (4).

For preparing the catalyst based on titanium, an electron donor may be incorporated on requirement. For such an electron, donor, an organosilicic compound as represented by the formula (6) or (7) may be employed:

$$R_nSi(OR')_{4-n} \tag{6}$$

$$SiR^1R^2{}_m(OR^3)_{3-m} \tag{7}$$

In the formula (6), R and R' denote each a hydrocarbon group and n is a number sufficing the condition 0<n<4.

In the formula (7), $R^1$ denotes cyclopentyl or an alkyl-containing cyclopentyl, $R^2$ is an alkyl, a cyclopentyl or an alkyl-containing cyclopentyl, $R^3$ is a hydrocarbon group and m is a number sufficing the condition 0≦m≦2.

As the alkyl-containing cyclopentyl $R^1$ in the formula (7), for example, 2-methylcyclopentyl, 3-methylcyclopentyl, 2-ethylcyclopentyl and 2,3-dimethylcyclopentyl may be enumerated.

In the catalyst components for building up the catalyst based on titanium, an α-olefin may be incorporated under a prepolymerization. The prepolymerization may desirably be realized by using an α-olefin in an amount of 0.1–500 g, preferably 0.3–300 g, especially preferably 1–100 g, per 1 g of the titanium-based catalyst. The prepolymerization may preferably be effected by mixing the α-olefin and the catalyst components in an inert hydrocarbon solvent to cause the prepolymerization under a mild condition. The α-olefin to be employed in the prepolymerization may or may not be identical with the α-olefin (b) used for preparing the third ethylenic copolymer rubber.

As the soluble vanadium compound (e-2) for building up the catalyst based on vanadium, such compounds as represented by the following formulae (8) or (9) may be enumerated:

$$VO(OR)_aX_b \tag{8}$$

$$V(OR)_cX_d \tag{9}$$

In the formulae (8) and (9), R is a hydrocarbon group, X is a halogen atom and the symbols a, b, c and d suffice each the conditions 0≦a≦3, 0≦b≦3, 2≦a+b≦3, 0≦c≦4, 0≦d≦4 and 3≦c+d≦4, respectively.

As the soluble vanadium compound (e-2), an electron donor adduct of a soluble vanadium compound obtained by contacting an electron donor with the soluble vanadium compound may be employed.

As the organoaluminum compound (f-1) for building up the catalyst based on vanadium, those which are the same as the organoaluminum compound (f-1) for building up the catalyst based on titanium mentioned above may be used.

The metallocene (e-3) to be employed for building up the catalyst based on metallocene is that of a transition metal selected from the elements of Group 4 of the periodic table. Concrete examples thereof include those represented by the following formula (10), $$ML_x \tag{10}$$

in which M is a transition metal selected from the elements of Group 4 of the periodic table, x is the valency of the transition metal M and L represents a ligand.

Concrete examples of the transition metal represented by M in the formula (10) include zirconium, titanium and hafnium.

L in the formula (10) denotes a ligand to be coordinated to the transition metal. Among these ligands, at least one ligand L has a skeleton of cyclopentadienyl, which may have substituent group(s).

For the ligand L having a skeleton of cyclopentadienyl, there may be enumerated, for example, cyclopentadienyl group; alkyl- or cycloalkyl-substituted cyclopentadienyl group, such as, methylcyclopentadienyl group, ethylcyclopentadienyl group, n- or i-propylcyclopentadienyl group, n-, i-, sec- or t-butylcyclopentadienyl group, dimethylcyclopentadienyl group, methylpropylcyclopentadienyl group, methylbutylcyclopentadienyl group and methylbenzylcyclopentadienyl group; indenyl group; 4,5,6,7-tetrahydroindenyl group; and fluorenyl group.

The group having the cyclopentadienyl-skeleton mentioned above may have substituent(s) of, for example, a halogen atom or a trialkylsilyl group.

If the compound represented by the formula (10) has two or more groups having the skeleton of cyclopentadienyl as the ligand L, two of such groups having the skeleton of cyclopentadienyl may be bound together through a bridging group, for example, an alkylene, such as ethylene or propylene, a substituted alkylene, such as isopropylidene or diphenylmethylene, a silylene or a substituted silylene, such as dimethylsilylene, diphenylsilylene or methylphenylsilylene.

For the ligands L other than those having the skeleton of cyclopentadienyl, namely, those which do not possess the skeleton of cyclopentadienyl, there may be enumerated, for example, hydrocarbon groups having 1–12 carbon atoms, alkoxy groups, aryloxy groups, sulfo-containing groups (—SO$_3$R$^a$ in which R$^a$ denotes an alkyl, a halogen-substituted alkyl, aryl or a halogen- or alkyl-substituted aryl), halogen atoms and hydrogen atom.

For the hydrocarbon groups containing 1–12 carbon atoms of the ligand L, for example, alkyl, cycloalkyl, aryl and aralkyl are enumerated. More concretely, they include alkyl groups, such as, methyl, ethyl, n-propyl, isopropyl, n-butyl, isobutyl, sec-butyl, t-butyl, pentyl, hexyl, octyl, decyl and dodecyl; cycloalkyl groups, such as, cyclopentyl and cyclohexyl; aryl groups, such as, phenyl and tolyl; and aralkyl groups, such as, benzyl and neophyl.

As the alkoxy groups for the ligand L, for example, methoxy, ethoxy and n-propoxy, are enumerated. As the aryloxy groups, for example, phenoxy etc., may be enumerated. As the sulfo-containing groups (—SO$_3$R$^a$), for example, methanesulfonato, p-toluenesulfonato, trifluoromethanesulfonato and p-chlorobenzenesulfonato are enumerated. As the halogen atom, for example, fluorine, chlorine, bromine and iodine are enumerated.

More concretely, the metallocene represented by the formula (10) in which the valency of the transition metal is four is represented by the following formula (11), $$R^2{}_kR^3{}_lR^4{}_mR^5{}_nM \tag{11}$$

in which M is a transition metal defined in the formula (10), $R^2$ is a group (ligand) having the skeleton of cyclopentadienyl, $R^3$, $R^4$ and $R^5$ represent each, independently of each other, a group (ligand) which may or may not have the skeleton of cyclopentadienyl and k is an integer of at least 1, with k+l+m+n=4.

Below, examples of the metallocene (e-3) in which M is zirconium and which has at least two ligands having a cyclopentadienyl skeleton are recited:

Bis(cyclopentadienyl)zirconium monochloride monohydride
Bis(cyclopentadienyl)zirconium dichloride
Bis(1-methyl-3-butylcyclopentadienyl)zirconium bis (trifluoromethanesulfonate)
Bis(1,3-dimethylcyclopentadienyl)zirconium dichloride It is permissible to use a compound in which the above-mentioned 1,3-disubstituted cyclopentadienyl group is replaced by a 1,2-disubstituted cyclopentadienyl group.

Also, it is possible to use, for the metallocene (e-3), a bridged metallocene in which at least two of $R^2$, $R^3$, $R^4$ and $R^5$ in the formula (11), for example, $R^2$ and $R^3_1$ are a group (ligand) having a skeleton of cyclopentadienyl, wherein said at least two groups are bound together through a bridging group, such as an alkylene, substituted alkylene, silylene or substituted silylene. In such a case, the groups $R^4$ and $R^5$ are the same, independently of each other, as the ligands L other than that having cyclopentadienyl skeleton as mentioned previously for the formula (10).

For such bridged metallocenes (e-3) there may be enumerated ethylene bis(indenyl)dimethylzirconium,
ethylene bis(indenyl)zirconium dichloride,
isopropylidene(cyclopentadienyl-fluorenyl)zirconium dichloride,
diphenylsilylene bis(indenyl)zirconium dichloride and
methylphenylsilylene bis(indenyl)zirconium dichloride.

Also, as the metallocene (e-3), metallocenes disclosed in Japanese Patent Kokai Hei 4-268307 (corresponding to U.S. Pat. No. 5,243,001) represented by the following formula (12) may also be enumerated.

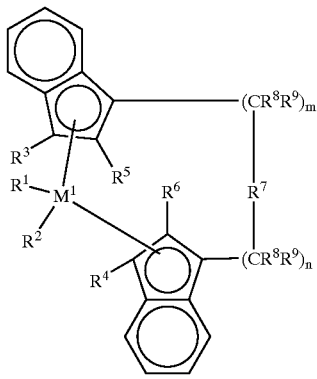

(12)

In the above formula (12), $M^1$ denotes a metal of Group 4 of the periodic table and may concretely be, for example, titanium, zirconium or hafnium.

In the formula (12), $R^1$ and $R^2$ may each be hydrogen atom, an alkyl having 1–10 carbon atoms, preferably 1–3 carbon atoms, an alkoxy having 1–10 carbon atoms, preferably 1–3 carbon atoms, an aryl group having 6–10 carbon atoms, preferably 6–8 carbon atoms, an aryloxy group having 6–10 carbon atoms, preferably 6–8 carbon atoms, an alkenyl group having 2–10 carbon atoms, preferably 2–4 carbon atoms, an aralkyl group having 7–40 carbon atoms, preferably 7–10 carbon atoms, an alkaryl group having 7–40 carbon atoms, preferably 7–12 carbon atoms, or an aralkenyl group having 8–40 carbon atoms, preferably 8–12 carbon atoms, or, further, a halogen atom, preferably chlorine atom. Here, $R^1$ and $R^2$ may or may not be identical with each other.

In the formula (12), $R^3$ and $R^4$ may each stand for hydrogen atom, a halogen atom, preferably fluorine atom, chlorine atom or bromine atom, an alkyl group which may be halogenated and which has 1–10 carbon atoms, preferably 1–4 carbon atoms, an aryl group having 6–10, preferably 6–8 carbon atoms, a group of $-N(R^{10})_2$, $-SR^{10}$, $-OSi(R^{10})_3$, $-Si(R^{10})_3$ or $-P(R^{10})_2$. Here, $R^{10}$ is a halogen atom, preferably chlorine atom, an alkyl group having 1–10 carbon atoms, preferably 1–3 carbon atoms, or an aryl group having 6–10 carbon atoms, preferably 6–8 carbon atoms. $R^3$ and $R^4$ may or may not be identical with each other. It is especially preferable that both $R^3$ and $R^4$ are hydrogen atom.

In the formula (12), $R^5$ and $R^6$ may be the same as $R^3$ and $R^4$ except hydrogen atom. $R^5$ and $R^6$ may or may not be identical with each other, while it is preferable that both are the same. $R^5$ and $R^6$ may each preferably be an alkyl group having 1–4 carbon atoms which may be halogenated, of which concrete examples are methyl, ethyl, propyl, isopropyl, butyl, isobutyl and trifluoromethyl, wherein a particular preference is given to methyl.

In the formula (12), $R^7$ may stand for:

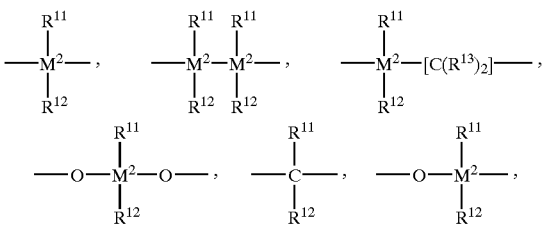

as well as $=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$. In the above, $R^{11}$, $R^{12}$ and $R^{13}$ may each stand for hydrogen atom; a halogen atom; an alkyl group having 1–10 carbon atoms, preferably 1–4 carbon atoms, and more preferably methyl; a fluoroalkyl group having 1–10 carbon atoms, preferably $-CF_3$; an aryl group having 6–10 carbon atoms, preferably 6–8 carbon atoms; a fluoroaryl group having 6–10 carbon atoms, preferably pentafluorophenyl; an alkoxy group having 1–10 carbon atoms, preferably 1–4 carbon atoms, in particular methoxy; an alkenyl group having 2–10 carbon atoms, preferably 2–4 carbon atoms; an aralkyl group having 7–40 carbon atoms, preferably 7–10 carbon atoms; an aralkenyl group having 8–40 carbon atoms, preferably 8–12 carbon atoms; or an alkaryl group having 7–40 carbon atoms, preferably 7–12 carbon atoms. The pair "$R^{11}$ with $R^{12}$" or "$R^{11}$ with $R^{13}$" may form a ring together with the atoms bound thereto. $R^{11}$, $R^{12}$ and $R^{13}$ may or may not be identical with each other.

$M^2$ given above may stand for silicon, germanium or tin, preferably silicon or germanium.

In the formula (12), $R^7$ may preferably stand for $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

In the formula (12), $R^8$ and $R^9$ may each be the same as $R^{11}$, wherein $R^8$ and $R^9$ may or may not be identical with each other.

In the formula (12), m and n represent each 0, 1 or 2, preferably 0 or 1, with m+n being 0, 1 or 2, preferably 0 or 1. m and n may or may not be identical with each other.

As the metallocene (e-3) represented by the formula (12), the following compounds may be exemplified:

rac-ethylene(2-methyl-1-indenyl)-2-zirconium dichloride
rac-dimethylsilylene(2-methyl-1-indenyl)-2-zirconium dichloride The metallocene (e-3) represented by the formula (12) can be produced by known methods {for example, Japanese Patent Kokai Hei 4-268307 (corresponding to U.S. Pat. No. 5,243,001).

As the metallocene (e-3), one represented by the following formula (13) may also be used.

(13)

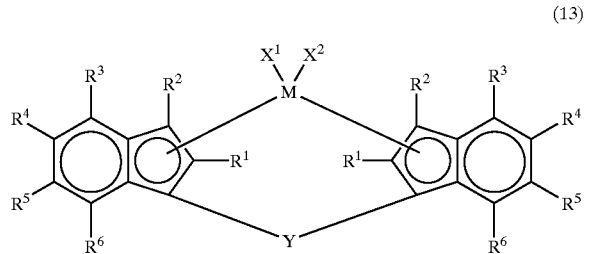

In the above formula (13), M denotes a transition metal atom of Group 4 of the periodic table, which may concretely be titanium, zirconium or hafnium.

In the formula (13), $R^1$ and $R^2$ stand, independently of each other, for hydrogen atom, a halogen atom, a hydrocarbon group having 1–20 carbon atoms, a halogenated hydrocarbon group having 1–20 carbon atoms, a silicium-containing group, a oxygen-containing group, a sulfur-containing group, a nitrogen-containing group or a phosphorus-containing group. Concrete examples of the groups for $R^1$ and $R^2$ include:

a halogen atom, such as, fluorine, chlorine, bromine or iodine;

a hydrocarbon group having 1–20 carbon atoms, for example, an alkyl group, such as, methyl, ethyl, propyl, butyl, hexyl, cyclohexyl, octyl, nonyl, dodecyl, eicosyl, norbornyl or adamantyl, an alkenyl group, such as, vinyl, propenyl or cyclohexenyl, an aralkyl group, such as, benzyl, phenylethyl or phenylpropyl, or an aryl group, such as, phenyl, tolyl, dimethylphenyl, trimethylphenyl, ethylphenyl, propylphenyl, biphenyl, naphthyl, methylnaphthyl, anthracenyl or phenanthryl;

a halogenated hydrocarbon group having 1–20 carbon atoms of those in which the above-recited hydrocarbon groups are halogen-substituted;

a silicium-containing group, for example, a mono-hydrocarbon-substituted silyl, such as, methylsilyl or phenylsilyl, di-hydrocarbon-substituted silyl, such as dimethylsilyl or diphenylsilyl, tri-hydrocarbon-substituted silyl, such as, trimethylsilyl, triethylsilyl, tripropylsilyl, tricyclohexylsilyl, triphenylsilyl, dimethylphenylsilyl, methyldiphenylsilyl, tritolylsilyl or trinaphthylsilyl, a silyl ether group of a hydrocarbon-substituted silyl, such as trimethyl silyl ether, a silicium-substituted alkyl, such as, trimethylsilylmethyl, or a silicium-substituted aryl, such as, trimethylsilylphenyl;

an oxygen-containing group, for example, hydroxy, an alkoxy group, such as, methoxy, ethoxy, propoxy or butoxy, an aryloxy group, such as, phenoxy, methylphenoxy, dimethylphenoxy or naphthoxy, or an aralkoxy group, such as, phenylmethoxy or phenylethoxy;

a sulfur-containing group, for example, a group of those in which the oxygen atom in the above-recited oxygen-containing groups is replaced by sulfur;

a nitrogen-containing group, for example, amino group, an alkylamino group, such as, methylamino, dimethylamino, diethylamino, dipropylamino, dibutylamino or dicyclohexylamino, an arylamino or alkylarylamino group, such as, phenylamino, diphenylamino, ditolylamino, dinaphthylamino or methylphenylamino; and a phosphorus-containing group, for example, a phosphino group, such as dimethylphosphino or diphenylphosphino.

Among the above-recited groups for $R^1$, hydrocarbon groups are preferred, with particular preference being given to an alkyl group having 1–3 carbon atoms, such as, methyl, ethyl or propyl. $R^2$ may preferably stand for hydrogen atom or a hydrocarbon group, wherein a particular preference is given to hydrogen atom or an alkyl group having 1–3 carbon atoms, such as, methyl, ethyl and propyl.

In the formula (13), $R^3$, $R^4$, $R^5$ and $R^6$ denote, independently of each other, hydrogen atom, a halogen atom, a hydrocarbon group having 1–20 carbon atoms or a halogenated hydrocarbon group having 1–20 carbon atoms. Among them, hydrogen atom, hydrocarbon groups and halogenated hydrocarbon groups are preferred. Among the pairs $R^3$ with $R^4$, $R^4$ with $R^5$ and $R^5$ with $R^6$ at least one pair may form a monocyclic aromatic ring together with the carbon atoms bound thereto. If two or more hydrocarbon groups or halogenated hydrocarbon groups are present in the other pairs than that forming the aromatic ring, they may form a ring by combining together. It is preferable that $R^6$ is hydrogen atom, so long as it is not an aromatic substituent group.

For $R^3$, $R^4$, $R^5$ and $R^6$ in the formula (13), as the halogen atom, hydrocarbon group having 1–20 carbon atoms and halogenated hydrocarbon group having 1–20 carbon atoms, the same as those recited for $R^1$ and $R^2$ may be exemplified.

In the formula (13), $X^1$ and $X^2$ denote each, independently of each other, hydrogen atom, a halogen atom, a hydrocarbon group having 1–20 carbon atoms or a halogenated hydrocarbon group having 1–20 carbon atoms, oxygen-containing group or sulfur-containing group.

For the concrete examples of the halogen atom, for the hydrocarbon groups having 1–20 carbon atoms, for the halogenated hydrocarbon groups having 1–20 carbon atoms and for the oxygen-containing groups, those which are exemplified for $R^1$ and $R^2$ may be enumerated.

As the sulfur-containing groups, there may be exemplified those which are exemplified above for the groups $R^1$ and $R^2$; as well as sulfonates; such as methylsulfonate, trifluoromethanesufonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinates, such as methylsulfinate, phenylsulfinate, benzenesulfinate, p-toluenesulfinate, trimethylbenzenesulfinate and pentafluorobenzenesulfinate.

In the formula (13), Y denotes a divalent hydrocarbon group having 1–20 carbon atoms, a divalent halogenated hydrocarbon group having 1–20 carbon atoms, a silicium-containing divalent group, a germanium-containing divalent group, a tin-containing divalent group, the group —O—, —CO—, —S—, —SO—, —SO$_2$—, —NR$^7$—, —P(R$^7$)—, —P(O)(R$^7$)—, —BR$^7$— or —AlR$^7$—, with $R^7$ being hydrogen atom, a halogen atom, a hydrocarbyl having 1–20 carbon atoms or a halogenated hydrocarbyl having 1–20 carbon atoms.

Concrete examples of Y in the formula (13) include
divalent hydrocarbon groups having 1–20 carbon atoms, for example, alkylenes, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and aralkylenes, such as diphenylmethylene and diphenyl-1,2-ethylene;
halogenated hydrocarbon groups derived from the above divalent hydrocarbyls having 1–20 carbon atoms which are halogenated, such as chloromethylene and the like;
silicium-containing divalent groups, for example, alkylsilylenes, alkarylsilylenes and arylsilylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; alkyldisilylenes, alkaryldisilylenes, and aryldisilylenes, such as tetramethyl-1,2-disilylene, tetraphenyl-1,2-disilylene and so on;
germanium-containing divalent groups, in which the silicium in the above silicium-containing divalent groups is replaced by germanium; and
tin-containing divalent groups, in which the silicium in the above silicium-containing divalent groups is replaced by tin, wherein $R^7$ stands for a halogen atom, a hydrocarbyl having 1–20 carbon atoms and a halogenated hydrocarbyl having 1–20 carbon atoms as in the above $R^1$ and $R^2$.

Among the above-exemplified groups for Y, the silicium-containing divalent groups, the germanium-containing divalent groups and tin-containing divalent groups are preferred, wherein particular preference is given to the silicium-containing divalent groups, with special preference being given to alkylsilylenes, alkarylsilylenes and arylsilylenes.

In the formula (13), as the ligands coordinating to the metal M, which contain the monocyclic aromatic ring formed by coupling at least one pair among the pairs of $R^3$ with $R^4$, $R^4$ with $R^6$ and $R^5$ with $R^6$ with each other, those which are represented by the following formulae (14) to (16) may be exemplified:

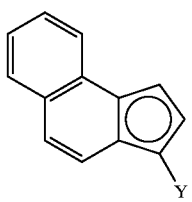
(14)

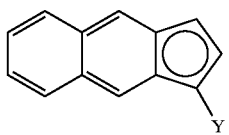
(15)

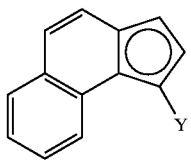
(16)

in which Y has the same meaning as that in the formula (13).

Transition metal compounds represented by the A following formula (17) may also be used as the metallocene (e-3),

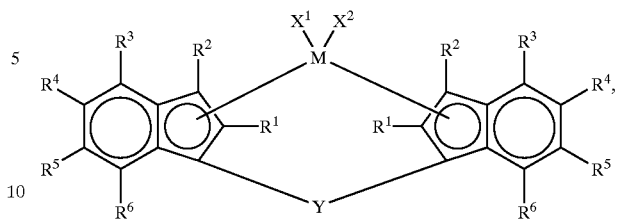
(17)

in which M, $R^1$, $R^2$, $R^3$, $R^4$, $R^5$ and $R^6$ are the same as those in the formula (13).

In the formula (17), it is preferable that, among the groups $R^3$, $R^4$, $R^5$ and $R^6$, two groups including $R^3$ are each an alkyl group, wherein preference is given to that $R^3$ and $R^5$ or $R^3$ and $R^6$ stand each for an alkyl group. These alkyl groups may preferably be secondary or tertiary alkyl groups. Further, these alkyl groups may be substituted by halogen atom(s) or silicium-containing group(s), wherein, as the halogen atom and as the silicium-containing group, those which are exemplified previously for $R^1$ and $R^2$ may be enumerated.

It is preferable, that the groups for $R^3$, $R^4$, $R^5$ and $R^6$ in the formula (17) other than the alkyl groups as mentioned above are hydrogen atom. As the hydrocarbon group having 1–20 carbon atoms, there may be recited chain-formed and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and aralkyl groups, such as, benzyl, phenylethyl, phenylpropyl and tolylmethyl, wherein they may include double bond(s) and/or triple bond(s).

It is permissible that two groups selected among $R^3$, $R^4$, $R^5$ and $R^6$ in the formula (17) may form a monocyclic or polycyclic ring other than aromatic ring, by combining together.

As the halogen atom, those given for $R^1$ and $R^2$ may be recited.

As the groups for $X^1$, $X^2$ and Y, those which are given for the formula (13) may be recited.

Concrete examples of the metallocenes (e-3) represented by the formula (17) are given below.

rac-dimethylsilylene-bis(4,7-dimethyl-1-indenyl)zirconium dichloride
rac-dimethylsilylene-bis(2,4,7-trimethyl-1-indenyl) zirconium dichloride
rac-dimethylsilylene-bis(2,4,6-trimethyl-1-indenyl) zirconium dichloride Also, transition metal compounds in which the zirconium in the compounds given above is replaced by titanium or hafnium may be used.

The transition metal compounds as given above may usually be employed as a racemate, while it is possible to use R- or S-compound.

For the metallocenes (e-3) represented by the formula (17), such compounds as given below may also be used.
$R^1$ may preferably be a hydrocarbon group, wherein a particular preferance is given to an alkyl group having 1–4 carbon atoms, such as, methyl, ethyl, propyl or butyl.

$X^1$ and $X^2$ may each preferably be a halogen atom or a hydrocarbon group having 1–20 carbon atoms.

$R^3$ denotes an aryl group having 6–16 carbon atoms, wherein concrete examples therefor include phenyl, α-naphthyl, β-naphthyl, anthracenyl, phenanthryl, pyrenyl, acenaphthyl, phenalenyl (perinaphthenyl) and aceanthrylenyl. Among them, phenyl and naphthyl are preferred. These aryl groups may be substituted by halogen atom(s), hydrocarbon group(s) having 1–20 carbon atoms or halogenated hydrocarbon group(s) having 1–20 carbon atoms, as those defined for $R^1$.

Concrete examples of such transition metal compounds (metallocenes) are given below:

rac-dimethylsilylene-bis(4-phenyl-1-indenyl)zirconium dichloride
rac-dimethylsilylene-bis(2-methyl-4-phenyl-1-indenyl)zirconium dichloride
rac-dimethylsilylene-bis{2-methyl-4-(α-naphthyl)-1-indenyl}zirconium dichloride
rac-dimethylsilylene-bis{2-methyl-4-(β-naphthyl)-1-indenyl}zirconium dichloride
rac-dimethylsilylene-bis}2-methyl-4-(1-anthracenyl)-1-indenyl}zirconium dichloride It is also possible to use transition metal compounds in which the zirconium in the compounds given above is replaced by titanium or hafnium.

The compounds represented by the following formula (18) may also be used as the metallocene (e-3):

$L^a MX_2$             (18)

wherein M is a metal of Group 4 or of the Lantanide series in the periodic table, $L^a$ denotes a derivative from a non-localized π-bound group, which imparts a restrictive geometrical configuration to the active sites of the metal M, and X denotes, independently of one another, hydrogen atom, a halogen atom, a hydrocarbon group having 20 or less carbon atoms, a silyl group having 20 or less silicium atoms or a germyl group having 20 or less germanium atoms.

Among the compounds represented by the formula (18), those which are represented by the following formula (19) are preferred:

(19)

in which M denotes titanium, zirconium or hafnium, X has the same meaning as that defined for the formula (18), Cp represents a substituted cyclopentadienyl group bound to the metal M by π-bond and having a substituent group Z, Z stands for oxygen, sulfur, boron or an element in Group 14 of the periodic table (for example, silicium, germanium or tin), Y denotes a ligand containing nitrogen, phosphorus, oxygen or sulfur, wherein Z and Y together may form a condensed ring.

For the compounds represented by the formula (19), there may be exemplified {dimethyl(t-butylamido)(tetramethyl-η⁵-cyclopentadienyl)silane}titanium dichloride and {(t-butylamido)(tetramethyl-η⁵-cyclopentadienyl)-1,2-ethanediyl}titanium dichloride.

Those compounds in which the titanium in the metallocenes given above is replaced by zirconium or hafnium may also be employed.

As the metallocenes (e-3) represented by the formula (18) or (19), zirconocenes in which the central metal atom is zirconium and at least two ligands having cyclopentadienyl skeleton are included may preferably be employed.

As the metallocene (e-3), a compound of a transition metal of Group 4 of the periodic table represented by the following formula (20) may also be employed:

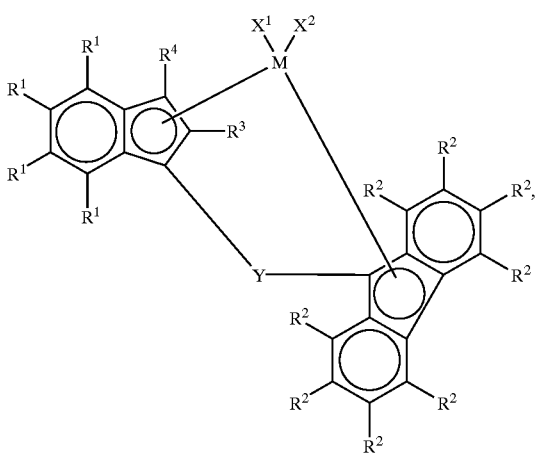

(20)

in which M is an atom of transition metal of Group 4 of the periodic table and may concretely be titanium, zirconium or hafnium, with preference to zirconium.

$R^1$s in the formula (20) may be or may not be identical with each other, wherein at least one of them may be an aryl group having 11–20 carbon atoms, an aralkyl group having 12–40 carbon atoms, an aralkenyl group having 13–40 carbon atoms, an alkaryl group having 12–40 carbon atoms or a silicium-containing group or at least two neighboring $R^1$s among these $R^1$s may form one or more monocyclic or polycyclic aromatic or aliphatic rings together with the carbon atoms to which they are bound. Here, the total number of carbon atoms of the ring formed by $R^1$, inclusive of the carbon atoms to which $R^1$s are bound, are 4–20.

Examples in which at least two neigboring $R^1$s in the formula (20) build up, together with the carbon atoms to which such $R^1$s are bound, one or more aromatic or aliphatic rings include condensed phenyl group, condensed cyclohexyl group, condensed cyclopentadienyl group, condensed dihydrocyclopentadienyl group, condensed indenyl group, condensed tetrahydroindenyl group, condensed fluorenyl group, condensed tetrahydrofluorenyl group and condensed octahydrofluorenyl group. These groups may be substituted by linear alkyl, cycloalkyl, halogen, halogen-substituted alkyl, aryl, silicium-containing group, oxygen-containing group, nitrogen-containing group or phosphorus-containing group.

The $R^1$s other than those which form aryl, aralkyl, aralkenyl, alkaryl or aromatic or aliphatic ring stand each for hydrogen atom, a halogen atom, an alkyl having 1–10 carbon atoms or a silicium-containing group.

As the aryl group having 11–20 carbon atoms, there may be exemplified biphenylyl, anthryl and phenanthryl. As the aralkyl group having 12–40 carbon atoms, there may be exemplified phenanthrylmethyl, phenanthrylethyl and phenanthrylpropyl. As the aralkenyl group having 13–40 carbon atoms, there may be exemplified vinylphenanthryl and so on. As the alkaryl group having 12–40 carbon atoms, there may be exemplified methylphenanthryl, ethylphenanthryl and propylphenanthryl. As the halogen atom, fluorine, chlorine, bromine and iodine are exemplified. As the alkyl group having 1–10 carbon atoms, there may be exemplified methyl, ethyl, propyl, butyl, hexyl, cyclohexyl, octyl and nonyl.

As the silicium-containing group, there may be exemplified methylsilyl, phenylsilyl, dimethylsilyl, diethylsilyl, diphenylsilyl, trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl.

These alkyl, aryl, aralkyl, aralkenyl and alkaryl may be halogen-substituted.

In the formula (20), $R^2$s may or may not be identical with each other and stand each for hydrogen atom, a halogen atom, an alkyl group having 1–10 carbon atoms, an aryl group having 6–20 carbon atoms, an alkenyl group having 2–10 carbon atoms, an aralkyl group having 7–40 carbon atoms, an aralkenyl group having 8–40 carbon atoms, an alkaryl group having 7–40 carbon atoms, a silicium-containing group, an oxygen-containing group, a sulfur-containing group, a nitrogen-containing group or a phosphorus-containing group.

At least two adjacent groups among the groups represented by $R^2$ in the formula (20) may form, together with the carbon atoms to which these two $R^2$s are bound, one or more aromatic or aliphatic rings. Here, the total number of carbon atoms of the ring(s) formed by $R^2$, inclusive of the carbon atoms to which these $R^2$s are bound, may be 4–20 and the $R^2$s other than those which form the aromatic or aliphatic ring may each stand for hydrogen atom, a halogen atom, an alkyl group having 1–10 carbon atoms or a silicium-containing group.

To the group which is constituted from two groups represented by $R^2$ in the formula (20) by being formed into one or more aromatic or aliphatic rings, such a group formed from fluorenyl as represented by the following formula (21) may also belong.

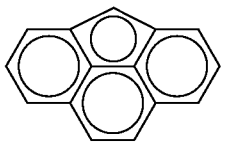

(21)

As the alkyl group having 1–10 carbon atoms and as the halogen atom, the same ones as given above may be exemplified.

As the aryl group having 6–20 carbon atoms, there may be exemplified phenyl, biphenyl, α- and β-naphthyls, anthryl and phenanthryl. As the aralkyl group having 7–40 carbon atoms, there may be exemplified benzyl, phenylethyl, phenylpropyl, phenanthrylmethyl, phenanthrylethyl and phenanthrylpropyl. As the aralkenyl group having 8–40 carbon atoms, there may be exemplified styryl and vinylphenanthryl.

As the alkaryl group having 7–40 carbon atoms, there may be exemplified tolyl, dimethylphenyl, trimethylphenyl, ethylphenyl, propylphenyl, methylnaphthyl, methylphenanthryl, ethylphenanthryl and propylphenanthryl. As the alkenyl group having 2–10 carbon atoms, there may be exemplified vinyl, propenyl and cyclohexenyl. As the silicium-containing group, there may be exemplified the same ones as given previously. As the oxygen-containing group, there may be exemplified hydroxyl group; alkoxy groups, such as methoxy, ethoxy, propoxy and butoxy; aryloxy groups, such as phenoxy, methylphenoxy, dimethylphenoxy and naphthoxy; and aralkoxy groups, such as phenylmethoxy and phenylethoxy.

As the sulfur-containing group, there may be exemplified those in which the oxygen atom in the above-mentioned oxygen-containing group is replaced by sulfur atom as well as sulfonates, such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinates, such as methylsulfinate, phenylsulfinate, benzenesulfinate, p-toluenesulfinate, trimethylbenzenesulfinate and pentafluorobenzenesulfinate.

As the nitrogen-containing group, there may be exemplified, amino group; alkylamino groups, such as methylamino, dimethylamino, diethylamino, dipropylamino, dibutylamino and dicyclohexylamino; arylamino groups, such as phenylamino, diphenylamino, ditolylamino, dinaphthylamino and methylphenylamino; and alkarylamino groups.

As the phosphorus-containing group, there may be exemplified dimethylphosphino and diphenylphosphino.

The groups $R^2$ may preferably be hydrogen atom or an alkyl group, wherein special preference is given to hydrogen atom or a hydrocarbyl having 1 to 3 carbon atoms, such as methyl, ethyl or propyl.

As the fluorenyl group having such substituent groups $R^2$, there may be enumerated, as a favorable example, 2,7-dialkylfluorenyl with preferable alkyl groups being those having 1–5 carbon atoms.

The above-mentioned $R^1$ and $R^2$ may or may not be identical with each other.

$R^3$ and $R^4$ in the formula (20) may be identical with or different from each other, wherein they stand each, similarly as above, for hydrogen atom, a halogen atom, an alkyl group having 1–10 carbon atoms, an aryl group having 6–20 carbon atoms, an alkenyl group having 2–10 carbon atoms, an aralkyl group having 7–40 carbon atoms, an aralkenyl group having 8–40 carbon atoms, an alkaryl group having 7–40 carbon atoms, a silicium-containing group, an oxygen-containing group, a sulfur-containing group, a nitrogen-containing group or a phosphorus-containing group.

Among them, $R^3$ and $R^4$ may favorably be such that at least one of them is an alkyl group having 1–3 carbon atoms.

$X^1$ and $X^2$ in the formula (20) may be identical with or different from each other and stand each for hydrogen atom, a halogen atom, a hydrocarbyl having 1–20 carbon atoms, a halogenated hydrocarbyl having 1–20 carbon atoms, an oxygen-containing group, a sulfur-containing group or a nitrogen-containing group, or they may form together a conjugate diene radical, wherein concrete examples of halogen atom, oxygen-containing group, sulfur-containing group and nitrogen-containing group include those which are exemplified as above.

As the hydrocarbyl having 1–20 carbon atoms, there may be exemplified an alkyl group, such as methyl, ethyl, propyl, butyl, hexyl, cyclohexyl, octyl, nonyl, dodecyl, eicosyl, norbornyl or adamantyl; an alkenyl group, such as, vinyl, propenyl or cyclohexenyl; an aralkyl group, such as, benzyl, phenylethyl or phenylpropyl; or an aryl group, such as phenyl, tolyl, dimethylphenyl, trimethylphenyl, ethylphenyl, propylphenyl, α- or β-naphthyl, methylnaphthyl, anthryl, phenanthryl, benzylphenyl, pyrenyl, acenaphthyl, phenalenyl, aceanthrylenyl, tetrahydronaphthyl, indanyl and biphenylyl. As the halogenated hydrocarbyl having 1–20 carbon atoms, there may be exemplified those in which the above-mentioned hydrocarbyls having 1–20 carbon atoms have halogen substituent(s).

As the conjugated diene radial formed from $X^1$ and $X^2$, there may be exemplified $\eta^4$-1,4-diphenyl-1,3-butadiene, $\eta^4$-1,3-butadiene, $\eta^4$-1,4-dibenzyl-1,3-butadiene, $\eta^4$-1-phenyl-1,3-pentadiene, $\eta^4$-3-methyl-1,3-pentadiene, $\eta^4$-1,4- bis(trimethylsilyl)-1,3-butadiene 2,3-dimethylbutadiene, $\eta^4$-2,4-hexadiene and isoprene. As the conjugated diene radical formed from $X^1$ and $X^2$, preference is given to those of 1,3-butadiene, 2,4-hexadiene, 1-phenyl-1,3-pentadiene and 1,4-diphenylbutadiene, wherein these radicals may further be substituted by a hydrocarbyl having 1–10 carbon atoms.

Among them, preference is given to those which are each a halogen atom, a hydrocarbyl having 1–20 carbon atoms or a sulfur-containing group.

In the formula (20), Y denotes a divalent hydrocarbon group having 1–20 carbon atoms, a divalent halogenated hydrocarbon group having 1–20 carbon atoms, a divalent silicium-containing group, a divalent germanium-containing group, a divalent tin-containing group, the group —O—, —CO—, —S—, —SO—, —SO$_2$—, —NR$^5$—, —P(R$^5$)—, —P(O)(R$^5$)—, —BR$^5$— or —AlR$^5$—, with R$^5$ being hydrogen atom, a halogen atom, a hydrocarbyl having 1–20 carbon atoms, a halogenated hydrocarbyl having 1–20 carbon atoms, concrete examples of which include divalent hydrocarbon groups having 1–20 carbon atoms, for example, alkylenes, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and aralkylenes, such as diphenylmethylene and diphenyl-1,2-ethylene;

halogenated hydrocarbon groups in which the above divalent hydrocarbon groups having 1–20 carbon atoms are halogenated, such as chloromethylene;

silicium-containing divalent groups, for example, alkylsilylenes, alkarylsilylenes and arylsilylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; alkyldisilylenes, alkaryldisilylenes and aryldisilylenes, such as tetrametyl-1,2-disilylene, tetraphenyl-1,2-disilylene and so on;

germanium-containing divalent groups, in which the silicium in the above silicium-containing divalent groups is replaced by germanium; and tin-containing divalent groups, in which the silicium in the above silicium-containing divalent groups is replaced by tin.

Among these divalent groups, those in which the shortest bond of —Y— bridge as shown by the formula (20) is constituted of one or two atoms are preferred.

The group R$^5$ stands, the same as the above, for a halogen atom, a hydrocarbyl having 1–20 carbon atoms and a halogenated hydrocarbyl having 1–20 carbon atoms.

Among them, the group Y may favorably be divalent hydrocarbyl groups each having 1–5 carbon atoms, silicium-containing divalent groups and germanium-containing divalent groups, wherein preference is given to the silicium-containing divalent groups, with special preference to alkylsilylenes, alkarylsilylenes and arylsilylenes.

As the metallocene (e-3), a transition metal compound represented by the following formula (22) may also be used.

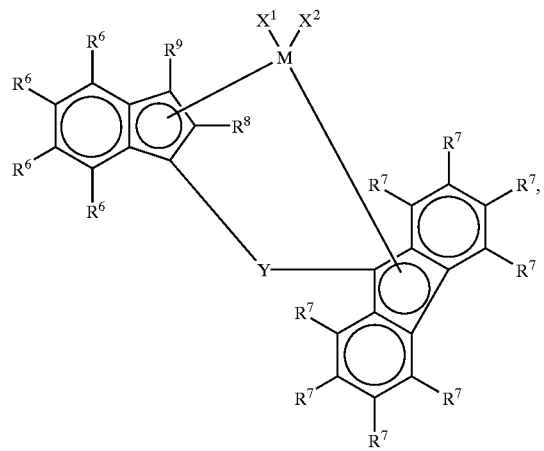

(22)

in which M denotes a transition metal element of Group 4 of the periodic table and may concretely stand for titanium, zirconium or hafnium, preferably zirconium.

R$^6$s in the formula (22) may be identical with or different from each other and stand each for hydrogen atom, a halogen atom, an alkyl having 1–10 carbon atoms, an aryl having 6–10 carbon atoms, an alkenyl having 2–10 carbon atoms, a silicium-containing group, an oxygen-containing group, a sulfur-containing group, a nitrogen-containing group or a phosphorus-containing group, wherein, as the halogen or the alkyl having 1–10 carbon atoms, there, may be exemplified concretely the same ones as those given for R$^1$ of the formula (20) and, as the silicium-containing group, oxygen-containing group, sulfur-containing group, nitrogen-containing group and phosphorus-containing group, there may be exemplified the same ones as those given for R$^2$ of the formula (20).

As the aryl having 6–10 carbon atoms, there may be exemplified phenyl and α- and β-naphthyl. As the alkenyl having 2–10 carbon atoms, there may be exemplified vinyl, propenyl and cyclohexenyl.

These alkyls and alkenyls may be substituted by halogen.

Among them, R$^6$ may preferably be an alkyl, aryl or hydrogen atom, wherein particular preference is given to hydrocarbon groups having 1–3 carbon atoms, such as methyl, ethyl, n-propyl and i-propyl, and such aryl groups as phenyl, α-naphthyl and β-naphthyl, as well as hydrogen atom.

R$^7$s in the formula (22) may be identical with or different from each other and stand each for hydrogen atom, a halogen atom, an alkyl having 1–10 carbon atoms, an aryl having 6–20 carbon atoms, an alkenyl having 2–10 carbon atoms, an aralkyl having 7–40 carbon atoms, an aralkenyl having 8–40 carbon atoms, an alkaryl having 7–40 carbon atoms, a silicium-containing group, an oxygen-containing group, a sulfur-containing group, a nitrogen-containing group or a phosphorus-containing group. Concretely, they may be those which are given for R$^2$ in the formula (20).

These alkyls, aryls, alkenyls, aralkyls, aralkenyls and alkaryls may be substituted by halogen.

Among them, R$^7$s may each preferably be hydrogen atom or an alkyl, wherein special preference is given to hydrogen atom and hydrocarbyls having 1–4 carbon atoms, such as methyl, ethyl, n-propyl, i-propyl, n-butyl and tert-butyl.

R$^6$ and R$^7$ may be identical with or different from each other.

Either one of R$^8$ and R$^9$ in the formula (22) is an alkyl having 1–5 carbon atoms and the other is the same as those given for $R^2$ in the formula (20) and is, thus, hydrogen atom, a halogen atom, an alkyl having 1–10 carbon atoms, an alkenyl having 2–10 carbon atoms, a silicium-containing group, an oxygen-containing group, a sulfur-containing group a nitrogen-containing group or a phosphorus-containing group.

As the alkyl having 1–5 carbon atoms, there may be exemplified methyl, ethyl, propyl, butyl and pentyl.

Among them, it is favorable that either one of $R^8$ and $R^9$ is an alkyl having 1–3 carbon atoms, such as methyl, ethyl or propyl, and the other one is hydrogen atom.

$X^1$ and $X^2$ in the formula (22) may be identical with or different from each other and stand each for hydrogen atom, a halogen atom, a hydrocarbyl having 1–20 carbon atoms, a halogenated hydrocarbyl having 1–20 carbon atoms, an oxygen-containing group, a sulfur-containing group or a nitrogen-containing group, as in those $X^1$ and $X^2$ in the formula (20), or, further, a conjugated diene radical formed from $X^1$ and $X^2$.

Among them, halogen atoms and hydrocarbyls having 1–20 carbon atoms are preferred.

In the formula (22), Y denotes, as in the formula (20), a divalent hydrocarbon group having 1–20 carbon atoms, a divalent halogenated hydrocarbon group having 1–20 carbon atoms, a divalent silicium-containing group, a divalent germanium-containing group, a divalent tin-containing group, the group —O—, —CO—, —S—, —SO—, —SO$_2$—, —NR$^5$—, —P(R$^5$)—, —P(O)(R$^5$)—, —BR$^5$— or —AlR$^5$—, with R$^5$ being hydrogen atom, a halogen atom, a hydrocarbyl having 1–20 carbon atoms or a halogenated hydrocarbyl having 1–20 carbon atoms.

Among them, Y may preferably be a divalent hydrocarbyl having 1–5 carbon atoms, a silicium-containing divalent group or a germanium-containing divalent group, more preferably a silicium-containing divalent group, especially preferably an alkylsilylene, an alkylarylsilylene or an arylsilylene.

The metallocenes (e-3) may be employed alone or in a combination of two or more of them. It is possible to use the metallocenes (e-3) under dilution in a solvent such as a hydrocarbon or a halogenated hydrocarbon. It is also possible to use the metallocene (e-3) in a state held in contact with a granular carrier compound.

For the carrier compound supporting the metallocene (e-3), inorganic carrier compounds, such as, SiO$_2$, Al$_2$O$_3$, B$_2$O$_3$, MgO, ZrO$_2$, CaO, TiO$_2$, ZnO, SnO$_2$, BaO and ThO, and. resins of, for example, polyethylene, polypropylene, poly-1-butene, poly-4-methyl-1-pentene and styrene/divinylbenzene copolymer, may be employed. These carrier compounds may be used alone or in a combination of two or more of them.

Now, the description is directed to the organoaluminum-oxy compound (f-2) and the ionizing ionic compound (g-1) to be used for preparing the metallocene catalyst.

The organoaluminum-oxy compound (f-2) may be aluminoxanes known per se or may be such organoaluminum-oxy compounds (f-2) which are insoluble in benzene.

Such known aluminoxanes may concretely be represented by the following formula (23) or (24):

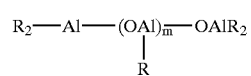
(23)

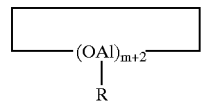

in which R represents a hydrocarbon group, such as, methyl, ethyl, propyl or butyl, preferably methyl or ethyl, with particular preference to methyl, m is an integer of 2 or; higher, preferably 5–40.

In the formula (23) or (24), the aluminoxane may be composed of mixed alkyloxyaluminum units constituted of an alkyloxyaluminum unit represented by the formula {OAl (R$^1$)} and an alkyloxyaluminum unit represented by the formula {OAl(R$^2$)}, wherein R$^1$ and R$^2$ may each be exemplified by those hydrocarbyls which are defined for R and wherein R$^1$ is different from R$^2$.

The organoaluminum-oxy compound (f-2) may contain a small amount of organometallic component(s) of metal(s) other than aluminum.

As the ionizing ionic compound (g-1), which may sometimes be called "ionic ionizing compound" or "ionic compound", there may be exemplified Lewis acids, ionic compounds, boranes and carboranes.

As the Lewis acids, those which are represented by BR$_3$, wherein R stands for fluorine or a phenyl group which may have substituent group(s), such as, fluorine, methyl or trifluoromethyl, may be employed. Concrete examples of such a Lewis acid include trifluoroboron, triphenylboron, tris(4-fluorophenyl)boron, tris(3,5-di-fluorophenyl)boron, tris(4-fluoromethylphenyl)boron, tris(pentafluorophenyl) boron, tris(p-tolyl)boron, tris(o-tolyl)boron and tris(3,5-dimethylphenyl)boron.

As the ionic compounds mentioned above, there may be enumerated, for example, trialkyl-substituted ammonium salts, N,N-dialkylanilinium salts, dialkylammonium salts and triarylphosphonium salts. As the trialkyl-substituted ammonium salt, for the ionic compound, there may be exemplified triethylammonium tetra(phenyl)boron, tripropylammonium tetra(phenyl)boron and tri(n-butyl) ammonium tetra(phenyl)boron. As the dialkylammonium salt for the ionic compound, there may be exemplified di(1-propyl)ammonium tetra(pentafluorophenyl)boron and dicyclohexylammonium tetra(phenyl)boron.

As the ionic compounds mentioned above, there may be exemplified triphenylcarbenium tetrakis(pentafluorophenyl) borate, N,N-dimethylanilinium tetrakis(pentafluorophenyl) borate and ferrocenium tetra(pentafluorophenyl)borate.

As the boranes mentioned above, there may be exemplified salts of metal borane anions, such as, decaborane(9); bis[tri(n-butyl)ammonium]nonaborate, bis[tri(n-butyl) ammonium]decaborate and bis[tri-(n-butyl)ammonium] bis (dodecahydride dodecaborate)nickelate(III).

As the carboranes mentioned above, there may be exemplified salts of metal carborane anions, such as, 4-carbanonaborane(9), 1,3-dicarbanonaborane(8), bis[tri(n-butyl)ammonium] bis(undecahydride-7-carbaundecaborate] nickelate(IV).

The ionizing ionic compound (g-1) may be used alone or in a combination of two or more of them. The organoaluminum-oxy compound (f-2) and the ionizing ionic compound (g-1) may be used in a form held on the carrier compound mentioned previously.

On preparing the metallocene catalyst, the organoaluminum compounds (f-1) described above can be used together with the organoaluminum-oxy compound (f-2) or the ionizing ionic compound (g-1).

For producing the third ethylenic copolymer rubber according to the present invention, ethylene (a), the α-olefin (b), the triene (c) represented by the formula (1) and the non-conjugated polyene (d) are co-polymerized, usually in a liquid phase, in the presence of the catalyst based on titanium or based on vanadium or the metallocene catalyst as described above. Here, a hydrocarbon solvent is used usually, while it is permissible to use the α-olefin (b) as the solvent.

For such a hydrocarbon solvent, there may be used, for example, an aliphatic hydrocarbon, such as pentane, hexane, heptane, octane, decane, dodecane or kerosene, or a halogenated derivative thereof; a cyclo-aliphatic hydrocarbon, such as cyclohexane, methylcyclopentane or methylcyclohexane, or a halogenated derivative thereof; an aromatic hydrocarbon or a halogenated derivative thereof, such as benzene, toluene, xylene or chlorobenzene, wherein the solvent may be used in a combination.

The copolymerization of ethylene (a), the α-olefin (b), the triene (c) and the non-conjugated polyene (d) may be effected either in a batch-wise or continuous way. On carrying out the copolymerization in a batch-wise way, the catalyst may be used at a concentration as given below:

When using the catalyst based on titanium composed of the solid titaniferous component (e-1) and the organoaluminum compound (f-1), the solid titaniferous component (e-1) may be used usually in an amount of, as calculated based on titanium atom, about 0.001 to about 1.0 mmol, preferably about 0.005 to 0.5 mmol, per one liter of the copolymerization volume. The organoaluminum compound (f-1) may be used usually in an amount of, as calculated based on the metal atom in the organoaluminum compound (f-1), about 10–500 moles, preferably 20–200 moles, per one mole of the titanium in the solid titaniferous component (e-1). In case an electron donor is used, it may be used usually in an amount of about 0.001 to 10 moles, preferably 0.01 to 2 moles, especially preferably 0.05 to 1 mole, per one mole of the metal atom in the organoaluminum compound (f-1).

In case the catalyst based on vanadium composed of the soluble vanadium compound (e-2) and the organoaluminum compound (f-1) is employed, the concentration of the soluble vanadium compound in the polymerization system may usually be in the range from 0.01 to 5 mmol, preferably from 0.05 to 3 mmol, per liter of the polymerization volume. The soluble vanadium compound (e-2) may preferably be supplied at a concentration of 10 times or less, preferably 1–7 times, more preferably 1–5 times the concentration of the soluble vanadium compound present in the polymerization system.

The organoaluminum compound (f-1) may be supplied in a mole ratio of aluminum atom to vanadium atom (Al/V) in the polymerization system of 2 or higher, preferably in the range of 2–50, more preferably in the range of 3–20.

The soluble vanadium compound (e-2) and the organoaluminum compound (f-1) is supplied usually under dilution by the hydrocarbon solvent, liquid ethylene, the triene (c) or so on. Here, it is favorable to supply the organoaluminum compound (f-1) to the polymerization system at a concentration adjusted to any voluntary concentration, for example, below 50 times the existing concentration thereof in the polymerization system, while the soluble vanadium compound (e-2) is supplied thereto preferably under dilution at a concentration as given above.

In the case of using the metallocene catalyst composed of the metallocene (e-3), the organoaluminum-oxy compound. (f-2) or the ionizing ionic compound (g-1), the concentration of the metallocene (e-3) is usually in the range of 0.00005–0.1 mmol, preferably in the range of 0.0001–0.05 mmol, per liter of the polymerization volume. The organoaluminum-oxy compound (f-2) may be supplied in a mole ratio of aluminum atom to the transition metal atom in the metallocene (Al/transition metal) in the polymerization system of 1–10,000, preferably 10–5,000.

For the ionizing ionic compound (g-1), it is supplied in a mole ratio of the ionizing ionic compound (g-1) to the metallocene (e-3) in the copolymerization system {ionizing ionic compound (g-1)/metallocene (e-3)} in the range of 0.5–20, preferably 1–10.

In case of incorporation of the organoaluminum compound (f-1), it is used usually in such an amount that its concentration will be at about 0–5 mmol per liter of the polymerization volume, preferably about 0–2 mmol per liter of the polymerization volume.

For co-polymerizing the comonomers, i.e. ethylene (a), the α-olefin (b), the triene (c) and the non-conjugated polyene (d) etc. in the presence of the catalyst based on titanium mentioned above, the copolymerization is realized usually under the condition of a temperature in the range from −20° C. to +150° C. preferably from 0 to 120° C., more preferably from 0 to 100° C., and a pressure in the range over 0 up to 7.8 MPa (80 kgf/cm² gauge), preferably over 0 up to 4.9 MPa (50 kgf/cm² gauge).

For co-polymerizing the comonomers, i.e. ethylene (a), the α-olefin (b), the triene (c) and the non-conjugated polyene (d) etc. in the presence of the catalyst based on vanadium mentioned above, the copolymerization is effected usually under the condition of a temperature in the range from −50° C. to +100° C. preferably from −30° C. to +80° C., more preferably from −20° C. to +60° C., and a pressure in the range over 0 up to 4.9 MPa (50 kgf/cm² gauge), preferably over 0 up to 2.0 MPa (20 kgf/cm² gauge).

For co-polymerizing the comonomers, i.e. ethylene (a), the α-olefin (b), the triene (c) and the non-conjugated polyene (d) etc. in the presence of the metallocene catalyst mentioned above, the copolymerization is effected usually under the condition of a temperature in the range from −20° C. to +150° C. preferably from 0 to 120° C., more preferably from 0 to 100° C., and a pressure in the range over 0 up to 7.8 MPa (80 kgf/cm² guage), preferably in the range over 0 up to 4.9 MPa (50 kgf/cm² gauge).

On the copolymerization, ethylene (a), the α-olefin (b), the triene (c) and the non-conjugated polyene (d) as well as other comonomer(s) to be incorporated on requirement may be supplied to the polymerization system each in such an amount that the third ethylenic copolymer rubber having the above-mentioned definite compostion will be obtained. On the copolymerization; a molecular weight regulator, such as hydrogen, can be employed.

By copolymerizing ethylene (a), the α-olefin (b), the triene (c) and the non-conjugated polyene (d) in this manner, the third ethylenic copolymer rubber is obtained usually as a liquid polymerization mixture containing the copolymer. This liquid copolymerization mixture is treated by the ordinary technique, whereby the third ethylenic copolymer rubber is obtained.

The third ethylenic copolymer rubber according to the present invention may also be a modified product in which one or more polar monomers are grafted on the copolymer.

The graft-modified third ethylenic copolymer rubber according to the present invention, which may be called also a graft modified ethylenic copolymer rubber, can be obtained by reacting the third ethylenic copolymer rubber of the present invention described above with one or more polar monomers in the presence or absence of a radical initiator.

As the polar monomer to be used for the graft-modificastion, there may be employed, for example, hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and derivatives thereof, vinyl esters and vinyl chloride.

As the hydroxyl group-containing ethylenically unsaturated compound to be used for the graft-modification, there may be exemplified (meth)acrylic acid esters, such as, hydroxyethyl(meth)acrylate, 2-hydroxypropyl(meth)acrylate, 3-hydroxypropyl(meth)acrylate, 2-hydroxy-3-phenoxypropyl(meth)acrylate, 3-chloro-2-hydroxypropyl (meth)acrylate, glycerin mono(meth)acrylate, pentaerythritol mono(meth)acrylate, trimethylolpropane mono(meth)acrylate, tetramethylolethane mono(meth)acrylate, butanediol mono(meth)acrylate, polyethyleneglycol mono(meth)acrylate and 2-(6-hydroxyhexanoyloxy)ethylacrylate; as well as 10-undecen-1-ol, 1-octen-3-ol, 2-methanolnorbornene, hydroxystyrene, hydroxyethyl vinyl ether, hydroxybutyl vinyl ether, N-methylol acrylamide, 2-(meth)acryloyloxyethyl acid phosphate, glycerin monoallyl ether, allyl alcohol, allyloxyethanol, 2-butene-1,4-diol and glycerin monoalcohol. Here, "(meth)acryl" means "acryl and/or methacryl".

The amino group-containing ethylenically unsaturated compound to be used for the graft-modification is a compound containing ethylenic double bond(s) and amino group(s). For such compounds, monomeric compounds based on vinyl having at least one radical among amino group and substituted amino groups represented by the following formula (25) may be enumerated.

(25)

in which $R^1$ denotes hydrogen atom, methyl or ethyl and $R^2$ denotes hydrogen atom, an alkyl having 1–12 carbon atoms, preferably 1–8 carbon atoms, or a cycloalkyl having 6–12 carbon atoms, preferably 6–8 carbon atoms. Here, the alkyl and the cycloalkyl may contain substituent group(s).

As the amino group-containing ethylenically unsaturated compound, there may be exemplified derivatives based on alkyl esters of acrylic or methacrylic acid, such as aminoethyl(meth)acrylate, propylaminoethyl(meth)acrylate, dimethylaminoethyl methacrylate, aminopropyl(meth)acrylate, phenylaminoethyl methacrylate and cyclohexylaminoethyl methacrylate; derivatives based on vinylamine, such as, N-vinyldiethylamine and N-acetylvinylamine; derivatives based on allylamine, such as, allylamine, methacrylamine, N-methylacrylamine, N,N-dimethylacrylamine and N,N-dimethylaminopropylacrylamine; derivatives based on acrylamide, such as, acryalmide and N-methylacrylamide; aminostyrenes, such as p-aminostyrene etc.; and 6-aminohexylsuccinimide and 2-aminoethylsuccinimide.

The epoxy group-containing ethylenically unsaturated compound to be used for the graft-modificatiom is a monomer containing at least one polymerizable unsaturation bond and at least one epoxy group in the molecule. As the epoxy group-containing ethylenically unsaturated compound, there may be exemplified glycidyl acrylate; glycidyl methacrylate; mono- and dialkylglycidyl esters (wherein the alkyl group for the monoglycidyl ester has 1–12 carbon atoms) of dicarboxylic acids such as, mono- and diglycidyl esters of maleic acid, mono- and diglycidyl esters of fumaric acid, mono- and diglycidyl esters of crotonic acid, mono- and diglycidyl esters of tetrahydrophthalic acid, mono- and diglycidyl esters of itaconic acid, mono- and diglycidyl esters of butenetricarboxylic acid, mono- and diglycidyl esters of citraconic acid, mono- and diglycidyl esters of endo-cis-bicyclo[2.2.1]hept-5-ene-2,3-dicarboxylic acid (Nadic acid TM), mono- and diglycidyl esters of endocis-bicyclo[2.2.1]hept-5-ene-2-methyl-2,3-dicarboxylic acid (methyl Nadic acid TM) and mono- and diglycidyl esters of allylsuccinic acid; as well as alkyl glycidyl esters of p-styrene carboxylic acid, allyl glycidyl ether, 2-methylallyl glycidyl ether, styrene p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinyl-cyclohexene monoxide.

As the aromatic vinyl compound to be used for the graft modification, compounds represented by the following formula (26) may be exemplified:

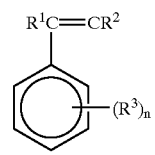
(26)

wherein $R^1$ and $R^2$ denote, independently of each other, hydrogen atom or an alkyl having 1–3 carbon atoms, concretely, for example, methyl, ethyl, propyl or isopropyl, $R^3$ denotes a hydrocarbon group having 1–3 carbon atoms, concretely, for example, methyl, ethyl, propyl or isopropyl, or a halogen atom, such as chlorine, bromine or iodine, and n is an integer of 0–5, preferably 1–5.

Examples of the aromatic vinyl compound include styrene, α-methylstyrene, o-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

As the unsaturated carboxylic acid to be used for the graft-modification, there may be exemplified unsaturated carboxylic acids, such as, acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2.2.1]hept-2-ene-5,6-dicarboxylic acid, and anhydrides of these acids as well as derivatives of these acids, such as acid halides, amides, imides and esters. Concrete examples include malenyl chloride, malenyl imide, maleic anhydride, itaconic anhydride, citraconic anhydride, tetrahydrophthalic anhydride, bicyclo[2.2.1]hept-2-ene-5,6-dicarboxylic acid anhydride, dimethyl maleate, monomethyl maleate, diethyl maleate, diethyl fumarate, dimethyl itaconate, diethyl citraconate, dimethyl tetrahydrophthalate, dimethyl bicyclo[2.2.1]hept-2-ene-5,6-dicarboxylate, hydroxyethyl(meth)acrylate, hydroxypropyl(meth)acrylate, glycidyl(meth)acrylate, aminoethyl methacrylate and aminopropyl methacrylate. Among them, (meth)acrylic acid, maleic anhydrid, hydroxyethyl(meth)acrylate, glycidyl methacrylate and aminopropyl methacrylate are preferred.

As the vinyl esters to be used for the graft-modification, there may be recited, vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butylbezoate, vinyl salicylate and vinyl cyclohexane carboxylate.

The polar monomer to be used for the graft-modification is used in an amount of usually 0.1–100 parts by weight, preferably 0.5–80 parts by weight, per 100 parts by weight of the third ethylenic copolymer rubber before the modification.

As the radical initiator to be used for the graft-modification, organic peroxides and azo compounds may be employed.

For the organic peroxide to be used for the graft modification, there may be recited, for example, dicumyl peroxide, di-t-butyl peroxide, 2,5-dimethyl-2,5-bis(t-butylperoxy)hexane, 2,5-dimethyl-2,5-bis(t-butylperoxy) hexyne-3, 1,3-bis(t-butylperoxyisopropyl)benzene, 1,1-bis (t-butylperoxy)valerate, benzoyl peroxide, t-butylperoxy benzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide. As the azo compound, there may be exemplified azoisobutyronitrile and dimethylazoisobutyronitrile.

Such a radical initiator may preferably be used in general in an amount of 0.001–10 parts by weight per 100 parts by weight of the third ethylenic copolymer rubber before the modification.

While the radical initiator may be employed as such by mixing with the third ethylenic copolymer rubber and with the polar monomer(s), it is possible also to use the radical initiator as a solution by dissolving it in a small amount of an organic solvent. As the organic solvent to be employed here, every organic solvent capable of dissolving the radical initiator can be used without any restriction. For such an organic solvent, an aromatic hydrocarbon solvent, such as, benzene, toluene or xylene; an aliphatic hydrocarbon solvent, such as, pentane, hexane, heptane, octane, nonane or decane; an alicyclic hydrocarbon solvent, such as, cyclohexane, methylcyclohexane or decahydronaphthalene; a chlorinated hydrocarbon, such as, chlorobenzene, dichlorobenzene, trichlorobenzene, methylene chloride, chloroform, carbon tetrachloride or tetrachloroethylene; a solvent based on alcohol, such as, methanol, ethanol, n-propanol, iso-propanol, n-butanol, sec-butanol, or tert-butanol; a solvent based on ketone, such as, acetone, methyl ethyl ketone or methyl isobutyl ketone; a solvent based on ester, such as, ethyl acetate or dimethylphthalate; or a solvent based on ether, such as, dimethyl ether, diethyl ether, di-n-amyl ether, tetrahydrofuran or dioxyanisole.

On graft-modifying the third ethylenic copolymer rubber according to the present invention, a reducing substance may also be used. Such a reducing substance has a function of increasing the grafted amount in the resulting graft-modified ethylenic copolymer rubber.

As the reducing substance, there may be recited, for example, iron(II) ion, chromium ion, cobalt ion, nickel ion, palladium ion, sulfites, hydroxylamine and hydrazine, as well as compounds containing the groups —SH, —SO$_3$H, —NHNH$_2$ and —COCH(OH)—.

For such a reducing substance, there may be exemplified ferrous chloride, potassium bichromate, cobalt chloride, cobalt naphthenate, palladium chloride, ethanolamine, diethanolamine, N,N-dimethylanilin, hydrazine, ethyl mercaptane, benzenesulfonic acid and p-toluenesulfonic acid.

The reducing substance mentioned above is used usually in an amount of 0.001–5 parts by weight, preferably 0.1–3 parts by weight, per 100 parts by weight of the third ethylenic copolymer rubber before the modification.

The graft-modification of the third ethylenic copolymer rubber according to the present invention can be carried out by known methods, for example, by dissolving the third ethylenic copolymer rubber in an organic solvent, adding then the polar monomer(s) and the radical initiator thereto and subjecting the resulting mixture to reaction at a temperature of 70–200° C., preferably 80–190° C. for a duration of 0.5–15 hours, preferably 1–10 hours.

As the organic solvent to be used in the graft-modification, every organic solvent capable of dissolving the third ethylenic copolymer rubber can be used without any restriction. For such an organic solvent, a solvent based on aromatic hydrocarbon, such as benzene, toluene and xylene, or a solvent based on aliphatic hydrocarbon, such as, pentane, hexane or heptane, may be used.

It is also possible to produce the graft-modified ethylenic copolymer rubber by reacting the third ethylenic copolymer rubber with the polar monomer without any solvent using an extruding machine or the like. The reaction temperature may usually be above the melting point of the third ethylenic copolymer rubber and, concretely, at a temperature in the range from 120° C. to 250° C. The reaction duration at such a temperature may usually be in the range from 0.5 to 10 minutes.

The grafted amount of the grafted groups derived from the polar monomer(s) in the resulting graft-modified ethylenic copolymer rubber may usually be in the range from 0.1 to 50% by weight, preferably in the range from 0.2 to 30% by weight.

The graft-modified ethylenic copolymer rubber is superior in the adhesion onto metals and polar resins. It is possible to improve the shock resistance and the low temperature shock resistance of the modified ethylenic copolymer rubber by blending it with a polar resin.

Molded products obtained by molding the graft-modified ethylenic copolymer rubber are superior in the susceptibility to printing and coating thereon. It is possible to obtain a resin composition in which the dispersion of the filler is improved, by blending the graft-modified ethylenic copolymer rubber with a polyolefin together with a filler, such as glass fiber or an inorganic material. In this manner, resin compositions in which the advantages due to compounding with a filler is retained, can be obtained, while attaining an improved mechanical strength.

Cross-linkable Rubber Composition

The cross-linkable rubber composition according to the present invention (in the following, occasionally referred to merely as the rubber composition) comprises (A) the above-mentioned ethylenic copolymer rubber according to the present invention and comprises usually at least one of the additives selected from the group consisting of (B) a reinforcing agent, (C) a softener, (D) a vulcanizing agent and (E) a foaming agent. As the ethylenic copolymer rubber (A), at least one ethylenic copolymer rubber selected from the group consisting of the first ethylenic copolymer rubber, the second ethylenic copolymer rubber and the third ethylenic copolymer rubber. For the third ethylenic copolymer rubber, the graft-modified ethylenic copolymer rubber described above may also be used.

While the rubber composition according to the present invention can be used in its non-cross-linked state as such, more superior characteristic features may be attained when it is used in cross-linked state.

The rubber composition according to the present invention may be subjected to cross linking by methods of heating while using a vulcanizing agent or of irradiation by an electron beam without using any vulcanizing agent.

The rubber composition according to the present invention may favorably contain at least 20% by weight, preferably in the range from 22 to 70% by weight, more preferably in the range from 25 to 50% by weight, of the ethylenic copolymer rubber (A), based on the total weight of the rubber composition. When the proportion of the ethylenic copolymer rubber (A) in the rubber composition is in the above range, better material properties for the rubber composition will be revealed.

As the reinforcing agent (B) to be incorporated according to the present invention, known ones for being compounded in known rubbers may be employed without any restrction, wherein concrete examples thereof include carbon black products, such as SRF, GPF, FEF, MAF, HAF, ISAF, SAF, FT and MT; surface treated carbon black products in which the above-mentioned carbon black is subjected to a surface treatment using, for example, a silane coupling agent; inorganic fillers, such as, silica, activated calcium carbonate, light calcium carbonate, heavy calcium carbonate, fine powdery talc, talc, fine powdery silicic acid and clays.

The content of the reinforcing agent (B) may favorably be in a proportion of 300 parts by weight or less, preferably 10–300 parts by weight, more preferably 10–200 parts by weight, per 100 parts by weight of the ethylenic copolymer rubber (A).

When the content of the reinforcing agent (B) is in the above range, a cross-linked rubber product superior in the mechanical properties, such as, tensile strength, tear strength, wear resistance and hardness can be obtained and the production costs may also be reduced.

For the softener (C) to be incorporated according to the present invention, known ones which are compounded in known rubbers may be employed without any restrction, wherein concrete examples thereof include softeners based on petroleum, such as process oils, lubricating oils, paraffin, liquid paraffin, petroleum asphalt and vaseline; softeners based on coal tar, such as, coal tar and coal tar pitch; softeners based on fatty oils, such as, castor oil, linseed oil, rape-seed oil, palm oil; waxes, such as, tall oil, sabu, factice, bees wax, carnauba wax and lanolin; fatty acids and fatty acid salts, such as, ricinoleic acid, palmitic acid, barium stearate, calcium stearate and zinc laurate; softeners based on esters, such as dioctyl phthalate, dioctyl adipate and dioctyl sebacate; and synthetic high-polymeric substances, such as, petroleum resin, atactic polypropylene and cumarone-indene resin. Among them, softeners based on petroleum are preferred, with particular preference to process oils.

The content of the softener (C) may favorably be in a proportion of 200 parts by weight or less, preferably 10–200 parts by weight, more preferably 10–150 parts by weight, per 100 parts by weight of the ethylenic copolymer rubber (A).

For cross-linking the rubber composition according to the present invention by heating, a vulcanizing agent (D) is admixed usually to the rubber composition. It is possible on requirement to incorporate one or more compounds constituting the vulcanizer system, such as, vulcanization accelerator, vulcanization assistant and so on.

As the vulcanizing agent (D), there may be employed, for example, sulfur, compounds based on sulfur and organic peroxides.

The form of sulfur is not specifically limited and, for example, powdery sulfur, precipitated sulfur, colloidal sulfur, surface-treated sulfur and insoluble sulfur, may be employed.

As the compound based on sulfur, there may be exemplified sulfur chloride, sulfur dichloride, high-polymeric polysulfides, morpholine disulfide, alkylphenol disulfide, tetramethylthiuram disulfide and selenium dimethyldithiocarbamate.

As the organic peroxide to be used as the vulcanizing agent (D), there may be exemplified alkyl peroxides, such as dicumyl peroxide, di-t-butyl peroxide, di-t-butylperoxy-3,3,5-trimethylcyclohexane, t-butylcumyl peroxide, di-t-amyl peroxide, 2,5-dimethyl-2,5-di(t-butylperoxy)hexane-3, 2,5-dimethyl-2,5-di(benzoylperoxy)hexane, 2,5-dimethyl-2,5-di(t-butylperoxy)hexane, α,α'-bis(t-butylperoxy-m-isopropyl)benzene and t-butyl hydroperoxide; peroxyesters, such as t-butylperoxy acetate, t-butylperoxy isobutyrate, t-butylperoxy pivalate, t-butylperoxy maleate, t-butylperoxy neodecanoate, t-butylperoxy benzoate and di-t-butylperoxy phthalate; and ketone peroxides, such as dicyclohexanone peroxide etc. They can be used in a combination of two or more of them.

Among them, organic peroxides having a 1 minute half life temperature of 130–200° C. are preferred, for example, concretely, dicumyl peroxide, di-t-butyl peroxide, di-t-butylperoxy-3,3,5-trimethylcyclohexane, t-butylcumyl peroxide, di-t-amyl peroxide and t-butyl hydroperoxide.

According to the present invention, it is favorable to use, among the above vulcanizing agents, sulfur or a compound based on sulfur, in particular, sulfur, since thereby a rubber composition and a cross-linked rubber product exhibiting superior characteristic properties can be obtained.

When the vulcanizing agent (D) is sulfur or a compound based on sulfur, it can favorably be used in an amount of 0.1–10 parts by weight, preferably 0.5–5 parts by weight, per 100 parts by weight of the ethylenic copolymer rubber (A).

When the vulcanizing agent (D) is an organic peroxide, it can favorably be used in an amount of 0.0003–0.05 mole, preferably 0.001–0.03 mole, per 100 grams of the ethylenic copolymer rubber (A), or in an amount of 0.05–15 parts by weight, preferably 0.15–5 parts by weight, per 100 parts by weight of the ethylenic copolymer rubber (A).

When sulfur or a compound based on sulfur is used as the vulcanizing agent (D), it is preferable to use concurrently a vulcanization accelerator.

As the vulcanization accelerator, there may be recited, for example, compounds based on sulfenamide, such as N-cyclohexyl-2-benzothiazole sulfenamide (CBS), N-oxydiethylene-2-benzothiazole sulfenamide and N,N-diisopropyl-2-benzothiazole sulfenamide;

compounds based on thiazole, such as 2-mercaptobenzothiazole (MBT), 2-(2,4-dinitrophenyl) mercaptobenzothiazole, 2-(2,6-diethyl-4-morpholinothio) benzothiazole, 2-(4'-morpholinodithio)benzothiazole and dibenzothiazyl disulfide;

guanidine compounds, such as diphenylguanidine, triphenylguanidine, diorthonitrileguanidine, orthonitrile biguanide and diphenylguanidine phthalate;

compounds, based on aldehydeamine or aldehyde ammonia, such as reaction products of acetaldehyde with aniline, condensation products of butyl aldehyde with aniline, hexamethylenetetramine and acetaldehyde ammonia;

compounds based on imidazoline, such as 2-mercaptoimidazoline and the like;

compounds based on thiourea, such as thiocarbanilide, diethylthiourea, dibutylthiourea trimethylthiourea and diorthotolylthiourea;

compounds based on thiuram, such as tetramethylthiuram monosulfide, tetramethylthiuram disulfide (TMTD), tetraethylthiuram disulfide, tetrabutylthiuram disulfide, pentamethylenethiuram tetrasulfide and dipentamethylenethiuram tetrasulfide (DPTT);

compounds based on dithio acid salts, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

compounds based on xanthate, such as zinc dibutylxantogenate; and zinc white.

The above vulcanization accelerator may favorably be used in an amount of 0.1–20 parts by weight, preferably 0.2–10 parts by weight, per 100 parts by weight of the ethylenic copolymer rubber (A).

In case an organic peroxide is used as the vulcanizing agent (D), it is preferable to use concurrently a vulcanization assistant (a polyfunctional monomer) in an amount of 0.5–2 moles per one mole of the organic peroxide, preferably in nearly equimolar proportion therewith.

As the vulcanization assistant, there may be exemplified sulfur; compounds based on quinone dioxime, such as p-quinone dioxime etc.; and polyfunctional monomers. As the polyfunctional monomer, for example, compounds based on (meth)acrylate, such as trimethylol propane triacrylate and polyethyleneglycol dimethacrylate; compounds based on allyl, such as diallyl phthalate and triallyl cyanurate; compounds based on maleimide, such as m-phenylene bis-maleimide etc.; and divinylbenzene.

The rubber composition according to the present invention may be molded under foaming, if it contains one or more compounds constituting a foaming system, such as a foaming agent (E), a foaming assistant and so on.

As the foaming agent (E), those which are used in general for foaming-molding rubbers can be used widely. Concrete examples therefor include inorganic foaming agents, such as sodium bicarbonate, sodium carbonate, ammonium bicarbonate, ammonium carbonate and ammonium nitrite; nitroso compounds, such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonylhydrazide compounds, such as benzenesulfonylhydrazide, toluenesulfonylhydrazide, p,p'-oxybis(benzenesulfonylhydrazide) and diphenylsulfon-3,3'-disulfonylhydrazide; and azids, such as calcium azide, 4,4-diphenyldisulfonyl azide and p-toluenesulfonyl azide.

Among them, nitroso compounds, azo compounds and azides are preferred. The foaming agent (E) may be used in an amount of 0.5–30 parts by weight, preferably 1–20 parts by weight, per 100 parts by weight of the ethylenic copolymer rubber (A). From the rubber composition having a content of the foaming agent (E) in the range given above, a foamed product having an apparent density of 0.03–0.8 g/cm$^3$ can be produced.

It is possible to use also a foaming assistant concurrently with the foaming agent (E). The concurrent use of a foaming assistant will reveal effects of reduction of the decomposition temperature of the foaming agent (E), acceleration of the decomposition and homogenization of the foam sizes. As the foaming assistant, for example, organic acids, such as salicylic acid, phthalic acid, stearic acid and oxalic acid, as well as urea and its derivatives may be enumerated.

The foaming assistant may favorably be used in an amount of 0.01–10 parts by weight, preferably 0.1–5 parts by weight, per 100 parts by weight of the ethylenic copolymer rubber (A).

The rubber composition according to the present invention may contain various other components, for example, stabilizers, such as antioxydant and light-stabilizer; processing assistant; plasticizer; colorants; fire retardant; and other rubber additives. The kind and the amount of incorporation of such other components may be chosen adequately in accordance with each specific application.

The rubber composition according to the present invention may favorably contain an antioxidant, since thereby the life of the product can be extended. As the antioxydant, there may be exemplified stabilizers based on aromatic secondary amine, such as phenylnaphthylamine, 4,4'-($\alpha,\alpha$-dimethylbenzyl)diphenylamine and N,N'-di-2-naphthyl-p-phenylenediamine; stabilizers based on phenol, such as 2,6-di-t-butyl-4-methylphenol and tetrakis-{methylene-3-(3',5'-di-t-butyl-4'-hydroxyphenyl)propionate}methane; stabilizers based on thioether, such as bis{2-methyl-4-(3-n-alkylthiopropionyloxy)-5-t-butylphenyl}sulfide and the like; stabilizers based on benzimidazole, such as 2-mercaptobenzimidazole etc.; stabilizers based on dithiocarbamate, such as, nickel dibutyldithiocarbamate etc.; and stabilizers based on quinoline, such as a polymer of 2,2,4-trimethyl-1,2-dihydroquinoline. It is possible to use two or more of them concurrently.

Such an antioxydant may be used adequately in an amount of 5 parts by weight or less, preferably 3 parts by weight or less, per 100 parts by weight of the ethylenic copolymer rubber (A).

For the processing assistants, those which are used in general as processing assistant in rubbers can be used widely. Concrete examples include higher fatty acids, such as, ricinoleic acid, stearic acid, palmitic acid and lauric acid, and salts and esters of these higher fatty acids, such as barium stearate, zinc stearate and calcium stearate.

The processing assistant may be used adequately in an amount of 10 parts by weight or less, preferably 5 parts by weight or less, per 100 parts by weight of the ethylenic copolymer rubber (A).

The rubber composition according to the present invention may contain other rubber component(s) known per se, within the range not obstructing the purpose of the invention.

For such other rubber component(s), there may be enumerated, for example, natural rubber (NR), rubbers based on isoprene, such as isoprene rubber (IR) etc.; rubbers based on conjugated diene, such as butadiene rubber (BR), styrene-butadiene rubber (SBR), acrilonitrile-butadiene rubber (NBR) and chloroprene rubber (CR).

It is also possible to incorporate other known copolymer rubber(s) based on ethylene/$\alpha$-olefin, for example, an ethylene/propylene random copolymer (EPR) and an ethylene/$\alpha$-olefin/polyene copolymer other than the ethylenic copolymer rubber (A), such as EPDM.

The rubber composition according to the present invention can be prepared from the ethylenic copolymer rubber (A) and at least one additive selected from the group consisting of the reinforcing agent (B), the softener (C), the vulcanizing agent (D) and the foaming agent (E) together with the above-mentioned optionally blended other component(s) by general methods for preparing rubber blend. It can be prepared, for example, by kneading the ethylenic copolymer rubber (A), the reinforcing agent (B), softener (C) and the said other component(s) on an internal mixer, such as Bumbury mixer, kneader and intermix, at a temperature of 80–170° C. for 3–10 minutes and, after admixing thereto, if necessary, a vulcanizing agent (D), a vulcanization accelerator, a vulcanization assistant or so on, the resulting compound is further kneaded on a roller, such as an open roll, or on a kneader at a roller temperature of 40–80° C. for 5–30 minutes, before it is subdividedly discharged out. In this manner, a rubber composition (compounded rubber) in a form of usually a ribbon or sheet can be obtained. If the kneading temperature in the internal mixer is lower, it is possible also to knead the composition together with the vulcanizing agent (D), vulcanization accelerator and foaming agent (E) and so on simultaneously.

Cross-linked rubber according to the present invention is a product obtained by pre-forming the non-cross-linked rubber composition as above into a desired shape by means of various forming techniques usually by using a forming machine, such as an extrusion molding machine, a calendering roll, a press, an injection molding machine or a transfer molding machine, whereupon the so-preformed green product is heated either during the pre-forming or after having been transferred to a vulcanizing vessel or is subjected to irradiation of electron beam to effect vulcanization. Foamed articles can be obtained by subjecting a non-cross-linked rubber blend containing a foaming agent (E) to cross linking by procedures as given above, wherein foaming proceeds during the cross-linking simultaneously.

For effecting cross linking of the rubber composition according to the present invention by heating, it is preferable to effect the heating using a heating vessel with a heating mode of, for example, HAV (hot air), PCM (glass beads fluidized bed), UHF (ultra high frequency radio wave), steam or LCM (hot molten salt vessel), at a temperature of 150–270° C. for 1–30 minutes.

For effecting cross linking by electron beam irradiation without using vulcanizing agent (D), the pre-formed rubber composition is subjected to irradiation with an electron beam having an energy of 0.1–10 MeV, preferably 0.3–2 MeV so as to provide an absorbed dose of 0.5–35 Mrad, preferably 0.5–10 Mrad.

For molding and cross linking, a metal mold may or may not be employed. In case of without using metal mold, the rubber composition is usually molded under cross linking in continuous mode.

The cross-linked rubber according to the present invention may favorably be used for applications, for example, parts for automobile industry, such as sealing elements, automobile weather strips, door glass run channel, window sash, radiator hose, brake parts and wiper blade; industrial rubber products, such as rubber rollers, belts, packings and hoses; electric insulators, such as anode cap and grommet; architectural and constructional parts, such as gaskets for architectural use, sheets for constructional uses; and rubber-coated cloth. Molded cross-linked rubber articles obtained by foaming with heating the rubber compound containing the foaming agent (E) may be used for applications, such as heat insulators and cushioning materials.

The molded cross-linked rubber article for sealing according to the present invention is made of the above-mentioned cross-linked rubber and is formed into a configuration corresponding to each specific application. The molded cross-linked rubber article for sealing according to the present invention may or may not be foamed product.

The molded cross-linked rubber article according to the present invention may favorably be served for applications, for example, sealants for automobile, such as weather strip sponge for automobile, in-mold foaming-molded sponge, door glass run channel and door sash; architectural gaskets; and constructional sealing materials, such as sheets for constructional use. The molded cross-linked rubber article for sealing according to the present invention is superior especially in the sealing performance and in the form-preservability.

The weather strip sponge for automobile according to the present invention is made of the above-mentioned foamed article of the cross-linked rubber and is especially superior in the sealing performance and in the form-preservability.

Latex Composition of Cross-linked Rubber

The fourth ethylenic copolymer rubber (F) to be used as the base polymer of the cross-linked rubber latex composition according to the present invention is an ethylene/α-olefin/triene copolymer rubber which comprises a structural unit derived from ethylene (a), a structural unit derived from the α-olefin of 3–20 carbon atoms (b) and a structural unit derived from the triene (c) represented by the formula (1).

As the α-olefin of 3–20 carbon atoms (b) to be used for the fourth ethylenic copolymer rubber (F), there may be enumerated concretely, for example, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Among them, preference is given to propylene, 1-butene, 1-hexene and 1-octene. These α-olefins (b) may be used either each alone or in a combination of two or more of them.

Among the trienes (c) represented by the formula (1), those in which both $R^3$ and $R^4$ represent methyl are preferred. The random copolymer rubber obtained using such triene(s) (c) as a starting monomer is particularly superior in the balance between the vulcanization velocity and the scorching profile.

As the concrete examples of the triene (c) represented by the formula (1), the same trienes (c) as those described above for the ethylenic copolymer rubber may be recited. Among the trienes (c), 4,8-dimethyl-1,4,8-decatriene (DMDT) is preferred. The triene (c) may be present as a mixture of trans- and cis-isomers or as sole trans- or cis-isomer. The structural unit derived from the triene (c) in the fourth ethylenic copolymer rubber (F) is represented by the formula (1') given above.

In the fourth ethylenic copolymer rubber (F) to be used according to the present invention, the structural units derived from the respective comonomers, ethylene (a), the α-olefin(s) and the triene(s) (c), are coupled in random arrangement, in which branched structure originated from the triene(s) (c) is present and the main chain has substantially a linear structure. The fact that the structural unit, derived from the triene (c) has the above-mentioned structure can be confirmed by inspecting the copolymer by $^{13}$C-NMR spectrometry.

In the fourth ethylenic copolymer rubber (F), other comonomer(s) than the triene(s) (c) may also be co-polymerized. For such other comonomer(s), there may be enumerated the non-conjugate polyene(s) (d) and other non-conjugated dienes, for example, those in which only one polymerizable carbon-to-carbon double bond is present in the molecule. Also, cyclic olefins may be enumerated. For such other comonomer(s), those which are exemplified as other monomer(s) for the first ethylenic copolymer rubber and the like may be used. There may be enumerated concretely 1,4-hexadiene, 5-ethylidene-2-norbornene, dicyclopentadiene, 5-vinylnorbornene and so on.

For the fourth ethylenic copolymer rubber (F) to be used according to the present invention, those which have the composition and the characteristic features as given below are preferred.

The fourth ethylenic copolymer rubber (F) may favorably have a mole ratio of ethylene (a) versus the α-olefin having 3–20 carbon atoms (b), namely (ethylene/α-olefin), in the range from 95/5 to 40/60, preferably from 92/8 to 60/40, more preferably from 90/10 to 65/35. The fourth ethylenic coplymer rubber (F) having the mole ratio of ethylene/α-olefin in the range from 95/5 to 40/60 is superior both in the flexibility at low temperatures and in the shock resistance and heat resistance at low temperatures.

The fourth ethylenic copolymer rubber (F) may favorably have a content of the triene (c) in the range from 0.1 to 30 mole %, preferably from 0.5 to 7 mole %. The fourth ethylenic copolymer rubber (F) having a content of the triene (c) in the range from 0.1 to 30 mole % is superior in the ability for modifying the shock resistance and surface gloss.

The fourth ethylenic copolymer rubber (F) may favorably have an intrinsic viscosity (η) determined in decalin at 135° C. in the range from 0.1 to 10 dl/g, preferably from 0.31 to 10 dl/g, more preferably from 0.5 to 2.0 dl/g, especially preferably from 0.7 to 1.5 dl/g. The intrinsic viscosity (η) of the fourth ethlenic copolymer rubber (F) exerts a significant influence on the particle size reguration in preparing latex and on the characteristic properties of the resulting latex. When the intrinsic viscosity of the fourth ethylenic copolymer rubber (F) is in the range from 0.1 to 10 dl/g, a better effect on the improvement of the shock resistance may be realized, permitting thus to use it as a resin modifier favoritely. At the same time, it functions to regulate the average particle size of the solid component in the latex to a value of 3.0 μm or lower, whereby the storage stability of the latex composition becomes superior.

For the fourth ethylenic copolymer rubber (F), there may be used the first, second and third ethylenic copolymer rubbers, while use of other ones may be permitted. The fourth erthylenic copolymer rubber (F) may be produced by the same production process as that for the first, second or third ethylenic copolymer rubber.

The low molecular weight (co)polymer (G) to be used according to the present invention is a low molecular weight polyethylene (homopolymer of ethylene), a low molecular weight ethylene/α-olefin copolymer, a low molecular weight polyethylene modified by a compound based on unsaturated carboxylic acid or a low molecular weight ethylene/α-olefin copolymer modified by a compound based on unsaturated carboxylic acid. Among them, the low molecular weight polyethylene modified by a compound based on unsaturated carboxylic acid or the low molecular weight ethylene/α-olefin copolymer modified by a compound based on unsaturated carboxylic acid is preferred.

The low molecular weight (co)polymer(s) (G) play a role of atomizing the fourth ethylenic copolymer rubber (F) easily upon preparation of latex.

The low molecular weight (co)polymer (G) may be present in a waxy state or in a liquid state at normal temperature.

According to the present invention, it is possible to incorporate, either each individually or concurrently, one or more low molecular weight (co)polymers of waxy consistency at normal temperature and one or more low molecular weight (co)polymers of liquid consistency at normal temperature.

As the above-mentioned low molecular weight polyethylene, there may be exemplified a polyethylene wax. As the above-mentioned low molecular weight ethylene/α-olefin copolymer, there may be exemplified an ethylene/α-olefin copolymer, such as an ethylene/propylene copolymer, an ethylene/1-butene copolymer or so on. The low molecular weight polyethylene and the low molecular weight ethylene/α-olefin copolymer may favorably have intrinsic viscosities (η) determined in decalin at 135° C. in the range from 0.01 to 0.3 dl/g, preferably from 0.01 to 0.2 dl/g.

It is possible also to use, as the low molecular weight (co)polymer (G), a modified low molecular weight polyethylene or a modified low molecular weight ethylene/α-olefin copolymer obtained by co-polymerizing or graft-co-polymerizing a compound based on unsaturated carboxylic acid described afterwards onto the low molecular weight polyethylene or onto the low molecular weight ethylene/α-olefin copolymer mentioned above.

As the compound based on unsaturated carboxylic acid, there may be enumerated unsaturated carboxylic acids having in the molecule 3–20 carbon atoms, preferably 3–10 carbon atoms, acid anhydrides, amides, imides and esters of them.

Concretely, there may be recited, for example, unsaturated carboxylic acids, such as acrylic acid, methacrylic acid, maleic acid, fumaric acid, itaconic acid, citraconic acid, norbornene dicarboxylic acid, tetrahydrophthalic acid and bicyclo[2.2.1]hept-2-en-5,6-dicarboxylic acid;

acid anhydrides of unsaturated carboxylic acids, such as maleic anhydride, itaconic anhydride, citraconic anhydride, tetrahydrophthalic anhydride and bicyclo[2.2.1]hept-2-en-5,6-dicarboxylic acid anhydride;

unsaturated carboxylic acid amides, such as maleic acid monoamide and maleic acid diamide, and unsaturated carboxylic acid imides, such as maleimide; and esters of unsaturated carboxylic acids, such as methyl acrylate, methyl methacrylate, dimethyl maleate, monomethyl maleate, diethyl maleate, diethyl fumarate, dimethyl itaconate, diethyl citraconate, dimethyl tetrahydrophthalate, dimethyl bicyclo[2.2.1]hept-2-en-5,6-dicarboxylate and glycidyl(meth)acrylate.

Among them, compounds based on unsaturated carboxylic acid, such as maleic acid, maleic anhydride, maleic acid monoamide, maleic acid diamide, maleimide, monomethyl maleate, diethyl maleate and glycidyl(meth)acrylate, are preferred. These compound based on unsaturated carboxylic acid may be used each solely or in a combination.

The amount of copolymerization or grafting of the compound based on unsaturated carboxylic acid to be co-polymerized with or grafted onto the low molecular weight polyethylene or the low molecular weight ethylene/α-olefin copolymer may favorably be, in general, in the range from 0.2 to 50%, preferably from 0.2 to 20%, more preferably from 0.2 to 10%, based on the weight of the modified low molecular weight copolymer.

The intrinsic viscosity (η) of the modified low molecular weight copolymer such as above, determined in decalin at 135° C. may favorably be in the range from 0.01 to 0.3 dl/g, preferably from 0.01 to 0.2 dl/g.

The low molecular weight (co)polymer (G) such as above may be incorporated either individually or in a combination.

In the cross-linked rubber latex composition according to the present invention, the low molecular weight (co)polymer(s) (G) may be incorporated in a proportion in the range from 2 to 30 parts by weight, preferably from 5 to 25 parts by weight, more preferably from 5 to 20 parts by weight, per 100 parts by weight of the fourth ethylenic copolymer rubber (F).

By incorporating the low molecular weight copolymer (G) in the above proportion, a finer atomization of the latex may be realized easily and, as a result, the storage stability of the resulting cross-linked latex composition becomes better. At the same time, the resulting cross-linked rubber latex composition indicates a superior effect of improvement of the shock resistance and so on and can be used favorably as a resin modifier.

The cross-linked rubber latex composition according to the present invention can be obtained by dispersing the fourth ethylenic copolymer rubber (F) and the low molecular weight (co)polymer(s) (G) in the proportion given above uniformly in an aqueous medium in the presence of a surfactant to build up a latex and subjecting the resulting latex composition, then, to a cross-linking treatment.

As the above-mentioned surfactant, anionic, cationic and non-ionic surfactants known per se may be used, wherein, in particular, anionic surfactants, such as sodium salts and potassium salts of fatty acids, may preferably be employed.

It is favorable in general to use the surfactant in a proportion in the range from 0.2 to 20 parts by weight, preferably from 0.5 to 10 parts by weight, per 100 parts by weight of the fourth ethylenic copolymer rubber (F), though such proportion may be different due to each specific kind of the fourth ethylenic copolymer rubber (F) used and of the low molecular weight (co)polymer (G) used and so on.

For preparing the latex, it is enough to practise, for example, to dissolve the fourth ethylenic copolymer rubber (F) and the low molecular weight (co)polymer(s) (G) in a hydrocarbon solvent, such as n-hexane, homogeneously to obtain a solution and, then, to mix and disperse the resulting solution with agitation in an aqueous solution containing dispersed therein a predetermined amount of a surfactant, followed by volatilizing off of the solvent component by heating at an adequate temperature.

It is preferable in view of the feasibility of handling in the state of latex to choose the amount of the aqueous solution to be used usually such that the concentration of solid matter in the latex is in the range from 5 to 65%, preferably from 10 to 60%, based on the weight of the product latex.

The latex composition obtained as above is then subjected to cross-linking treatment, whereby cross-linking bonds are formed in molecular chains in the fourth ethylenic copolymer rubber (F).

The cross-linking treatment can be realized by techniques therefor known per se, such as cross linking by an ionizing radiant ray and cross linking by using an organic peroxide. The cross-linking treatment may be carried out with or without admixing polyfunctional comonomer(s) to the latex composition.

As the polyfunctional comonomer, there may favorably be employed, for example, monomers having at least two ethylenic unsaturated groups, in particular, vinyl groups. Concretely, for example, divinylbenzene, tetramethylenediacrylate, glyceryltriacrylate, ethyleneglycoldimethacrylate, 1,2,4-trivinylcyclohexane, tetraallyloxyethane, may be enumerated.

The polyfunctional comonomer may be employed in a proportion of 0.1–20 parts, preferably 0.3–5 parts by weight, per 100 parts by weight of the fourth ethylenic copolymer rubber (F).

As the ionizing radiant ray mentioned above, any of α-ray, β-ray, γ-ray, electron beam and X-ray may be employed. The irradiation strength of such ionizing radiant ray may favorably be at a dose in the range from 1 to 50 Mrad, preferably from 5 to 25 Mrad.

The cross-linking treatment using an organic peroxide may be carried out by dispersing the organic peroxide uniformly in the latex composition and heating the resulting latex composition at a temperature above the decomposition temperature of the organic peroxide.

As the organic peroxide, those which have a 10 hour half life temperature from 0° C. to 100° C. are preferred, in the point of view of the stability of the latex particles, of safety in operation of the cross-linking reaction and of economy. Concretely, there may be enumerated, for example, 1,1-di-tert-butylperoxy-3,3,5-trimethylcyclohexane, 1,1-bis(tert-butylperoxy)cyclohexane, tert-butyl peroxypivalate, tertbutylperoxy-2-ethyl hexanoate, tert-butylperoxyisopropyl carbonate, 2,5-dimethyl-2,5-di (benzoylperoxy)hexane, 3,5,5-trimethylhexanoyl peroxide, benzoyl peroxide, p-chlorobenzoyl peroxide, 2,4-dichlorobenzoyl peroxide, isobutyl peroxide, diisopropyl peroxydicarbonate and di(2-ethylhexyl)peroxycarbonate.

Usually, the organic peroxide may favorably be used in a proportion of 0.3–20 parts by weight, preferably 1–10 parts by weight, per 100 parts by weight of the fourth ethylenic copolymer rubber (F) in the latex composition.

The condition of cross-linking treatment, such as heating duration and so on, is settled in such a way that the content of the hot-toluene-insoluble portion of the component of fourth ethylenic copolymer rubber (F) will be not lower than 30% by weight, preferably not lower than 50% by weight, more preferably not lower than 60% by weight, while either normal pressure or superatmosphertic pressure may be employed. Concretely, it may be suitable to settle the heating duration usually to be 5 to 7 times the half life.

The above-mentioned content of the hot-toluene-insoluble portion, nemely, the gel fraction, is expressed by the proportion of the portion insoluble in toluene at 120° C. relative to the total solid matter of the latex composition, and can be utilized as a parameter of the degree of cross linking. Concrete method of determining the content of the hot-toluene-insoluble portion will be given afterwards in the description of Examples. When the gel fraction is in the above-mentioned range, a sufficient effect of improvement in the shock resistance can be obtained.

The average particle size of the solid matter in the cross-linked rubber latex composition according to the present invention may favorably be in the range from 0.2 to 3.0, preferably from 0.2 to 2.0 $\mu$m.

The cross-linked rubber latex composition according to the present invention may contain, within the limit not obstructing the purpose of the invention, additives known per se, such as pigment, thickener, plasticizer, antiseptic, antifoaming agent, pH regulator, antioxidizer and antioxidant. These additives may be admixed to the latex composition either before the cross-linking treatment or after the cross-linking treatment.

The cross-linked rubber latex composition prepared as above which contains the fourth ethylenic copolymer rubber (F) as the main component has an average particle size of the solid matter in the range from 0.2 to 3.0 $\mu$m and, therefore, is superior in the storage stability. The cross-linked rubber latex composition has a hot-toluene-insoluble portion (gel fraction) of the fourth ethylenic copolymer rubber (F) not lower than 30% by weight and, therefore, is very useful for modifying resins, which are not able to mold into a molded article superior in the shock resistance and in the surface gloss, into resins which can be molded into a molded article superior in the shock resistance and in the surface gloss. Such modification of resins can be attained by blending the cross-linked rubber latex composition according to the present invention with the resin to be modified. The amount of the cross-linked rubber latex composition according to the present invention to be blended may favorably be such that the amount of the solid matter of the cross-linked rubber latex composition occupied in the total solid matter of the resin after having been modified will be in the range from 5 to 50% by weight, preferably from 10 to 40% by weight. There is no restriction for the resin to be modified, an example being polyvinyl chloride.

Although the reason that the cross-linked rubber latex composition according to the present invention improves the modifying effect on the shock resistance and on the surface gloss is not clear, it is assumed to be due to that the fourth ethylenic copolymer rubber (F) has a content of specific triene(s) (c) and, thus, exhibits higher susceptibility to being subjected to grafting, whereby dispersibility of the ethylene/α-olefin/triene copolymer rubber in the resin component to be modified is increased.

The AES resin according to the present invention is a copolymer of acrylonitrile, the fourth ethylenic copolymer rubber (F) and styrene, in which acrylonitrile and styrene are grafted onto the fourth ethylenic copolymer rubber (F). This AES resin comprises also the low molecular weight (co) polymer(s) (G) and so on which are the components of the cross-linked rubber latex composition.

The AES resin according to the present invention can be produced by known techniques from the cross-linked rubber latex composition according to the present invention.

For example, the AES resin according to the present invention can be produced by subjecting the cross-linked rubber latex composition according to the present invention to an emulsion graft-polymerization with acrylonitrile and styrene.

A further process for producing the AES resin as given below may also be incorporated in order to correspond to varying kinds, to attain easy quality improvement, to increase the productivity and to economize waste water treatment. In this process, a dry product rich in rubber content obtained by subjecting the cross-linked rubber latex composition according to the present invention to an emulsion graft-polymerization with acrylonitrile and styrene is first prepared. Then, this dry product is belded with a preliminarily prepared resin component, namely, acrylonitrile/styrene resin (AS resin) to obtain the AES resin. Here, the contemplated AES resin is prepared by adjusting the amount of the fourth ethylenic copolymer rubber (F) by regulating the blend ratio. Such blending is performed using, for example, extruding machine, at a temperature in the range from 150 to 300° C. preferably from 180 to 250° C.

The content of the cross-linked rubber latex composition according to the present invention in the AES resin according to the present invention may faborably be in the range from 5 to 50% by weight, preferably from 10 to 40% by weight, as the amount of solid matter of the cross-linked rubber latex composition occupying in the total solid matter of the AES resin.

The AES resin according to the present invention can be processed into a molded article superior in the shock resistance and in the surface gloss without deteriorating the original superior weatherability and resistance to solvent intrinsic to the fourth ethylenic copolymer rubber (F), as contrasted to conventional AES resins.

Therefore, the AES resin according to the present invention can serve in itself for use for casings of household electric appliances, for automobile internal furnitures, such as instrument panel, for automobile external furnishings, such as front grille, and so on. The AES resin according to the present invention can also be used for modifying shock resistance etc. of, for example, PVC, by blending therewith.

As described above, the first and the second ethylenic copolymer rubbers according to the present invention are novel and useful copolymer rubbers. The frist and the second ethylenic copolymer rubbers are each a random copolymer rubber which has specific proportions of structural units derived from ethylene (a), one or more α-olefins each having 3–20 carbon atoms (b), one or more speicific trienes (c) and, if necessary one or more non-conjugated polyenes having in the molecule at least two polymerizable double bonds (d) and reveals specific characteristic features, so that they exhibit high cross-linking velocity and are superior in the scorching stability, in the workability and in the moldability with superior mechanical properties of the cross-linked product, such as the strength of the cross-linked rubber.

The third ethylenic copolymer rubber according to the present invention is novel and useful. The third ethylenic copolymer rubber according to the present invention is a random copolymer rubber comprising structural units derived from (a) ethylene, (b) one or more α-olefins having 3–20 carbon atoms, (c) specific triene(s) and (d) one or more non-conjugated polyenes having at least two polymerizable double bonds in the molecule, respectively, each in a specific proportion and exhibiting specific material properties, whereby it reveals higher cross-linking velocity, is superior in the scorching stability, in the workability and in the moldability and is, after having been subjected to cross linking, superior also in the mechanical characteristic properties, such as strength of cross-linked rubber etc.

For producing the ethylenic copolymer rubber according to the present invention, ethylene (a), the α-olefin(s) having 3–20 carbon atoms, the specific triene(s) and the non-conjugated polyene(s) having in the molecule at least two polymerizable double bonds (d) are subjected to copolymerization in the presence of a catalyst constituted of a transition metal compound (e), an organoaluminum compound (f) and/or an ionizing ionic compound (g), whereby the first, the second and the third ethylenic copolymer rubbers can be produced in a simple and efficient manner.

The rubber composition according to the present invention comprises the first, the second or the third ethylenic copolymer rubber and exhibits a high cross-linking velocity and is superior in the scorching stability, in the workability and in the moldability, with superior mechanical properties of the cross-linked product, such as the strength of the cross-linked rubber, together with superior form-preservability.

The cross-linked rubber according to the present invention comprises a cross-linked product of the rubber composition mentioned above and can be produced in an efficient manner at lower costs and is superior in the mechanical properties, such as the strength of cross-linked rubber, together with superior form-preservability.

The molded cross-linked rubber article for sealing according to the present invention comprises a cross-linked product of the rubber composition mentioned above and can be produced in an efficient manner at lower costs and is superior in the mechanical properties, such as the strength of cross-linked rubber, and in the form-preservability, together with superior sealing performance.

The weather strip sponge for automobile according to the present invention comprises a foamed article of the cross-linked rubber mentioned above and is superior in the sealing performance and in the form-preservability.

The molded cross-linked rubber article according to the present invention is obtained under cross linking from the rubber composition and can be produced in a simple and efficient manner at lower costs.

The cross-linked rubber latex composition according to the present invention comprises the specific ethylenic copolymer rubber (F) and the low molecular weight (co) polymer(s) (G) each in a specific proportion, wherein the component of the ethylenic copolymer rubber (F) has cross-linked bonds, so that it can afford to modify a resin, which cannot be molded into a molded article superior in the shock resistance and in the surface gloss, into a resin which can be molded into a molded article superior in the shock resistance and in the surface gloss, without deteriorating the original superior properties of weatherability and resistance to solvents intrinsic to the ethylenic copolymer rubber(F).

The AES resin according to the present invention is prepared using the cross-linked rubber latex composition mentioned above and can be processed into molded articles superior in the shock resistance and in the surface gloss without deteriorating the original superior properties of weatherability and reistance to solvents intrinsic to the ethylenic copolymer rubber (F), as contrasted to conventional AES resins.

THE BEST MODE FOR EMBODYING THE INVENTION

In the following, the present invention will be described by way of Examples, wherein it is to be noted that the present invention should not be restricted to these Examples.

PRODUCTION EXAMPLE 1

Synthesis of <<4,8-dimethyl-1,4,8-decatriene (DMDT)>>

In a stainless steel autoclave of 1,500 ml capacity, there were charged 257 grams (1.89 mol) of 2,6-dimethyl-1,3,6-octatriene, 500 ml of toluene, 6.18 grams (35.2 mmol) of cobalt thiocyanate, 21.4 grams (70.4 mmol) of tri-o-tolylphosphine and 200 ml of a solution of triethylalunimum in toluene with a concentration of 1 mol/l (200 mmol of triethylaluminum) under a nitrogen atmosphere and the autoclave was closed tightly. Then, a bomb of ethylene was connected directly to the autoclave to introduce thereinto ethylene so as to reach an inner pressure of the autoclave of 0.98 MPa (10 kgf/cm$^2$, gauge). Then, the autoclave was heated at 120° C. and the reaction was effected for a total duration of 5 hours while supplementing thereto the consumed amount of ethylene intermittently. After termination of the reaction, the autoclave was cooled and was opened, whereupon the resulting reaction mixture was poured into 500 ml of water to cause phase separation into aqueous and organic phases. The so-separated organic phase was subjected to rectification in a distillation column of 80 trays to obtain 108 grams of the contemplated product, i.e. 4,8-dimethyl-1,4-8-decatriene (with a yield of 36%). The analytical results of the so-obtained 4,8-dimethyl-1,4,8-decatriene product are recited in the following.

(1) boiling point: 91° C./2660 Pa (20 mmHg)

(2) mass spectrum: m/z 164 (M$^+$ molecular ion peaks): 149, 135, 123, 108, 95, 79, 67, 55, 41

(3) $^1$H-NMR spectrum (solvent: CDCl$_3$) absorption peaks are recited below:
ppm (δ)
1.55 (3H, doublet)
1.65 (6H, doublet)
2.05 (4H, multiplet)
2.75 (2H, doublet)
4.95 (2H, multiplet)
5.2 (2H, multiplet)
5.7 (1H, multiplet)

Example 1-1

A toluene solution in which a zirconium compound and methylalumoxane are dissolved was prepared by mixing rac-dimethylsylilene-bis(2-methyl-4-phenyl-1-indenyl) zirconium dichloride and a toluene solution of methylalumoxane(methylaluminoxane) (with 1.2 mg atom/ml, as converted into aluminum atom) in the dark at room temperature while agitation for 30 minutes. The Zr concentration of this toluene solution was 0.002 mmol/ml and the concentration of methylalumoxane was 1.2 mg atom/ml calculated as aluminum atom.

To this toluene solution, there was added, then, hexane in an amount five times the amount of the toluene solution with agitation to prepare a catalyst solution having a Zr concentration and a methylalumoxane concentration as given below, which was used as the polymerization catalyst.

Zr concentration: 0.00033 mmol/ml (=0.33 mmol/l)

Methylalumoxane concentraion (calculated as Al atom): 0.20 mmol/ml (=200 mmol/l)

Using a stainless steel polymerization reactor of a capacity of 15 liters equipped with stirring blade, copolymerization of ethylene, propylene and 4,8-dimethyl-1,4,8-decatriene (DMDT) was carried out in a continuous manner in the presence of the polymerization catalyst given above. Thus, the polymerization reactor was supplied, from above thereinto, with dehydrated and purified hexane at a rate of 3.23 liters per hour, a mixed solution of the zirconium compound and the methylalumoxane given above at a rate of 0.03 liter per hour, a solution of triisobutylaluminum in hexane (of a concentration of 17 mmol/l) at a rate of 1.5 liters per hour and a solution of DMDT in hexane (of a concentration of 0.02 l/l) at a rate of 1.8 liters per hour each continuously. To the polymerization reactor was also supplied, from above thereinto, ethylene at a rate of 190 liters per hour and propylene at a rate of 140 liters per hour each continuously. The polymerization was carried out at 70° C. in such a manner that the average residence time was settled to be one hour. To the polymerization liquor withdrawn from the polymerization reactor at a lower portion thereof, a small amount of methanol was added to terminate the polymerization and the copolymer was separated from the solvent by steam stripping treatment, followed by drying under a condition of 100° C. and a reduced pressure (13,300 Pa, i.e. 100 mmHg) for 24 hours.

By the procedures as above, an ethylene/propylene/DMDT copolymer rubber (1-A) was obtained in an amount of 75 grams per hour. The resulting copolymer had a mole ratio of the structural unit derived from ethylene versus the structural unit derived from propylene (ethylene/propylene) of 73/27, a DMDT content of 2.8 mole % and an intrinsic viscosity (η) determined in decalin solvent at 135° C. of 2.7 dl/g. The g'-value thereof was 0.87. The results are recited in Table 1-1 together with other material properties.

Examples 1-2 and 1-3

An ethylene/propylene/DMDT copolymer rubber (1-B) or an ethylene/1-butene/DMDT copolymer rubber (1-C) was obtained in the same procedures as in Example 1-1, except that the sort of the α-olefin and/or the polymerization condition was changed. The characteristic properties are recited in Table 1-1.

Comparative Example 1-1

An ethylene/propylene/ENB copolymer rubber (1-D) was obtained in the same procedures as in Example 1-1, except that the polymerization reactor of Example 1-1 was supplied, from above thereinto, with dehydrated and purified hexane at a rate of 2.7 liters per hour and, as the catalyst, with a solution of VOCl$_3$ in hexane (of a concentration of 6 mmol/l) at 1.4 liters per hour and a solution of Al($C_2H_5$)$_{1.5}$Cl$_{1.5}$ in hexane (of a concentration of 42 mmol/l) at a rate of 1.4 liters per hour and, further, a solution of 5-ethylidene-2-norbornene (ENB) in hexane (of a concentration of 0.03 l/l) at a rate of 1.5 liters per hour each continuously, with alteration of the polymerization temperature to 40° C. The characteristc properties are recited in Table 1-1.

Comparative Examples 1-2 and 1-3

Using ENB or 4-ethylidene-8-methyl-1,7-nonadiene (in the following, denoted as EMND) {both compounds do not belong to the triene (c)} instead of DMDT, a copolymer rubber (1-E) or a copolymer rubber (1-F) was obtained in the same procedures as in Example 1-1 except that the polymerization condition was changed. The characteristic properties are recited in Table 1-1.

TABLE 1-1

|  | Example | | | Comp. Example | | |
| --- | --- | --- | --- | --- | --- | --- |
|  | 1-1 | 1-2 | 1-3 | 1-1 | 1-2 | 1-3 |
| Copolymer rubber | 1-A | 1-B | 1-C | 1-D | 1-E | 1-F |
| α-olefin | Propyl. | Propyl. | 1-but. | Propyl. | Propyl. | Propyl. |
| Mole ratio ethylene/α-olefin | 73/27 | 63/37 | 81/19 | 71/29 | 68/32 | 71/29 |
| Polyene | DMDT | DMDT | DMDT | ENB | ENB | EMND |
| Cont. of polyene (mole %) | 2.8 | 3.1 | 2.6 | 2.6 | 3.6 | 2.5 |
| Intrinsic visc. (dl/g) | 2.7 | 2.5 | 2.8 | 2.6 | 2.4 | 2.5 |
| g' | 0.87 | 0.85 | 0.79 | 0.99 | 0.85 | 0.86 |
| Complex viscosity coeffic. ($\eta^*_A$) ($\times 10^3$ Pa · S) | 10.4 | 10.2 | 11.0 | 6.0 | 7.3 | 9.8 |
| ($\eta^*_B$)/($\eta^*_A$)[1] | 53 | 59 | 67 | 25 | 47 | 51 |

Note in Table 1-1:
[1]($\eta^*_B$)/($\eta^*_A$): The ratio of the complex viscosity coefficient ($\eta^*_A$) at 8 rad/sec to the complex viscosity coefficient ($\eta^*_B$) at 0.01 rad/sec in the assessment of dependence of the complex viscosity coefficient ($\eta^*$) determined from dynamic viscoelasticity at 190° C. on frequency. ($\eta^*_A$) and ($\eta^*_B$)/($\eta^*_A$) can be used as a parameter for presupposing the form-preservability of a polymer. The conditions of determination are as follows:
Apparatus: RDS (trademark) of the firm Rheometric
Observation temperature: 190° C.
Distortion: 1%
Sample: A sheet of a thickness of 2 mm was prepared using a 50 ton press machine at 190° C., from which a sheet disc of a diameter of 25 mm was punched out to use as a sample for determining the viscoelasticity.

Examples 1-4 to 1-6 and Comparative Examples 1-4 to 1-6

Using copolymer rubber as given in Table 1-1 each in a blending amount as given in Table 1-2, a blended rubber (rubber composition) was prepared.

TABLE 1-2

| Components | Part by weight |
| --- | --- |
| Components for blending on Bumbury's mixer | |
| Copolymer rubber*1) | 100 |
| Activated zinc white*2) | 5 |
| Stearic acid | 2 |

TABLE 1-2-continued

| Components | Part by weight |
| --- | --- |
| Dimethyldistearylammonium chloride*3) | 2 |
| SRF-H carbon black*4) | 90 |
| Paraffinic oil*5) | 70 |
| Components added on roller | |
| 2-mercaptobenzothiazole*6) | 0.8 |
| 2-(4'-morpholinodithio)benzothiazole*7) | 1.2 |
| Zinc dibutyldithiocarbamate*8) | 2.0 |
| Ethylenethiourea*9) | 1.0 |
| p,p'-oxy-bis(benzenesulfonylhydrazide)*10) | 3.5 |
| Calcium oxide*11) | 5.0 |

*1)Copolymer rubber; see Table 1-1.
*2)Activated zinc white: META Z 102 (trademark) of Inouye Sekkai Kogyo K. K.
*3)Dimethyldistearylammonium chloride: ARKARD 2HT (trademark) of Lion-Akuzo K. K.
*4)SRF-H carbon black: ASAHI #50HG (trademark) of Asahi Carbon K. K.
*5)A paraffinic oil: PS-430 (trademark) of Idemitsu Kosan Co., Ltd.
*6)2-mercaptobenzothiazole: SANSELLER M-G (trademark) of Sanshin Chemical Industry Co., Ltd.
*7)2-(4'-morpholinodithio)benzothiazole: NOKUSELLER MDB (trademark) of Ouchi-Shinko Chemical Industry Co., Ltd.
*8)Zinc dibutyldithiocarbamate: SANSELLER BZ (trademark) of Sanshin Chemical Industry Co., Ltd.
*9)Ethylenethiourea: SANSELLER 22-C (trademark) of Sanshin Chemical Industry Co., Ltd.
*10)p,p'-oxy-bis(benzenesulfonylhydrazide): NEOSELBON N 1000 SW (trademark) of Eiwa Chemical Ind. Co., Ltd.
*11)Calcium oxide: BESTA 20 (trademark) of Inoue Sekkai Kogyo K. K.

Thus, the copolymer rubber and other components were kneaded on a Bumbury's mixer of a capacity of 2.95 liters (supplied by Kobe Steel, Ltd.) for 6 minutes. To the resulting kneaded blend, a vulcanizing agent, a vulcanization-accelerator, a foaming agent and others were addded and kneaded on a 14 inch roller (F/B=40/40° C.) for 10 minutes to prepare a rubber composition (compounded rubber) for exterusion molding sponge rubber. Then, the rubber composition was extruded by a 50 mm exteruder provided with a tubular die (inner diameter 10 mm, wall thickness 1 mm) at a die temperature of 80° C. and a cylinder temperature of 60° C. into a tubular form. This formed product was subjected to a vulcanization in a hot air vulcanization vessel of 230° C. for 6 minutes to obtain a vulcanized tubular sponge rubber. For the resulting sponge rubber and for the non-cross-linked rubber before the vulcanization, tests for the material properties as given below were carried out. The results are recited in Table 1-3.

<<Tests for Material Properties of Non-cross-linked Rubber (Assessments of Cross-linking Velocity and of Scorching Stability)>>

The tests for the material properties of non-cross-linked rubber were performed in accordance with the norm of JIS K 6300 and the cross-linking velocity was estimated using JSR CURASTOMETER type 3 (of Japan Synthetic Rubber Co., Ltd.). Thus, detecting the difference ME between the minimum value ML and the maximum value MH of torque determined on the vulcanization curve at 170° C. i.e. ME=MH−ML, and the time till arriving at 90% ME (in the following, referred to as $T_{90}$, expressed by the unit of minute) was used as a parameter for estimating the vulcanization velocity. The smaller this $T_{90}$ value, the higher the vulcanization velocity will be. On the other hand, the time till arriving at 10% ME (in the following, referred to as $T_{90}$, expressed by the unit of minute) was used as a parameter for estimating the scorching stability. The greater the $T_{10}$ value, the better will be the scorching stability.

<<Specific Gravity>>

A sample piece of a size of 20 mm×20 mm was punched out from upper portion of sponge on the vulcanized tube and stain on its surface was wiped off using alcohol. This sample piece was attached onto an automatic gravimeter (Model M-1 of Toyo Seiki Seisaku-Sho, Ltd.) under an atmosphere of 25° C. and the specifc gravity was detected from the difference between the mass weight in the air and that in pure water.

<<Material Properties of Cross-linked Product>>

The strength at break ($T_B$) and the elongation at break ($E_B$) were determined according to the norm of JIS K 6301.

<<Test for Permanent Compressive Strain>>

A vulcanized sponge rubber of a form of tube (a cross-linked article of extruded sponge rubber) was cut into a segment of a length of 30 mm, which was placed in a metal box for determining permanent compressive strain of sponge rubber and was compressed up to 50% of the height, namely, the diameter, of the sponge rubber tube, whereupon it was subjected together with the metal box to a heat treatment at 70° C. for 100 hours in a gear oven, before it was examined for the permanent compressive strain (CS) in accordance with the method for physical examination of swollen rubber (SRIS-0101).

<<Form-preservability>>

The ratio of the height versus the width of the cross section of a vulacanized tubular sponge was determined, which was assumed to be the form-preservability.

Form-preservability (%)=(L/D)×100 wherein L is the height of the sponge tube and D is the width of the spoge tube.

TABLE 1-3

|  | Example | | | Comp. Example | | |
| --- | --- | --- | --- | --- | --- | --- |
|  | 1-4 | 1-5 | 1-6 | 1-4 | 1-5 | 1-6 |
| Polymer properties | | | | | | |
| α-olefin | Propyl. | Propyl. | 1-but. | Propyl. | Propyl. | Propyl. |
| Mole ratio ethylene/α-olefin | 73/27 | 63/37 | 81/19 | 71/29 | 68/32 | 71/29 |
| Polyene | DMDT | DMDT | DMDT | ENB | ENB | EMND |
| Cont. of polyene (mole %) | 2.8 | 3.1 | 2.6 | 2.6 | 3.6 | 2.5 |
| Intrinsic visc. (dl/g) | 2.7 | 2.5 | 2.8 | 2.6 | 2.4 | 2.5 |
| g' | 0.87 | 0.85 | 0.79 | 0.99 | 0.85 | 0.86 |
| Complex viscos. coeff. ($\eta^*_A$) (× 10³ Pa · S) | 10.4 | 10.2 | 11.0 | 6.0 | 7.3 | 9.8 |
| ($\eta^*_B$)/($\eta^*_A$) | 53 | 59 | 67 | 25 | 47 | 51 |
| Properties of unvulcanized rubber (170° C.) | | | | | | |
| $T_{10}$ (min.) | 2.7 | 2.6 | 2.8 | 2.6 | 2.1 | 2.4 |
| $T_{90}$ (min.) | 5.2 | 5.0 | 5.5 | 9.3 | 7.8 | 5.6 |
| Specific weight of sponge rubber | 0.53 | 0.52 | 0.56 | 0.46 | 0.59 | 0.54 |
| Properties of sponge rubber | | | | | | |
| $T_B$ (MPa) | 2.6 | 2.4 | 2.7 | 2.0 | 2.6 | 2.7 |
| $E_B$ (%) | 270 | 250 | 270 | 290 | 230 | 270 |

TABLE 1-3-continued

|  | Example | | | Comp. Example | | |
| --- | --- | --- | --- | --- | --- | --- |
|  | 1-4 | 1-5 | 1-6 | 1-4 | 1-5 | 1-6 |
| Permanent compres. strain (%) | 23 | 19 | 21 | 35 | 27 | 22 |
| Form-preservability (%) | 87 | 84 | 89 | 65 | 80 | 84 |

Example 2-1

[Synthesis of ethylene/propylene/4,8-dimethyl-1,4,8-decatriene/5-vinyl-2-norbonene quaternary copolymer rubber]

An autoclave made of SUS having a capacity of 15 liters equipped with stirring vanes, which had been replaced sufficiently with nitrogen, was charged with 356 ml of 4,8-dimethyl-1,4-8-decatriene (DMDT) synthesized in Production Example 1, 6.4 liters of heptane and 15 ml of 5-vinyl-2-norbornene (VNB). Into this autoclave, propylene was introduced so as to reach a pressure of 0.50 MPa (5.1 kgf/cm², gauge) under ice-cooling while rotating the stirring vanes. Then, the autoclave was heated up to a temperature of 40° C. whereupon ethylene was pressed thereinto so as to reach a total pressure of 0.78 MPa (8.0 kgf/cm², gauge).

On the other hand, another reactor was charged with 15 ml of a solution (of a concentration of 0.02 mmol/ml) of triphenylcarbenium(tetrakispentafluorophenyl) borate (supplied from Asahi Glass Co., Ltd.) in toluene, 15 ml of a solution (of a concentration of 0.25 mmol/ml) of triisobutylaluminum (TIBA) (supplied from the firm Toso-Akuzo) in heptane and 15 ml of a solution (of a concentration of 0.001 mmol/ml) of {dimethyl(t-butylamido)(tetramethyl-$\eta^5$-cyclopentadienyl)silane}titanium dichloride (supplied from the firm Aldrich) in toluene, whereupon the resulting mixed solution was agitated for 15 minutes.

The above mixed solution was pressed into the autoclave by boosting with nitrogen gas, to thereby cause the polymerization to start. Then, adjustment of the temperature of the autoclave was effected for 60 minutes, so that an internal temperature of 70° C. was settled, while ethylene was supplied directly thereto so as to adjust the pressure at 0.78 MPa (8 kgf/cm², gauge). After 60 minutes had elapsed from the initiation of polymerization, 50 ml of methanol were pumped into the autoclave to cause the polymerization to terminate, whereupon the pressure of the autoclave was relieved to atmospheric pressure. Then, 20 liters of methanol were introduced into the autoclave with agitation.

To the resulting rubber ball-like mass of the copolymer having inclusion of the solvent was then admixed a stabilizer {30 mg of Irganox 1010 (trademark) of Ciba Geigy and 60 mg of Mark 329 k (trademark) of Asahi Denka Kogyo K.K., per 100 grams of the polymer} and the resulting mixture was dried at 130° C. under a pressure of 800 hPa (600 torr) for 13 hours. As a result, 160 grams of an ethylene/propylene/DMDT/VNB copolymer rubber having an ethhylene/propylene/DMDT/VNB mole ratio of 65.5/30.7/3.5/0.3, an intrinsic viscosity (η) determined in decalin at 135° C. of 2.7 dl/g and an iodine value of 22 were obtained. The reaction conditions and the results are summarized in Table 2-1.

TABLE 2-1

| | Example | | |
|---|---|---|---|
| | 2-1 | 2-2 | 2-3 |
| Catalyst (mmol/l)*1) | 0.002 | 0.002 | 0.002 |
| Boron-based catalyst promotor (mmol/l)*2) | 0.04 | 0.04 | 0.04 |
| TIBA (mmol/l)*3) | 0.5 | 0.5 | 0.5 |
| α-olefin | Propyl. | Propyl. | 1-butene |
| α-olefin feed amt.*4) | 0.50 | 0.42 | 0.37 |
| Triene*5) | DMDT | DMDT | DMDT |
| Amount of triene (ml) | 356 | 320 | 300 |
| Non-conjug. polyene*6) | VNB | NBD | VNB |
| Amount of non-conjugated polyene (ml) | 15 | 18 | 15 |
| Temperature (° C.) | 70 | 70 | 70 |
| Duration (min.) | 60 | 60 | 60 |
| Yield (g) | 160 | 213 | 175 |
| Ethylene content (mol %) | 65.5 | 68.3 | 76.3 |
| α-olefin cont. (mol %) | 30.7 | 28.2 | 20.6 |
| Triene content (mol %) | 3.5 | 3.1 | 2.8 |
| Non-conj. polyene cont. (mol %) | 0.3 | 0.4 | 0.3 |
| Intrinsic visc. (dl/g) | 2.7 | 2.8 | 2.4 |
| Complex viscos. coeff. ($\eta^*_A$) ($\times 10^3$ Pa·S) | 10.8 | 11.3 | 11.5 |
| ($\eta^*_B$)/($\eta^*_A$)/*7) | 145 | 151 | 143 |

*1)Catalyst: {dimethyl(tert-butylamido)(tetramethyl-$\eta^5$-cyclopentadienyl)silane}titanium dichloride
*2)Catalyst promotor based on boron: triphenylcarbenium (tetrakispentafluorophenyl)borate
*3)TIBA: triisobutylaluminum
*4)α-olefin feed amount: in a unit of MPa, gauge
*5)DMDT: 4,8-dimethyl-1,4,8-decatriene
*6)VNB: 5-vinyl-2-norbornene; NBD: 2,5-norbornadiene
*7)See the note in Table 1-1.

[Preparation of ethylene/propylene/DMDT/VNB copolymer rubber composition]

A compounded rubber (composition) was prepared using the ethylene/propylene/DMDT/VNB copolymer rubber obtained as above and other components each in a proportion as given in Table 2-2.

TABLE 2-2

| Components | Amount blended (part by wt.) |
|---|---|
| Components for blending on Bumbury's mixer | |
| The third ethylenic copolymer rubber | 100 |
| Zinc white*1) | 5 |
| Stearic acid | 1 |
| Carbon black*2) | 80 |
| Naphthenic process oil*3) | 50 |
| Components added on roller | |
| 2-mercaptobenzothiazole*4) | 0.5 |
| Tetramethylthiuram disulfide*5) | 1.0 |
| Sulfur | 1.5 |

*1)META Z 102 (trademark) of Inouye Sekkai Kogyo K. K.
*2)SHEAST 3 (trademark) of Tokai Carbon K. K.
*3)SANSEN 4240 (trademark) of Nippon Sun Oil K. K.
*4)SANSELLER M (trademark) of Sanshin Chemical Industry Co., Ltd.
*5)SANSELLER TT (trademark) of Sanshin Chemical Industry Co., Ltd.

Thus, 100 parts by weight of an ethylene/propylene/DMDT/VNB copolymer, 5 parts by weight of zinc white No. 1, 1 part by weight of stearic acid, 80 parts by weight of carbon black and 50 parts by weight of the naphthenic process oil were kneaded on a Bumbury's mixer of a capacity of 1.7 liters. To the resulting kneaded blend, a vulcanization-accelerator (1.0 part by weight of vulcanization-accelerator A, a commercial product of tetramethylthiuram disulfide with trade name "SANSELLER TT" of Sanshin Chemical Ind. Co., Ltd., and 0.5 part by weight of vulcanization-accelerator B, a commercial product of 2-mercaptobenzothiazole with trade name "SANSELLER M" of Sanshin Chemical Ind. Co., Ltd.) and 1.5) parts by weight of sulfur were added and kneaded on a 6 inch roller (F/B=50/50° C.) to prepare a rubber blend.

For the resulting non-cross-linked rubber blend, scorching time ($t_5$) at 125° C. and vulcanization velocity ($T_{90}$ in minutes) at 160° C. were determined. The results are recited in Table 2-3.

The non-cross-linked rubber blend was press-molded under the condition of 160° C. for a time of $T_{90}$ (min.) plus 5 minutes to obtain a cross-linked rubber. The material properties of this cross-linked rubber were detected in accordance with the norm of JIS K 6251 for 100% modulas ($M_{100}$), tensile stress at break ($T_B$), elongation at break ($E_S$) and Shore A hardness ($H_S$). The results are recited in Table 2-3.

TABLE 2-3

| | Example | | | Comp. Examp. |
|---|---|---|---|---|
| | 2-2 | 2-2 | 2-3 | 2-1 |
| Properties of unvulcanized rubber | | | | |
| Scorch. time $t_5$ (min.)*1) | 12.7 | 13.1 | 14.8 | 13.4 |
| Vulc. velocity $T_{90}$ (min.)*2) | 4.3 | 5.2 | 5.4 | 10.9 |
| Properties of vulcanized rubber | | | | |
| 100% modulas (MPa)*3) | 2.7 | 2.5 | 2.4 | 2.3 |
| Tens. stress at break (MPa)*3) | 18.1 | 18.8 | 16.7 | 19.4 |
| Elong. at break (MPa)*3) | 490 | 500 | 440 | 400 |
| Shore hardness A*3) | 67 | 67 | 66 | 66 |

*1)Scorching time $t_5$: Using Mooney's viscometer SMV-202 (of Shimadzu Corporation), variation in the Mooney viscosity at 125° C. is observed and the time for the elevation of 5 points from the minimum viscosity (Vm) thereof from the start of the observation is determined, which is defined as the scorching time $t_5$. The longer the scorching time $t_5$ is, the better is the scorching stability.
*2)Cross-linking velocity $T_{90}$: Using JSR CURASTOMETER No. 3 (of Japan Synthetic Rubber Co., Ltd.), variation in the torque at 160° C. is observed and the difference ME between the minimum torque value ML and the maximum torque value MH determined from the vulcanization curve, i.e. ME = MH − ML, is obtained and the time required for reaching at 90% of ME ($T_{90}$ in minute) is defined as the vulcanization velocity $T_{90}$. The lower the vulcanization velocity $T_{90}$ is, the higher is the vulcanization velocity.
*For the cross-linked rubber obtained by press-molding the non-cross-linked rubber blend under the condition of 160° C. for a time of the vulcanization velocity $T_{90}$ (min.) plus 5 minutes, determination is performed according to the norm of JIS K 6251.

Examples 2-2 and 2-3

By the same procedures as in Example 2-1, copolymerization was carried out, except that the conditions of the copolymerization in Example 2-1 were changed. The copolymerization conditions and the results are recited in Table 2-1.

Using the quaternary copolymer obtained in the manner as above, a non-cross-linked rubber blend and a cross-linked rubber were prepared in the same manner as in Example 2-1, for which material properties were estimated. The results are recited in Table 2-2.

Comparative Example 2-1

An ethylene/propylene/ENB copolymer rubber having an ethylene/propylene mole ratio of 70/30, an intrinsic viscosity ($\eta$) of 2.6 dl/g and the content of 5-ethylidene-2-norbornene (ENB) of 3.0 mole % was synthesized using $VO(OC_2H_5)Cl_2$ and $(C_2H_5)_{1.5}AlCl_{1.5}$ as the catalyst.

Thereafter, the procedures of Example 2-1 were pursued except that this ethylene/propylene/ENB copolymer rubber was used in the place of the ethylene/propylene/DMDT/VNB quaternary copolymer rubber in Example 2-1. The results are recited in Table 2-3.

Example 2-4

A rubber blend (composition) was prepared using the ethylene/propylene/EMN/VNB copolymer rubber obtained in Example 2-1 and other components each in a proportion as given in Table 2-4.

TABLE 2-4

The unit: part by weight

| Components | Amount blended |
|---|---|
| Components for blending on Bumbury's mixer | |
| The third ethylenic copolymer rubber | 100 |
| Activated zinc white*1) | 5 |
| Stearic acid | 2 |
| Dimethyldistearylammonium chloride*2) | 2 |
| SRF-H carbon black*3) | 100 |
| Calcium bicarbonate*4) | 40 |
| Paraffinic oil*5) | 80 |
| Components added on roller | |
| N-cyclohexyl-2-benzothiazyl sulfenamide*6) | 1.0 |
| Tetrakis(2-ethylhexyl)thiuram disulfide*7) | 1.6 |
| Zinc dibenzyldithiocarbamate*8) | 0.8 |
| Sulfur | 2.0 |
| p,p'-oxy-bis(benzenesulfonylhydrazide)*9) | 3.5 |
| A compound based on urea*10) | 0.5 |
| Calcium oxide*11) | 4.0 |

*1)META Z 102 (trademark) of Inouye Sekkai Kogyo K. K.
*2)ARKARD 2HT-F (trademark) of Lion-Akuzo K. K.
*3)ASAHI #50HG (trademark) of Asahi Carbon K. K.
*4)WHITEN SB (trademark) of Shiroishi Calcium K. K.
*5)PS-430 (trademark) of Idemitsu Kosan Co., Ltd.
*6)SANSELLER CM (trademark) of Sanshin Chemical Industry Co., Ltd.
*7)NOKUSELLER TOT (trademark) of Ouchi-Shinko Chemical Industry Co., Ltd.
*8)SANSELLER ZTC (trademark) of Sanshin Chemical Industry Co., Ltd.
*9)NEOSELBON N 1000 SW (trademark) of Eiwa Chemical Industry Co., Ltd.
*10)SELLPASTE A (trademark) of Eiwa Chemical Industry Co., Ltd.
*11)BESTA 20 (trademark) of Inoue Sekkai Kogyo K. K.

Thus, 100 parts by weight of an ethylene/propylene/EMN/VNB copolymer rubber obtained in Example 2-1, 5 parts by weight of activated zinc white, 2 part by weight of stearic acid, 100 parts by weight of carbon black, 80 parts by weight of a paraffinic oil, 2 parts by weight of dimethyldistearyl ammonium chloride and 40 parts by weight of calcium bicarbonate were kneaded on a Bumbury's mixer of a capacity of 1.7 liters.

To the resulting kneaded blend, 2.0 parts by weight of a vulcanizing agent (sulfur) and other components as given in Table 2-4 {namely, the remaining components, i.e. 4 parts by weight of calcium oxide, 1.0 part by weight of N-cyclohexyl-2-mercaptobenzothiazyl sulfenamide, 1.6 parts by weight of tetrakis(2-ethylhexyl)thiuram disulfide, 0.8 part by weight of zinc dibenzyl dithiocarbamate, 3.5 parts by weight of p,p'-oxybis(benzenesulfonylhydrazide) and 0.5 part by weight of a compound based on urea} were added and kneaded on a 14 inch roller (F/B =50/50° C.) to prepare a rubber blend.

This non-cross-linked rubber blend was extruded by using a 60 mm extruding machine provided with a die of a tubular form (inner diameter 10 mm, wall thickness 1 mm) at a die temperature of 80° C. and a cylinder temperature of 60° C. into a tube. The so-obtained molded article was subjected to vulcanization in a hot air vulcanization vessel at 220° C. for four minutes to obtain a sponge rubber.

The resulting sponge rubber was examined for its tensile stress at break ($T_B$), elongation at break ($E_B$), specific gravity, permanent compressive strain, form-preservability and surface roughness. The results are recited in Table 2-5.

TABLE 2-5

| Properties of sponge rubber | Example 2-4 | Example 2-2 |
|---|---|---|
| Tensile stress at break (MPa)*1) | 3.3 | 2.5 |
| Elongation at break (MPa)*1) | 260 | 250 |
| Specific gravity (g/cm³)*2) | 0.53 | 0.46 |
| Perma. compres. strain (%)*3) | 18 | 24 |
| Form-preservability (%)*4) | 78 | 65 |
| Surface roughness*5) | 7 | 12 |

*1)A test piece was prepared by punching out the vulcanized tubular sponge rubber at its upper portion in the longitudinal direction using No. 3 dumbbell given in JIS K 6251 (1993). Using this test piece, a tensile test was carried out in accordance with the prescription given in JIS K 6251, Item 3, under a condition of a test temperature of 25° C. and a drawing speed of 500 mm/min. to determine tensile stress at break $T_B$ and elongation at break $E_B$.
*2)A test piece of a size of 20 mm × 20 mm was punched out from upper portion of vulcanized tubular sponge rubber and stain on its surface was wiped off using alcohol. This test piece was attached onto an automatic gravimeter (Model M-1 of Toyo Seiki Seisaku-Sho, Ltd.) under an atmosphere of 25° C. and the specific gravity was detected from the difference between the mass weight in the air and that in pure water.
*3)The vulcanized tubular sponge rubber was cut into a piece of 30 mm, which was attached to a metal box for determining permanent compressive strain. This piece was compressed so that the height of the test piece decreased to ½of the original height before being pressed, whereupon it was placed in a gear oven of 70° C. together with the metal box to subject to a heat treatment for 22 hours. Then, it was cooled by standing for 30 minutes, whereupon the height of the test piece was determined, from which permanent compressive strain was calculated by the calculation equation given below.
Permanent compressive strain (%) = $\{(t_0 - t_1)/(t_0 - t_2)\} \times 100$
Here,
$t_0$ = height of the test piece before the test
$t_1$ = height of the test piece after having been heat treated and then cooled for 30 minutes by standing
$t_2$ = height of the test piece in the state attached onto the testing metal box
*4)The form-preservability was calculated from the ratio of the height vs. the width of the section of the vulcanized tubular sponge rubber defined by the following calculation equation.
Form-preservability (%) = (L/D) × 100
L = height of the tubular sponge rubber
D = width of the tubular sponge rubber
*5)The irregularity of the upper face of the sponge rubber was given under digitization using a contacting probe surface roughness detector. In the practice, the tubular sponge rubber was cut into a segment of a length of 50 mm. The surface roughness of the sponge rubber is defined by the value obtained by dividing the value ($h_1 - h_2$) which is a subtraction of the "total sum ($h_1$) of each height of the 1st to the 10th protrusions" minus the "total sum ($h_2$) of each depth of the 1st to the 10th depressions" by 10.

Comparative Example 2-2

The same procedures as in Example 2-4 were pursued, except that the terpolymer rubber obtained in Comparative Example 2-1 was used in the place of the ethylene/propylene/EMN/NBD copolymer rubber in Example 2-4. The results are recited in Table 2-5.

The ethylene/α-olefin/triene copolymer rubbers used in the following Examples are given in Table 3-1.

TABLE 3-1

|  | Copolymer rubber | |
| --- | --- | --- |
|  | F-1 | F-2 |
| α-olefin | propylene | 1-octene |
| ethylene/α-olefin mole ratio | 70/30 | 90/10 |
| Intrins. viscosity (η) (dl/g) | 1.0 | 1.5 |
| Triene | DMDT | DMDT |
| Content of triene (mole %) | 1.3 | 0.7 |

Example 3-1
[Preparation of Cross-linked Rubber Latex Composition]

100 grams of the ethylene/propylene/4,8-dimethyl-1,4,8-decatriene (DMDT) copolymer rubber (F-1) as given in Table 3-1 and 10 grams of a modified polyethylene wax as the low molecular weight (co)polymer (G) {having a maleic anhydride content of 3% by weight and an intrinsic viscosity (η) determine in decalin at 135° C. of 0.05 dl/g} were dissolved in 900 grams of n-hexane and agitation was effected until a homogeneous solution was obtained.

Then, a dispersion prepared by dispersing 5 grams of potassium oleate as surfactant in 900 grams of water was added to the above homogeneous solution with mixing for 30 minutes using a homomixer (with a revolution rate of the stirring blades of 1,200 rpm).

Thereafter, the emulsion obtained by the mixing mentioned above was agitated slowly at a temperature of 60–80° C. for evaporating off n-hexane to obtain a latex composition.

Then, this latex composition was transferred to a vessel for exposing to irradiation of electron beam so as to accumulate as a layer of a thickness of 1.5 mm. The upper part of the vessel was closed tightly with a polyethylene film of a thickness of 30 μm, whereupon the content was exposed to irradiation by an electron beam of 10 Mrad with an acceleration voltage of 750 kV to prepare a cross-linked rubber latex composition.

For the cross-linked rubber latex composition prepared as above, amount of deposition of coagulated rubber, average particle size and hot toluene-insoluble ingredient (gel fraction) were determined in accordance with the procedures given below. The results are recited in Table 3-2.

(1) Deposited Amount of Coagulated Rubber

This is expressed by the proportion, in % by weight, of the deposited amount of coagulated rubber, which is left on a 100 mesh stainless steel screen after a sample of the cross-linked rubber latex is poured onto the screen, relative to the total solids in the cross-linked rubber latex composition.

(2) Average Particle Diameter

Using Coal Tar Counter supplied by the firm Coal Tar Elactoronics, total number of particles in the sample of the cross-linked rubber latex composition are counted, whereupon a histogram for particle diameter and a histogram for cumulative amount are prepared. The average particle size is defined by the point on the cumulative amount histogram at which the cumulative histogram reaches 50%.

(3) Content of Hot Toluene-insoluble Ingredient (Gel Fraction)

The entire solid matter in a sample of the cross-linked rubber latex composition is caused to deposit by coagulation, followed by drying. 1.5 grams are taken in a bag made of a stainless steel net of 100 mesh and are soaked in 100 ml of toluene at 120° C. for 6 hours. Then, the bag is taken out and dried, whereupon the solid matter left in the bag is weighed, from which the content of hot toluene-insoluble ingredient (gel fraction) is calculated and is served for a parameter of the degree of cross linking.

The procedures of the above (1) to (4) were carried out within 48 hours after the cross-linking treatment.

(4) Storage Stability

A sample of the cross-linked rubber latex composition is placed in a tightly sealed vessel and was stood still at room temperature for two months. Then, the deposited amount of coagulated rubber is determined by the same procedures as in the above (1), which is served as a parameter for estimating the storage stability of the cross-linked rubber latex composition.

[Production of AES Resin]

Using the cross-linked rubber latex composition obtained as above, an AES resin was produced by a known practice.

Thus, 100 grams of the above cross-linked rubber latex composition were charged in a glass autoclave of a capacity of 2 liters, whereto 2 grams of potassium oleate were added. After keeping the temperature at 60° C., thereto were added 0.01 g/min. of potassium persulfate, 0.25 g/min. of styrene and 0.25 g/min. of acrylonitrile for a period of time of one hour while agitating at 10 r.p.m. After cessation of addition of them, the autoclave was stood still for further 30 minutes to terminate the reaction.

Then, a small amount of diluted hydrochloric acid was dropped into the so-obtained product under agitation to cause the product to coagulate, followed by washing, dewatering and drying. The yield of the resulting product was 125 grams. Subsequently, 125 grams of this dry product and 375 grams of a commercial AS resin (of Denki Kagaku Kogyo K.K. with a tradename of AS-S) were blended on an extruding machine at 200° C. whereupon a rectangular plate of 100 mm×70 mm×2 mm thickness was produced by an injection molding machine (of Toshiba Machine Co., Ltd. with article number 1S22P) at an injection temperature of 200° C.

On this rectangular plate, Izod impact strength and surface gloss were observed in accordance with the procedures given below. The results are recited in Table 3-2.

(1) Izod Impact Strength (IZ)

Izod impact strength (IZ) was determined using an Izod impact testing machine (made by Toyo Seiki K.K.) in accordance with the norm of JIS K 7110.

Temperature: 25° C. or minus 10° C.

Test piece : No. 1 A (2) Observation of Surface Gloss

60° mirror surface gloss was determined using Glossmeter (of Nippon Denshoku K.K.) in accordance with the norm of JIS K 7105

Comparative Example 3-1

The procedures were performed in the same manner as in Example 3-1, except that ethylene/propylene copolymer rubber {with an ethylene/propylene mole ratio of 70/30 and an intrinsic viscosity (η) determined in decalin at 135° C. of 1.0 dl/g} was used in the place of ethylene/propylene/4,8-dimethyl-1,4,8-decatriene co-polymer rubber (F-1) in Example 3-1. The results are recited in Table 3-2.

Comparative Example 3-2

The procedures were performed in the same manner as in Example 3-1, except that ethylene/propylene/5-ethylidene-2-norbornene copolymer rubber {with an ethylene/propylene mole ratio of 70/30, an ENB content of 2.7 mole % and an intrinsic viscosity (η) determined in decalin at 135° C. of 1.0 dl/g} was used in the place of ethylene/ propylene/4,8-dimethyl-1,4,8-decatriene copolymer rubber (F-1) in Example 3-1. The results are recited in Table 3-2.

Example 3-2

The procedures were performed in the same manner as in Example 3-1, except that ethylene/1-octene/4,8-dimethyl-1,4,8-decatriene copolymer rubber (F-2) was used in the place of ethylene/propylene/4,8-dimethyl-1,4,8-decatriene copolymer rubber (F-1) in Example 3-1.

Example 3-3

A cross-linked rubber latex composition was prepared in the same manner as in Example 3-1, except that an organic peroxide was used for the cross-linking treatment instead of using electron beam irradiation as in Example 3-1.

The cross-linking by the organic peroxide was effected in the manner as follows. Two parts by weight of p-divinylbenzene were added with respect to 100 parts by weight of the solid matter of the original latex composition before the cross-linking treatment so as to disperse it sufficiently. Then, the resulting latex composition was transferred to an autoclave of a capacity of two liters and thereto were added 3.0 parts by weight of 1,1-di-tert-butylperoxy-3,3,5-trimethyl-cyclohexane (a product of Nippon Oil & Fatsco, Ltd. with trade name of PERHEXA 3M) as the organic peroxide, whereupon the cross-linking reaction was effected with agitation at 120° C. for 2 hours to produce a cross-linked rubber latex composition.

Subsequently, the deposited amount of coagulated rubber, average particle size and hot toluene-insoluble ingredient (gel fraction) were determined for this cross-linked rubber latex composition by the same procedures as in Example 3-1. The results are recited in Table 3-2.

The procedures were performed in the same manner as in Example 3-1, except that the above cross-linked rubber latex composition was used in the place of the cross-linked rubber latex composition obtained in Example 3-1. The results are recited in Table 3-2.

Example 3-4

The procedures were performed in the same manner as in Example 3-1, except that the irradiation dose of electron beam on the cross-linking treatment of Example 3-1 was settled at 30 Mrad. The results are recited in Table 3-2.

TABLE 3-2

| | Example | | | | Compar. Example | |
|---|---|---|---|---|---|---|
| | 3-1 | 3-2 | 3-3 | 3-4 | 3-1 | 3-2 |
| Features of cross-link. rubber latex composition | | | | | | |
| Deposited amt. of coagulated rubber (wt. %) | 0 | 0 | 0 | 0 | 0 | 0 |
| Average particle diameter ($\mu$m) | 0.3 | 0.4 | 0.5 | 0.5 | 0.4 | 0.5 |
| Gel fraction (wt. %) | 80 | 79 | 81 | 72 | 55 | 65 |
| Storage stability | | | | | | |
| Deposited amt. of coagulated rubber (wt. %) | 0 | 0 | 0 | 0 | 0 | 0 |

TABLE 3-2-continued

| | Example | | | | Compar. Example | |
|---|---|---|---|---|---|---|
| | 3-1 | 3-2 | 3-3 | 3-4 | 3-1 | 3-2 |
| Assessment of storage stability | good | good | good | good | good | good |
| Performance of AES resin molded article | | | | | | |
| Surface gloss (%) | 90 | 92 | 94 | 81 | 43 | 75 |
| Iz (at 25° C.) (J/m) | 380 | 390 | 410 | 200 | 160 | 210 |
| Iz (at −10° C.) (J/m) | 51 | 98 | 41 | 24 | 21 | 24 |

Example 3-5

The modification effect of a polyvinyl chloride by the dry AES product produced in Example 3-1 was examined by the procedures given below.

Thus, 10 parts by weight of the dry AES product of Example 3-1 (original product before the AS resin was admixed), 100 parts by weight of a powdery polyvinyl chloride (a product of Nippon Zeon Co., Ltd. with trade name of ZEON 103 EP), 1.5 parts by weight of a stabilizer for polyvinyl chloride based on organo-Cd-Ba-Zn (a product of Sakai Chemical Ind. Co., Ltd. with trade name of LKBZ-80) and 1.0 part by weight of calcium stearate (a product of Wako Pure Chemical Ind., Ltd.) were blended on a Henschel mixer at 50° C. Then, this mixture was kneaded on an 8-inch roller of a surface temperature of 130–140° C. for 5 minutes.

The polyvinyl chloride blend prepared as above was subjected to a preliminary heating at 170° C. for 30 minutes, whereupon it was processed by hot press at 170° C. for 2 minutes under a pressure of 10 MPa. Thereafter, a cold press was effected under a pressure of 10 MPa at 20° C. for 5 minutes to obtain a pressed sheet of 150 mm×120 mm×2 mm thickness.

For the so-obtained pressed sheet, an Izod impact test (JIS K 7110) was carried out under an atmosphere of 25° C. or of 0° C. to determine Izod impact strength (IZ). The results are recited in Table 3-3.

Comparative Example 3-3

The procedures of Example 3-5 were pursued in the same manner as in Example 3-5, except that no dry AES product was incorporated. The results are recited in Table 3-3.

Comparative Example 3-4

The procedures were pursued in the same manner as in Example 3-5, except that 10 parts by weight of a commercial chlorinated polyethylene (a product of Showa Denko K.K. with trade name of ELASREN 301 A) was incorporated in the place of the dry AES product of Example 3-5. The results are recited in Table 3-3.

TABLE 3-3

|  | Example | Compar. Example | |
| --- | --- | --- | --- |
|  | 3-5 | 3-3 | 3-4 |
| IZ (at 25° C.) (J/m) | 1,200 | 80 | 410 |
| IZ (at 0° C.) (J/m) | 350 | 70 | 90 |

INDUSTRIAL APPLICABILITY

The novel and useful ethylenic copolymer rubber according to the present invention exhibits a high cross-linking velocity and is superior in the scorching stability, workability and moldabilty, with superior mechanical properties, after the cross linking, such as cross-linked rubber strength and so on, as well as superior form-preservability, so that it can favorably be used in a form of non-foamed or foamed cross-linked rubber for applications, for example, parts for automobile industry, such as sealant, automobile weather strips, door glass run channel, window frame, radiator hose, parts for brake and wiper blade; industrial rubber products, such as rubber roller, belt, gasket and hose; electric insulators, such as anode cap and grommet; architectural and constructional products, such as gasket for architectural use and sheet for constructional use; rubber-coated cloth; heat insulator; and cushioning material. The cross-linked rubber latex composition containing the ethylenic copolymer rubber and the low molecular weight (co)polymer can be used as a modifier for improving the shock resistance and the surface gloss of various resins.

What is claimed is:

1. An ethylenic copolymer rubber comprising a random copolymer comprising structural units derived from comonomers, respectively, of (a) ethylene, (b) one or more α-olefins having 3–20 carbon atoms, (c) one or more trienes represented by the formula (1),

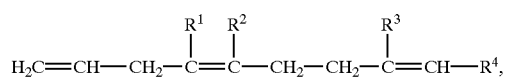

(1)

in which $R^1$ and $R^2$ denote each, independently of each other, hydrogen atom, methyl or ethyl and $R^3$ and $R^4$ denote each, independently of each other, methyl or ethyl, and (d) one or more non-conjugated polyenes having in the molecule at least two polymerizable double bonds, wherein the copolymer rubber has characteristic features that the mole ratio of the structural unit derived from ethylene (a) versus the structural unit derived from the α-olefin(s) having 3–20 carbon atoms (b), i.e. ethylene/α-olefin(s), is in the range from 95/5 to 40/60, that the content of the structural unit derived from the triene(s) (c) is in the range from 0.1 to 10 mole %, that the content of the structural unit derived from the non-conjugated polyene(s) (d) is in the range from 0.02 to 3 mole % and that the intrinsic viscosity (η) determined in decalin at 135° C. is in the range from 0.1 to 10 dl/g.

2. A latex composition of cross-linked rubber, comprising 2–30 parts by weight of at least one lower molecular weight (co)polymer (G), selected from the group consisting of a lower molecular weight polyethylene, a lower molecular weight ethylene/α-olefin copolymer, a lower molecular weight polyethylene modified by a compound based on unsaturated carboxylic acid and a lower molecular weight ethylene/α-olefin copolymer modified by a compound based on unsaturated carboxylic acid, each of the above lower molecular weight polymers having an intrinsic viscosity (η) of 0.01–0.3 dl/g determined in decalin at 135° C., per 100 parts by weight of an ethylenic copolymer rubber (F) comprising a structural unit derived from ethylene (a), a structural unit derived from one or more α-olefins having 3–20 carbon atoms (b) and a structural unit derived from one or more trienes (c) represented by the formula (1):

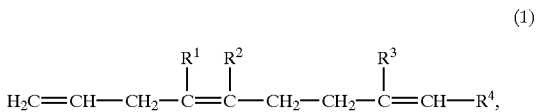

(1)

in which $R^1$ and $R^2$ denote each, independently of each other, hydrogen atom, methyl or ethyl and $R^3$ and $R^4$ denote each, independently of each other, methyl or ethyl, wherein the ethylenic copolymer rubber (f) has cross-linkings.

3. The latex composition of cross-linked rubber as claimed in claim 2, wherein the ethylenic copolymer rubber (F) has a content of an ingredient insoluble in hot toluene of at least 30% by weight.

4. The latex composition of cross-linked rubber as claimed in claim 2, wherein the average particle diameter of the solid matter thereof is in the range of from 0.2 to 3.0 μm.

5. The latex composition of cross-linked rubber as claimed in claim 2, wherein the ethylenic copolymer rubber (F) has a mole ratio of ethylene (a) versus the α-olefin (b) having 3–20 carbon atoms, i.e., ethylene/α-olefin(s), in the range of from 95/5 to 40/60, the content of the structural unit derived from the triene(s) is in the range of from 0.1 to 30 mole % and the intrinsic viscosity (η) determined in decalin at 135° C. is in the range of from 0.1 to 10 dl/g.

6. The latex composition of cross-linked rubber as claimed in claim 2, wherein the lower molecular weight (co)polymer (G) is a lower molecular weight polyethylene modified by a compound based on unsaturated carboxylic acid or a lower molecular weight ethylene/α-olefin copolymer modified by a compound based on unsaturated carboxylic acid.

7. An AES resin comprising a copolymer made of acrylonitrile, of the ethylenic copolymer rubber (F) and of styrene, which is obtained by grafting acrylonitrile and styrene onto the latex composition of cross-linked rubber as claimed in claim 2 by an emulsion graft-polymerization.

8. An AES resin comprising a copolymer made of acrylonitrile, of the ethylenic copolymer rubber (F) and of styrene, which is obtained by blending an acrylonitrile/styrene resin (AS resin) with a dried product obtained by grafting acrylonitrile and styrene onto the latex composition of cross-linked rubber as claimed in claim 2 by an emulsion graft-polymerization.

9. An ethylenic copolymer rubber comprising structural units derived from comonomers, respectively, of (a) ethylene,
(b) one or more α-olefins having 3–20 carbon atoms,
(c) one or more trienes represented by the formula (1)

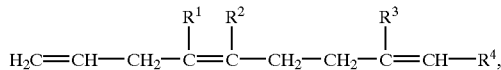

(1)

in which $R^1$ and $R^2$ denote each, independently of each other, hydrogen atom, methyl or ethyl and $R^3$ and $R^4$ denote each, independently of each other, methyl or ethyl and (d) one or more non-conjugated polyenes having at least two polymerizable double bonds in the molecule, wherein the copolymer rubber has characteristic features that the mole ratio of the structural unit derived from ethylene (a) versus the structural unit derived from the α-olefin(s) having 3–20 carbon atoms(b), i.e. ethylene/α-olefin(s), is in the range from 95/5 to 40/60, that the content of the structural unit derived from the triene(s) (c) is in the range from 0.1 to 10 mole %, that the content of the structural unit derived from the non-conjugated polyene(s) (d) is in the range of from 0.2 to 3 mole %, that the intrinsic viscosity (η) determined in decalin at 135° C. is in the range from 0.1 to 10 dl/g and that the ratio of the above intrinsic viscosity (η) versus the converted intrinsic viscosity $(\eta)_{blank}$ converted to a linear ethylene/propylene copolymer having 70 mole % of ethylene determined by gel permeation chromatography (GPC: determined at 140° C., in a solvent of o-dichlorobenzene) of the ethylenic copolymer rubber, i.e. $(\eta)/(\eta)_{blank}$=g', is 0.5–0.95.

10. The ethylenic copolymer rubber as claimed in claim 9, wherein the structural unit derived from the α-olefin(s) (b) is that derived from one or more α-olefins selected from the group consisting of propylene, 1-butene, 1-hexene and 1-octene.

11. The ethylenic copolymer rubber as claimed in claim 10 wherein both the radicals $R^3$ and $R^4$ stand for methyl.

12. The ethylenic copolymer rubber as claimed in claim 9, wherein the structural unit derived from the triene(s) (c) is represented by the formula (1')

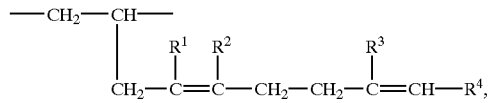

(1')

in which $R^1$ and $R^2$ denote each, independently of each other, hydrogen atom, methyl or ethyl and $R^3$ and $R^4$ denote each, independently or each other, methyl or ethyl.

13. The ethylenic copolymer rubber as claimed in claim 9, obtained by subjecting ethylene (a), the α-olefin(s) having 3–20 carbon atoms (b), the triene(s) (c) and, the non-conjugated polyene(s) (d) to a random copolymerization in the presence of a metallocene catalyst.

14. A cross-linkable rubber composition comprising the ethylenic copolymer rubber of claim 9.

15. A cross-linked rubber obtained by subjecting the cross-linkable rubber composition as claimed in claim 14 to cross-linking.

16. An ethylenic copolymer rubber comprising structural units derived from comonomers, respectively, of
(a) ethylene,
(b) one or more α-olefins having 3–20 carbon atoms,
(c) one or more trienes represented by the formula (1)

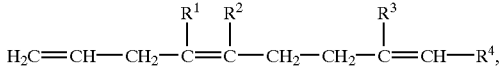

(1)

in which $R^1$ and $R^2$ denote each, independently of each other, hydrogen atom, methyl or ethyl and $R^3$ and $R^4$ denote each, independently of each other, methyl or ethyl, and (d) one or more non-conjugated polyenes having at least two polymerizable double bonds in the molecule, wherein the copolymer rubber has characteristic features that the mole ratio of the structural unit derived from ethylene (a) versus the structural unit derived from the α-olefin(s) having 3–20 carbon atoms (b), i.e. ethylene/α-olefin(s), is in the range from 95/5 to 40/60, that the content of the structural unit derived from the triene(s) (c) is in the range from 0.1 to 10 mole %, that the content of the structural unit derived from the non-conjugated polyene(s) (d) is in the range from 0.2 to 3 mole %, that the intrinsic viscosity (η) determined in decalin at 135° C. is in the range from 0.1 to 10 dl/g and that the complex viscosity coefficient $(\eta^*_A)$ at 8 rad/sec in the assessment of dependence of the complex viscosity coefficient $(\eta^*)$ on the frequency estimated from the kinematic viscoelasticity at 190° C. is at least $2 \times 10^3$ Pa.S and the ratio of the complex viscosity coefficient $(\eta^*_B)$ at 0.01 rad/sec versus the complex viscosity coefficient $(\eta^*_A)$ namely, $(\eta^*_B)/(\eta^*_A)$ is at least 35.

17. The ethylenic copolymer rubber as claimed in claim 16, wherein the structural unit derived from the α-olefin(s) (b) is that derived from one or more α-olefins selected from the group consisting of propylene, 1-butene, 1-hexene and 1-octene.

18. The ethylenic copolymer rubber as claimed in claim 16, wherein the radicals $R^3$ and $R^4$ stand for methyl.

19. The ethylenic copolymer rubber as claimed in claim 16, wherein the structural unit derived from the triene(s) (c) is represented by the formula (1')

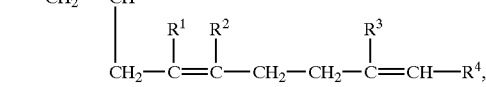

(1')

in which $R^1$ and $R^2$ denote each, independently of each other, hydrogen atom, methyl or ethyl and $R^3$ and $R^4$ denote each, independently of each other, methyl or ethyl.

20. The ethylenic copolymer rubber as claimed in claim 16, obtained by subjecting ethylene (a), the α-olefin(s) having 3–20 carbon atoms (b), the triene(s) (c) and, the non-conjugated polyene(s) (d) to a random copolymerization in the presence of a metallocene catalyst.

21. A cross-linkable rubber composition comprising the ethylenic copolymer rubber of claim 16.

22. A cross-linkable rubber composition comprising
(A) an ethylenic copolymer rubber comprising structural units derived from comonomers, respectively, of
(a) ethylene,
(b) one or more α-olefins having 3–20 carbon atoms, and
(c) one or more trienes represented by the formula (1)

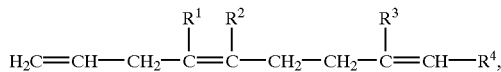

in which $R^1$ and $R^2$ denote each, independently of each other, hydrogen atom, methyl or ethyl and $R^3$ and $R^4$ denote each, independently of each other, methyl or ethyl, wherein the copolymer rubber has characteristic features that the mole ratio of the structural unit derived from ethylene (a) versus the structural unit derived from the α-olefin(s) having 3–20 carbon atoms (b), i.e. ethylene/α-olefin(s), is in the range from 95/5 to 40/60, that the content of the structural unit derived from the triene(s) (c) is in the range from 0.1 to 10 mole %, that the intrinsic viscosity (η) determined in decalin at 135° C. is in the range from 0.1 to 10 dl/g and that the complex viscosity coefficient ($\eta^*_A$) at 8 rad/sec in the assessment of dependence of the complex viscosity coefficient ($\eta^*$) on the frequency estimated from the kinematic viscoelasticity at 190° C. is at least $2\times10^3$ Pa.S and the ratio of the complex viscosity coefficient ($\eta^*_B$) at 0.01 rad/sec versus the complex viscosity coefficient ($\eta^*_A$) namely, ($\eta^*_B$)/($\eta^*_A$) is at least 35, and one or more additives selected from the group consisting of (B) a reinforcing agent,
(C) a softener,
(D) a vulcanizing agent and
(E) a foaming agent.

23. The cross-linkable rubber composition of claim 9, wherein the content of the reinforcing agent (B) is 300 parts by weight or less per 100 parts by weight of the ethylenic copolymer rubber (A), the content of the softener (C) is 200 parts by weight or less per 100 parts by weight of the ethylenic copolymer rubber (A) and the content of the foaming agent (E) is in the range from 0.5 to 30 parts by weight per 100 parts by weight of the ethylenic copolymer rubber (A).

24. A cross-linked rubber obtained by subjecting the cross-linkable rubber composition as claimed in claim 21 to cross-linking.

25. The ethylenic copolymer rubber as claimed in claim 1, wherein the structural unit derived from the α-olefin(s) (b) is that derived from one or more α-olefins selected from the group consisting of propylene, 1-butene, 1-hexene and 1-octene.

26. The ethylenic copolymer rubber as claimed in claim 1 wherein both the radicals $R^3$ and $R^4$ stand for methyl.

27. The ethylenic copolymer rubber as claimed in claim 1, wherein the structural unit derived from the triene(s) (c) is represented by the formula (1')

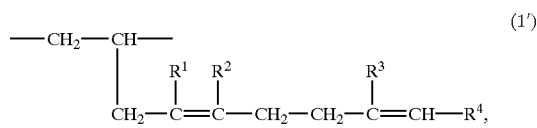

in which $R^1$ and $R^2$ denote each, independently of each other, hydrogen atom, methyl or ethyl and $R^3$ and $R^4$ denote each, independently of each other, methyl or ethyl.

28. The ethylenic copolymer rubber as claimed in claim 1, obtained by subjecting ethylene (a), the α-olefin(s) having 3–20 carbon atoms (b), the triene(s) (c) and the non-conjugated polyene(s) (d) to a random copolymerization in the presence of a metallocene catalyst.

29. A process for producing the ethylenic copolymer rubber as claimed in claim 1 comprising copolymerizing the comonomers comprising
(a) ethylene,
(b) one or more α-olefins having 3–20 carbon atoms,
(c) one or more trienes represented by the formula (1) given below and
(d) one or more non-conjugated polyenes having in the molecule at least two polymerizable double bonds, in the presence of a catalyst comprising
(e) a transition metal compound,
(f) an organoaluminum compound and/or
(g) an ionizing ionic compound:

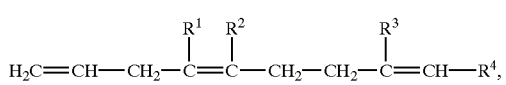

in which $R^1$ and $R^2$ denote each, independently of each other, hydrogen atom, methyl or ethyl and $R^3$ and $R^4$ denote each, independently of each other, methyl or ethyl.

30. The process of claim 29 wherein the transition metal compound is a metallocene.

31. A process for producing the ethylenic copolymer rubber as claimed in claim 27 comprising copolymerizing the comonomers comprising
(a) ethylene,
(b) one or more α-olefins having 3–20 carbon atoms,
(c) one or more trienes represented by the formula (1) given below and
(d) one or more non-conjugated polyenes having in the molecule at least two polymerizable double bonds, in the presence of a catalyst comprising
(e) a transition metal compound,
(f) an organoaluminum compound and/or
(g) an ionizing ionic compound:

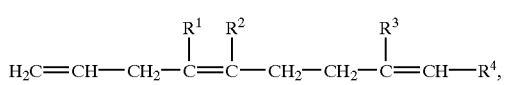

in which $R^1$ and $R^2$ denote each, independently of each other, hydrogen atom, methyl or ethyl and $R^3$ and $R^4$ denote each, independently of each other, methyl or ethyl.

32. The process of claim 31 wherein the transition metal compound is a metallocene.

33. A cross-linkable rubber composition comprising the ethylenic copolymer rubber of claim 1.

34. A cross-linkable rubber composition comprising
   (A) the ethylenic copolymer rubber as claimed in claim 1 and one or more additives selected from the group consisting of
   (B) a reinforcing agent,
   (C) a softener,
   (D) a vulcanizing agent and
   (E) a foaming agent.

35. The cross-linkable rubber composition of claim 34 wherein the content of the reinforcing agent (B) is 300 parts by weight or less per 100 parts by weight of the ethylenic copolymer rubber (A), the content of the softener(C) is 200 parts by weight or less per 100 parts by weight of the ethylenic copolymer rubber (A) and the content of the foaming agent (E) is in the range from 0.5 to 30 parts by weight per 100 parts by weight of the ethylenic copolymer rubber (A).

36. A cross-linked rubber obtained by subjecting the cross-linkable rubber composition as claimed in claim 33 to cross-linking.

37. A molded cross-linked rubber article for sealing obtained from the cross-linkable rubber composition as claimed in claim 33 under cross-linking.

38. A sponge weather strip for automobiles obtained from a cross-linkable rubber composition comprising the ethylenic copolymer rubber as claimed in claim 1 and a foaming agent under cross-linking.

39. A process for preparing the molded article of claim 37 comprising cross-linking the cross-linkable rubber composition by heating or by electron beam irradiation.

40. A cross-linkable rubber composition comprising
   (A) an ethylenic copolymer rubber comprising structural units derived from comonomers, respectively, of
      (a) ethylene,
      (b) one or more α-olefins having 3–20 carbon atoms, and
      (c) one or more trienes represented by the formula (1)

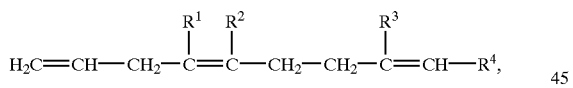

(1)

in which $R^1$ and $R^2$ denote each, independently of each other, hydrogen atom, methyl or ethyl and $R^3$ and $R^4$ denote each, independently of each other, methyl or ethyl, wherein the copolymer rubber has characteristic features
   that the mole ratio of the structural unit derived from ethylene (a) versus the structural unit derived from the α-olefin(s) having 3–20 carbon atoms (b), i.e. ethylene/α-olefin(s), is in the range from 95/5 to 40/60,
   that the content of the structural unit derived from the triene(s) (c) is in the range from 0.1 to 10 mole %,
   that the intrinsic viscosity (η) determined in decalin at 135° C. is in the range from 0.1 to 10 dl/g and
   that the ratio of the above intrinsic viscosity (η) versus the converted intrinsic viscosity $(\eta)_{blank}$ converted to a linear ethylene/propylene copolymer having 70 mole % of ethylene determined by gel permeation chromatography (GPC: determined at 140° C., in a solvent of o-dichlorobenzene) of the ethylenic copolymer rubber, i.e. $(\eta)/(\eta)_{blank}=g'$, is 0.5–0.95, and one or more additives selected from the group consisting of
   (B) a reinforcing agent,
   (C) a softener,
   (D) a vulcanizing agent and
   (E) a foaming agent,
   wherein the content of the reinforcing agent (B) is 300 parts by weight or less per 100 parts by weight of the ethylenic copolymer rubber (A), the content of the softener (C) is 200 parts by weight or less per 100 parts by weight of the ethylenic copolymer rubber (A) and the content of the foaming agent (E) is in the range from 0.5 to 30 parts by weight per 100 parts by weight of the ethylenic copolymer rubber (A).

41. A sponge weather strip for automobiles obtained from a cross-linkable rubber composition comprising an ethylenic copolymer rubber comprising structural units derived from comonomers, respectively, of
   (a) ethylene,
   (b) one or more α-olefins having 3–20 carbon atoms,
   (c) one or more trienes represented by the formula (1)

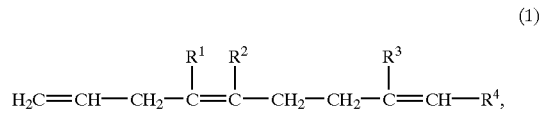

(1)

in which $R^1$ and $R^2$ denote each, independently of each other, hydrogen atom, methyl or ethyl and $R^3$ and $R^4$ denote each, independently of each other, methyl or ethyl, and a foaming agent under cross-linking, wherein the copolymer rubber has characteristic features
   that the mole ratio of the structural unit derived from ethylene (a) versus the structural unit derived from the α-olefin(s) having 3–20 carbon atoms (b), i.e. ethylene/α-olefin(s), is in the range from 95/5 to 40/60,
   that the content of the structural unit derived from the triene(s) (c) is in the range from 0.1 to 10 mole %,
   that the intrinsic viscosity (η) determined in decalin at 135° C. is in the range from 0.1 to 10 dl/g and
   that the ratio of the above intrinsic viscosity (η) versus the converted intrinsic viscosity $(\eta)_{blank}$ converted to a linear ethylene/propylene copolymer having 70 mole % of ethylene determined by gel permeation chromatography (GPC: determined at 140° C., in a solvent of o-dichlorobenzene) of the ethylenic copolymer rubber, i.e. $(\eta)/(\eta)_{blank}=g'$, is 0.5–0.95.

42. A sponge weather strip for automobiles obtained from a cross-linkable rubber composition comprising an ethylenic copolymer rubber comprising
   structural units derived from comonomers, respectively, of
   (a) ethylene,
   (b) one or more α-olefins having 3–20 carbon atoms, and (c) one or more trienes represented by the formula (1)

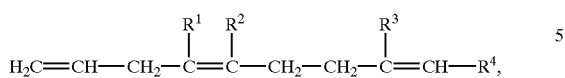
(1)

in which $R^1$ and $R^2$ denote each, independently of each other, hydrogen atom, methyl or ethyl and $R^3$ and $R^4$ denote each, independently of each other, methyl or ethyl, and a foaming agent under cross-linking, wherein the copolymer rubber has characteristic features that the mole ratio of the structural unit derived from ethylene (a) versus the structural unit derived from the α-olefin(s) having 3–20 carbon atoms (b), i.e. ethylene/α-olefin(s), is in the range from 95/5 to 40/60, that the content of the structural unit derived from the triene(s) (c) is in the range from 0.1 to 10 mole %, that the intrinsic viscosity (η) determined in decalin at 135° C. is in the range from 0.1 to 10 dl/g and that the complex viscosity coefficient ($\eta^*_A$) at 8 rad/sec in the assessment of dependence of the complex viscosity coefficient ($\eta^*$) on the frequency estimated from the kinematic viscoelasticity at 190° C. is at least $2\times10^3$ Pa.S and the ratio of the complex viscosity coefficient ($\eta^*_B$) at 0.01 rad/sec versus the complex viscosity coefficient ($\eta^*_A$) namely, ($\eta^*_B$)/($\eta^*_A$) is at least 35.

* * * * *

UNITED STATES PATENT AND TRADEMARK OFFICE
CERTIFICATE OF CORRECTION

PATENT NO.    : 6,635,727 B1
DATED         : October 21, 2003
INVENTOR(S)   : Taku Koda et al.

It is certified that error appears in the above-identified patent and that said Letters Patent is hereby corrected as shown below:

<u>Column 83,</u>
Line 46, change "9" to -- 22 --.

Signed and Sealed this

Seventeenth Day of February, 2004

JON W. DUDAS
*Acting Director of the United States Patent and Trademark Office*